June 7, 1966 R. L. PHELAN ET AL 3,254,594
SENSING, STORING AND PRINTING MEANS IN AUTOMATIC
ACCOUNTING MACHINES
Original Filed July 17, 1956 44 Sheets-Sheet 1
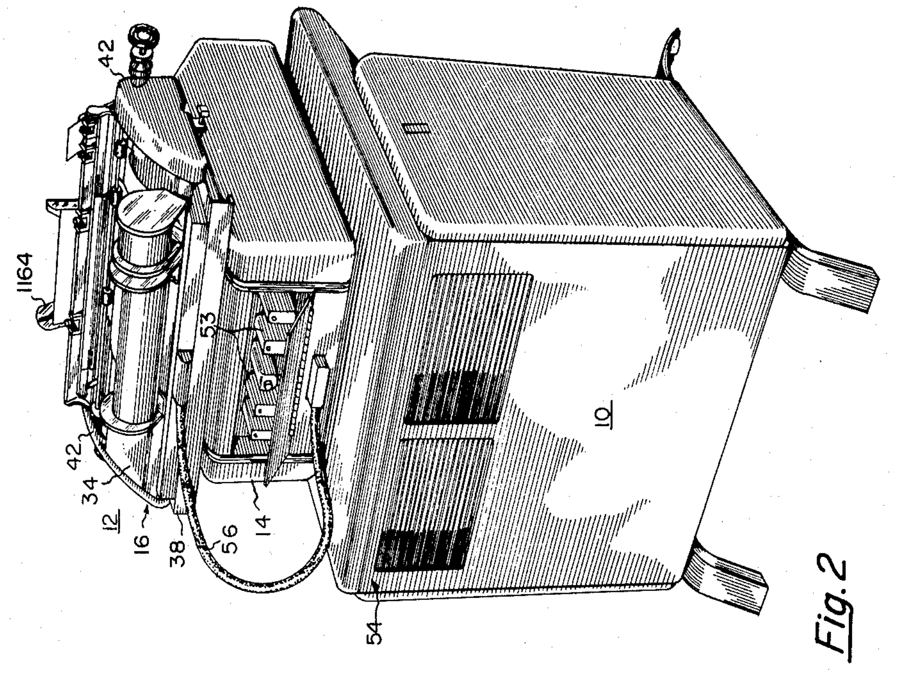
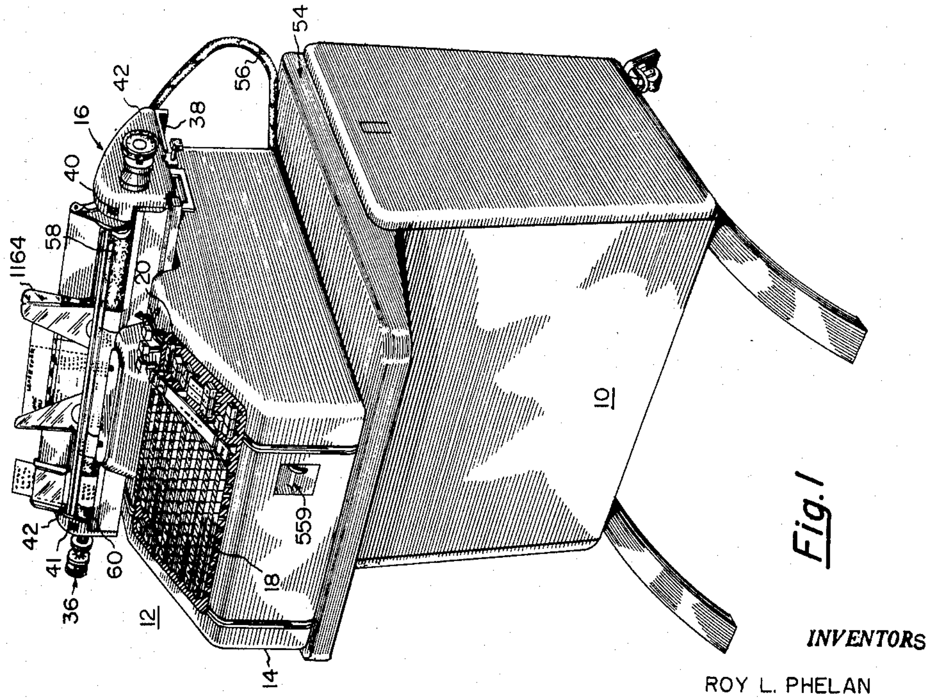
Fig. 2
Fig. 1
INVENTORS
ROY L. PHELAN
RICHARD A. WALLACE
BY Carl Fissell Jr.
AGENT

SENSING, STORING AND PRINTING MEANS IN AUTOMATIC ACCOUNTING MACHINES

Original Filed July 17, 1956

INVENTORS
ROY L. PHELAN
RICHARD A. WALLACE
BY Carl Fissell Jr.
AGENT

INVENTORS
ROY L. PHELAN
RICHARD A. WALLACE
BY Carl Fissell Jr.
AGENT

INVENTORS
ROY L. PHELAN
BY RICHARD A. WALLACE
BY Carl Fissell Jr
AGENT

| DECIMAL | DATA | | | | COMPLEMENT | | | |
|---|---|---|---|---|---|---|---|---|
| NUMBER | 1 | 2 | 4 | 7 | 1 | 2 | 4 | 7 |
| 0 | | | | | X | X | X | X |
| 1 | X | | | | | X | X | X |
| 2 | | X | | | X | | X | X |
| 3 | X | X | | | | | X | X |
| 4 | | | X | | X | X | | X |
| 5 | X | | X | | | X | | X |
| 6 | | X | X | | X | | | X |
| 7 | | | | X | X | X | X | |
| 8 | X | | | X | | X | X | |
| 9 | | X | | X | X | | | X |

*INVENTORS*
ROY L. PHELAN
RICHARD A. WALLACE
BY Carl Fissell Jr.
AGENT

INVENTORS
ROY L. PHELAN
RICHARD A. WALLACE
BY Carl Fissell Jr.
AGENT

INVENTORS
ROY L. PHELAN
RICHARD A. WALLACE
BY
Carl Fissell Jr.
AGENT

INVENTORS
ROY L. PHELAN
RICHARD A. WALLACE
BY Carl Tissell Jr.
AGENT

INVENTORS
ROY L. PHELAN
RICHARD A. WALLACE
BY Carl Fissell Jr.
AGENT

INVENTORS
ROY L. PHELAN
RICHARD A. WALLACE
Carl Fissell Jr.
AGENT

INVENTORS
ROY L. PHELAN
RICHARD A. WALLACE
BY Carl Fissell Jr.
AGENT

INVENTORS
ROY L. PHELAN
RICHARD A. WALLACE
BY Carl Fissell Jr.
AGENT

Fig. 27A

| I-CLAPPER OPERATION | | |
|---|---|---|
| OPERATION | ANGLE DEGREES | TIME IN MS AT 360 R.P.M. |
| 1. CLEAR 1ST TOOTH | 11° 50' | 5.47 |
| 2. REST BETWEEN TEETH | 12° 50' | 5.73 |
| 3. SLIDE AGAINST 2ND TOOTH | 11° 50' | 5.47 |
| TOTAL | 36° | 16.67 |

| II FORWARD STOP OPERATION | | |
|---|---|---|
| OPERATION | ANGLE DEGREES | TIME IN MS AT 360 R.P.M. |
| 1. CLEAR 1ST TOOTH | 26° | 12.04 |
| 2. REST BETWEEN TEETH | 10° | 4.63 |
| TOTAL | 36 | 16.67 |

| III-REARWARD STOP OPERATION | | |
|---|---|---|
| OPERATION | ANGLE DEGREES | TIME IN MS AT 360 R.P.M. |
| 1. HELD UP BY CLAPPER | 11° 50' | 5.47 |
| 2. RAISED BY 2ND TOOTH | 24° 10' | 11.20 |
| TOTAL | 36° | 16.67 |

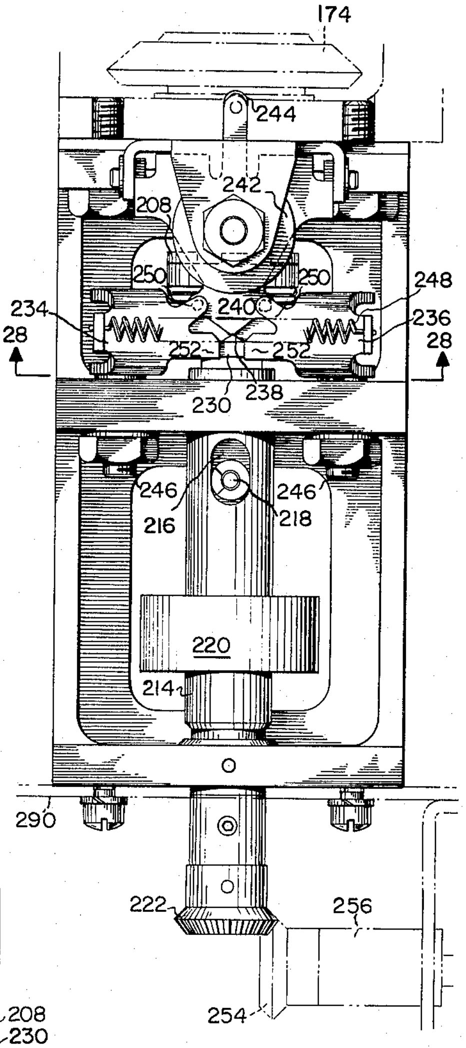

Fig. 27

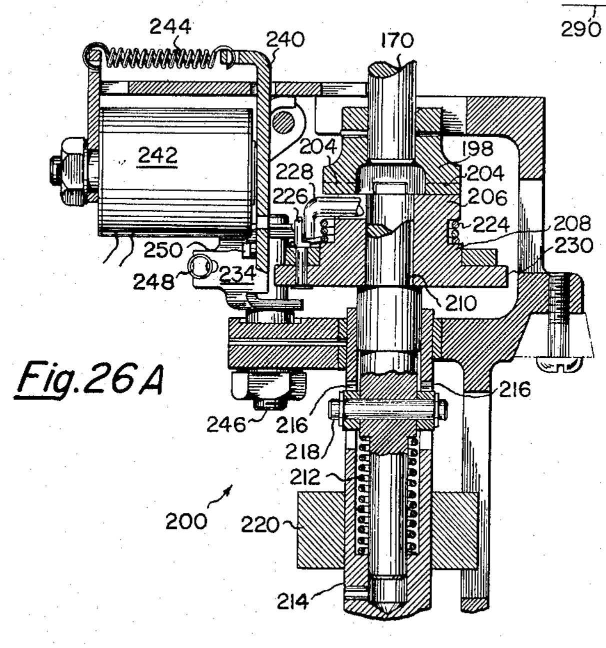

Fig. 26A

INVENTORS
ROY L. PHELAN
RICHARD A. WALLACE
BY Carl Fissell Jr.
AGENT

INVENTORS
ROY L. PHELAN
RICHARD A. WALLACE
BY Carl Fissell Jr.
AGENT

INVENTORS
ROY L. PHELAN
RICHARD A. WALLACE
BY Carl Fissell Jr.
AGENT

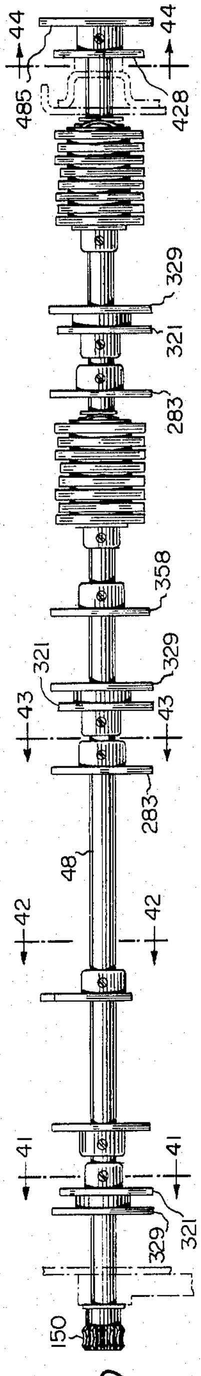

Fig.40

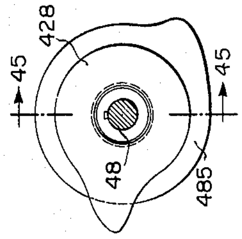

Fig.44

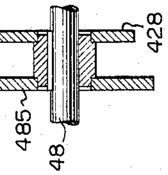

Fig.45

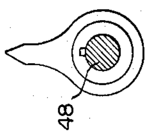

Fig.42

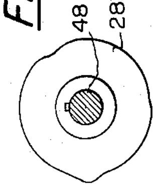

Fig.43

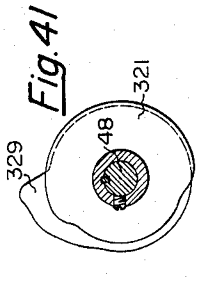

Fig.41

Fig.46

AUTO-RESET CAM

| DEG. RELATIVE TO FOLLOWER | MOTION | CAM CTR. TO FOLLOWER CTR. |
|---|---|---|
| 0 – 147 | DWELL | .666 |
| 147 – 191 | HARMONIC | .666 – 1.034 |
| 193 | " | 1.033 |
| 195 | " | 1.031 |
| 197 | " | 1.023 |
| 199 | " | 1.006 |
| 201 | " | .976 |
| 203 | " | .933 |
| 205 | " | .861 |
| 207 | " | .773 |
| 209 | " | .714 |
| 211 | " | .682 |
| 213 | " | .666 |
| 213 – 360 | DWELL | .666 |

Fig.47

PAPER PUSHER CAM

| DEG. RELATIVE TO FOLLOWER | MOTION | CAM CTR. TO FOLLOWER CTR. |
|---|---|---|
| 0 – 4 | DWELL | .719 |
| 4 – 54 | HARMONIC | .719 – .919 |
| 54 – 70 | DWELL | .919 |
| 70 – 90 | HARMONIC | .919 – .719 |
| 90 – 360 | DWELL | .719 |

Fig.48

PAPER PUSHER RISER CAM

| DEG. RELATIVE TO FOLLOWER | MOTION | CAM CTR. TO FOLLOWER CTR. |
|---|---|---|
| 0 – 80 | DWELL | .650 |
| 80 – 102 | HARMONIC | .650 – .728 |
| 102 – 315 | DWELL | .728 |
| 315 – 337 | HARMONIC | .728 – .650 |
| 337 – 360 | DWELL | .650 |

Fig.49

IDLER ROLLER CAM

| DEG. RELATIVE TO FOLLOWER | MOTION | CAM CTR. TO FOLLOWER CTR. |
|---|---|---|
| 0 – 54 | DWELL | .717 |
| 54 – 70 | HARMONIC | .717 – .653 |
| 70 – 191 | DWELL | .653 |
| 191 – 213 | HARMONIC | .653 – .717 |
| 213 – 234 | DWELL | .717 |
| 234 – 250 | HARMONIC | .717 – .653 |
| 250 – 292 | DWELL | .653 |
| 292 – 314 | HARMONIC | .653 – .717 |
| 314 – 360 | DWELL | .717 |

Fig.50

SPACER CAM

| DEG. RELATIVE TO FOLLOWER | MOTION | CAM CTR. TO FOLLOWER CTR. |
|---|---|---|
| 0 – 291 | DWELL | .8157 |
| 291 – 345 | HARMONIC | .8157 – 1.0113 |
| 347 | " | 1.006 |
| 349 | " | .993 |
| 351 | " | .972 |
| 353 | " | .932 |
| 355 | " | .851 |
| 357 | " | .8157 |
| 357 – 360 | DWELL | .8157 |

*INVENTORS*

ROY L. PHELAN

RICHARD A. WALLACE

BY Carl Kissell Jr.

AGENT

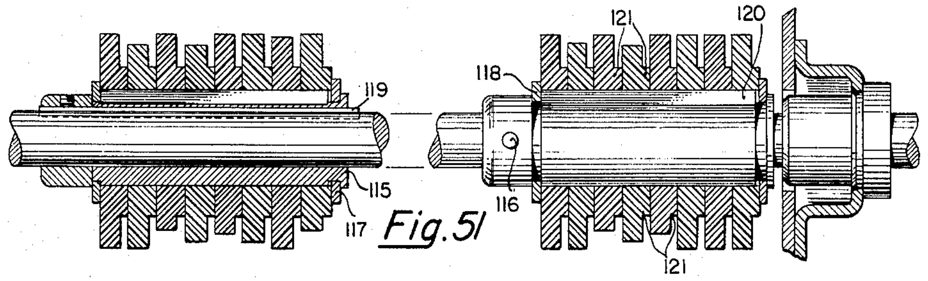
Fig. 51
| ELECTRICAL TIMING | | | | |
|---|---|---|---|---|
| CAM NO. | MAKE | BREAK | MAKE | BREAK |
| 1 | 340° | 185° | | |
| 2 | 357° | 124° | | |
| 3 | 109° | 200° | 270° | 230° |
| 4 | 120° | 196° | | |
| 5 | 132° | 196° | 278° | 312° |
| 6 | 120° | 195° | | |
| 7 | 200° | 268° | | |
| 8 | 165° | 340° | | |
| 9 | 225° | 275° | 295° | 345° |
| 10 | 130° | 350° | | |
| 11 | 115° | 312° | | |
| 12 | 250° | 356° | | |
| 13 | 20° | 138° | | |
| 14 | 355° | 10° | | |
| 15 | | | | |
| 16 | | | | |
Fig. 65a
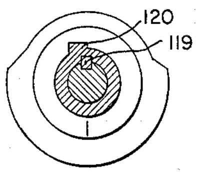
Fig. 52
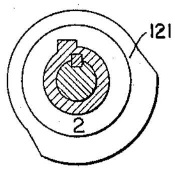
Fig. 53
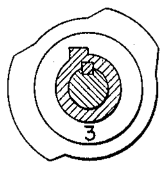
Fig. 54
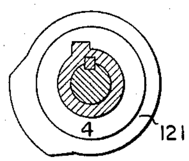
Fig. 55
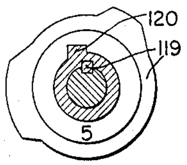
Fig. 56
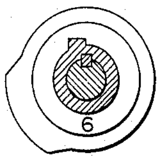
Fig. 57
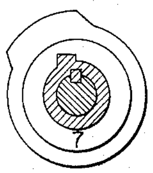
Fig. 58
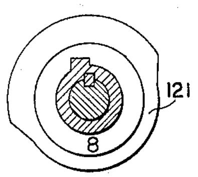
Fig. 59
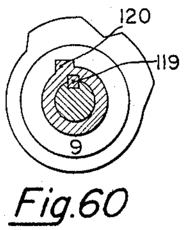
Fig. 60
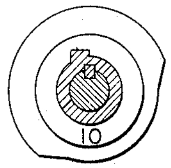
Fig. 61
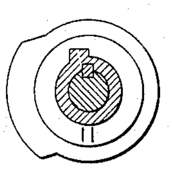
Fig. 62
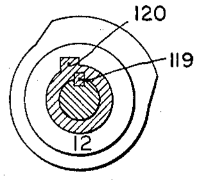
Fig. 63
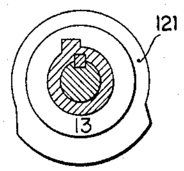
Fig. 64
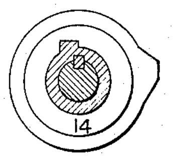
Fig. 65
INVENTORS
ROY L. PHELAN
RICHARD A. WALLACE
BY Carl Fissell Jr.
AGENT INVENTORS
ROY L. PHELAN
RICHARD A. WALLACE
BY Carl Kissel Jr.
AGENT

*INVENTORS*
ROY L. PHELAN
RICHARD A. WALLACE
BY Carl Fissell Jr.
AGENT

INVENTORS
ROY L. PHELAN
RICHARD A. WALLACE
BY Carl Fissell Jr.

INVENTORS
ROY L. PHELAN
RICHARD A. WALLACE
BY Carl Fissell Jr.
AGENT

INVENTORS
ROY L. PHELAN
RICHARD A. WALLACE
BY Carl Fissell Jr.
AGENT

INVENTORS
ROY L. PHELAN
RICHARD A. WALLACE
BY Carl Frisell Jr.
AGENT

INVENTORS
ROY L. PHELAN
RICHARD A. WALLACE
BY Carl Fussell Jr.
AGENT

INVENTORS
ROY L. PHELAN
RICHARD A. WALLACE
BY
BY Carl Fissell Jr.
AGENT

*INVENTORS*
ROY L. PHELAN
RICHARD A. WALLACE
BY [signature]
AGENT

INVENTORS
ROY L. PHELAN
RICHARD A. WALLACE
BY Carl Fissell Jr.
AGENT

INVENTORS
ROY L. PHELAN
RICHARD A. WALLACE
BY [signature]
AGENT

INVENTORS
ROY L. PHELAN
RICHARD A. WALLACE
BY Carl Fissell Jr.
AGENT

INVENTORS
ROY L. PHELAN
RICHARD A. WALLACE
BY Carl Fissell Jr
AGENT

INVENTORS
ROY L. PHELAN
RICHARD A. WALLACE
BY Carl Fissell Jr.
AGENT

INVENTORS

ROY L. PHELAN

RICHARD A. WALLACE

BY Carl Fissell Jr.

AGENT

INVENTORS
ROY L. PHELAN
RICHARD A. WALLACE
BY Carl Fissell Jr.
AGENT

INVENTORS
ROY L. PHELAN
RICHARD A. WALLACE
BY Carl Fissell Jr.
AGENT

June 7, 1966 R. L. PHELAN ET AL 3,254,594

SENSING, STORING AND PRINTING MEANS IN AUTOMATIC ACCOUNTING MACHINES

Original Filed July 17, 1956 44 Sheets-Sheet 35

INVENTORS
ROY L. PHELAN
RICHARD A. WALLACE
BY Carl Fissell Jr.
AGENT

INVENTORS
ROY L. PHELAN
RICHARD A. WALLACE
BY Carl [signature]
AGENT

INVENTORS
ROY L. PHELAN
RICHARD A. WALLACE
BY Carl Fissell Jr.
AGENT

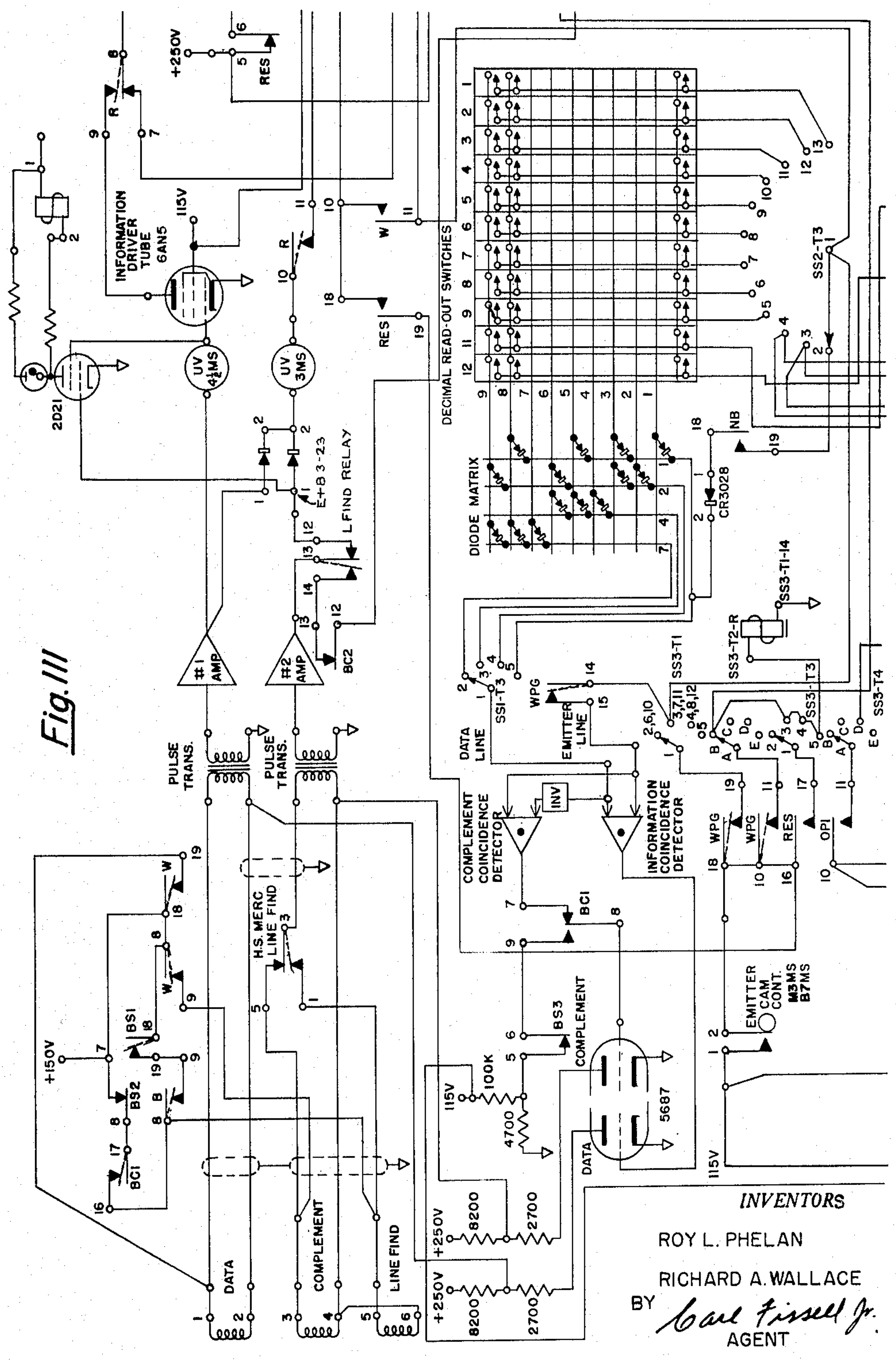
Fig. III
INVENTORS
ROY L. PHELAN
RICHARD A. WALLACE
BY Carl Fissell Jr.
AGENT INVENTORS
ROY L. PHELAN
RICHARD A. WALLACE
BY [signature]
AGENT INVENTORS
ROY L. PHELAN
RICHARD A. WALLACE
BY Carl Fissell Jr.
AGENT INVENTORS
ROY L. PHELAN
RICHARD A. WALLACE
BY Carl Fissell Jr.
AGENT INVENTORS
ROY L. PHELAN
RICHARD A. WALLACE
BY Carl Fissell Jr.
AGENT INVENTORS
ROY L. PHELAN
RICHARD A. WALLACE
BY Carl Fissell Jr.
AGENT INVENTORS
ROY L. PHELAN
RICHARD A. WALLACE
BY Carl Fissell Jr.
AGENT United States Patent Office 3,254,594
Patented June 7, 1966

3,254,594
SENSING, STORING AND PRINTING MEANS IN AUTOMATIC ACCOUNTING MACHINES

Roy L. Phelan, Plymouth, Mich., and Richard A. Wallace, Port Kennedy, Pa., assignors to Burroughs Corporation, Detroit, Mich., a corporation of Michigan Original application July 17, 1956, Ser. No. 598,454. Divided and this application Aug. 5, 1960, Ser. No. 47,870
11 Claims. (Cl. 101—93)

This invention broadly relates to improvements in printing calculating machines employing digital information reading and recording devices. More particularly, the invention relates to accounting machines wherein automatic information entering apparatus is coordinated with automatic document feeding and controlling mechanism whereby desired information, such as amounts, may be codally represented and so entered upon a record medium inserted in the machine that the coded information may be automatically sensed from the record, translated, printed, and entered into an accumulator where computations may be made to produce a new amount which in turn may be translated and both printed on the record to form a permanent visible indication and temporarily stored on the record for automatic pick-up at a later time. More specifically, this invention provides an improved accounting machine for automatically feeding documents, picking up accounting balances, and finding posting lines. It will find use, for example, in banks and otherwise in accounts receivable, accounts payable applications. This is a division of application Serial No. 598,454, filed July 17, 1956, now abandoned.

In the past in accounting machines designed for automatic pick-up of accounting balances, the balances have been entered on ledger or statement forms in a variety of ways permitting them to be sensed and thereby actuate an accumulator and a printing mechanism.

On way, for example, was by perforating the form with holes in a codal representation of the old balance. A difficulty with this system was that it was obviously necessary to punch-in every old balance for the reason that the perforated holes could not be erased. This introduced an additional problem of the requirement for a relatively large amount of space on the form for holding large numbers of perforated old balances. To minimize the space requirements the holes have been made very small. This in turn made the reading operation difficult, and the alignment of the paper critical, often making reading of the codal information impossible and making it necessary for the operator to mentally pick up and manually enter information and thus defeat the major purpose of the machine. Another drawback of this system was the inability to automatically feed the paper into the machine thus requiring the operator to manually insert the paper to the correct posting line which may be indicated by a punched hole.

It has also been suggested to encode the old balance on a separate, attachable storage element, for example, by punching the balance in a separate card or magnetically writing the balance on a metal plate and attaching the card or plate to the ledger or statement for later sensing. However, this approach introduced the problems of lost, mixed up, or deformed plates as well as the obviously undesirable necessity of having to remove the plates from the documents, and insert the document in one piece of equipment and the plate in another piece of equipment for automatic information pick-up, and after the new balance has been printed of having to remove both objects and reattach them before filing them.

Another way of automatically picking up balances required the use of a magnetic wire or tape in which the old balances were stored and the use of cabinets for storing reels of wire or tape. Here the number of accounts which could be serviced by one machine was limited by the finite size of the storage media, i.e., capacity of the wire or tape. Additionally, there was the difficult and time consuming problem of locating that portion of the wire or tape containing the stored old balance to match the active account.

Another form of picking up balances automatically, involves the use of a complex machine in which the movements of all major parts of the machine are required to be fully synchronized, such as the movement of the document, the sensing of magnetically encoded amounts, the setting-up of the print bars and the accumulator wheels must occur simultaneously. This method requires a large amount of electronic and electromechanical equipment. This tended to make the machine overly complicated, expensive, and bulky.

It is highly desirable, therefore, to produce an accounting machine for automatic balance pick-up and line find in which a single document is adapted for a dual function, i.e., to hold printed information and equivalent coded information. Further, the coded information should be in a form which can be erased so that only the last balance need be stored. Such a machine should be of relatively small bulk and limited electronic-electromechanical complexity, and have reusable storage capacity.

It is also desirable to design a machine which will not only relieve the operator of the repetitious and error-hazardous task of mentally noting and then entering old balances and of having to manually align and space the record forms or documents in the machine to the first blank posting line, but also to provide a machine capable of performing these tasks faster than the operator is ordinarily able to perform them. In addition, it would be desirable to design the machine such that the operator can index the amount of the first item into the keyboard while the machine is automatically sensing the old balance, and can search for the next account while the form is being automatically ejected from the machine.

An important object of the invention is to provide improved apparatus for automatically entering, sensing and erasing information on documents.

Another important object of the invention is to eliminate the need for the operator to mentally note and manuualy enter information on ledger and statement forms and for manually aligning such records, and for substituting electronic and electromechanical means for automatically accomplishing these operations at relatively high speed.

It is an important object of the present invention to provide an accounting machine capable of automatically recording information on a document in a form which can be automatically sensed during the feeding thereof and further capable of printing new information and of storing the latter information for later automatic sensing.

Another important object of the present invention is to provide improved means in an accounting machine for magnetically recording line find information in one columnar portion of the sheet during the movement of the sheet into the machine, and encoding an accounting balance magnetically in another columnar portion of the sheet during the ejection of the sheet from the machine.

A further important object of the invention is to provide means for automatically storing an old balance when the last posted line of a record medium becomes filled, and for transferring such stored balance to the first posting line of a new record medium.

It is another important object of the invention to provide improved means in an accounting machine for automatically aligning the record medium as it is inserted into the machine.

It is another important object of the invention to provide improved automatic line find means adapted to sense a blank posting line next adjacent to the last printed line on a record medium and to automatically feed and position the record medium at this line for printing the new balance.

It is a primary object of the present invention to provide an accounting machine having a traveling carriage which is controlled in a novel and efficient manner by the very documents upon which it prints.

A further object of the invention is to provide a keyboard, carriage controlled accounting machine which is capable of automatically reading and recording multi-digit amounts on a record member inserted into the carriage of the machine.

It is another object of the invention to provide asynchronous means for independent sensing or altering magnetically coded information while a record medium is moving into the carriage of an accounting machine or being ejected therefrom, said means not being coordinated with the action of the type bars and cycling mechanism of the machine in the total-taking operation thereof.

It is another object of the present invention to provide a dual document accounting machine having efficient novel means by which data originally entered on a record medium may be automatically reproduced at another place on the medium.

The invention when applied to a keyboard, carriage controlled, accounting machine is adapted in a novel manner to pick-up previous balances from a ledger or statement form and then reproduce them quickly and accurately in the old balance column of the form while simultaneously entering the amount of the balance in one or more of the registers of the machine.

A further important object of the invention is to provide coding means which will automatically check certain machine operations during the automatic old balance pick-up and writing cycles.

A further important object of the invention is to provide coding means which will represent decimal amounts with a minimum amount of counting, and minimum amounts of electronic equipment.

A still further important object is to provide an accounting machine which moves its forms fast enough to obtain satisfactory signals from the magnetic portion thereo, fast enough to be substantially faster than an average operator, but slow enough to allow counting pulses on electromechanical switches.

Various other objects, advantages and meritorious features of the invention will become more fully apparent from the following specification, appended claims, and accompanying drawings wherein:

FIGS. 1 and 2 are perspective views of the front and rear sides of an apparatus embodying the invention and including a desk unit housing certain of the components of the invention and an accounting machine unit supported on the desk;

FIG. 26A is a view similar to FIG. 26 but showing the clutch faces engaged;

FIG. 27 is a top view of the clutch mechanism taken along the line 27—27 of FIG. 26;

FIG. 27A is a chart showing the operational timing of the parts of the bidirectional fractional revolution clutch mechanism;

Figure 7:
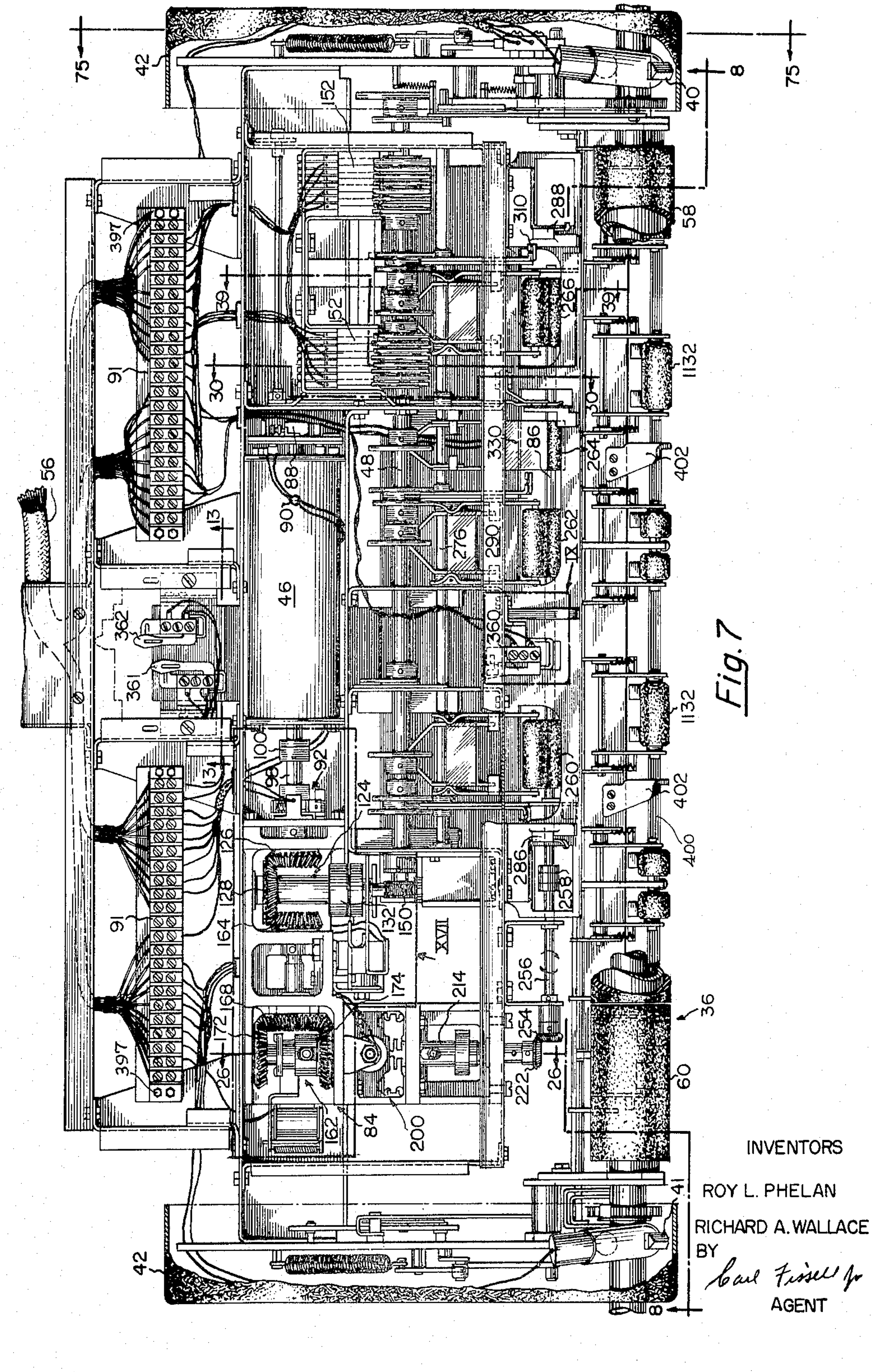
FIG. 7 is a top plan view of the automatic paper carriage of the present machine with portions thereof broken away to expose certain operating mechanisms therein.
Figure 8:
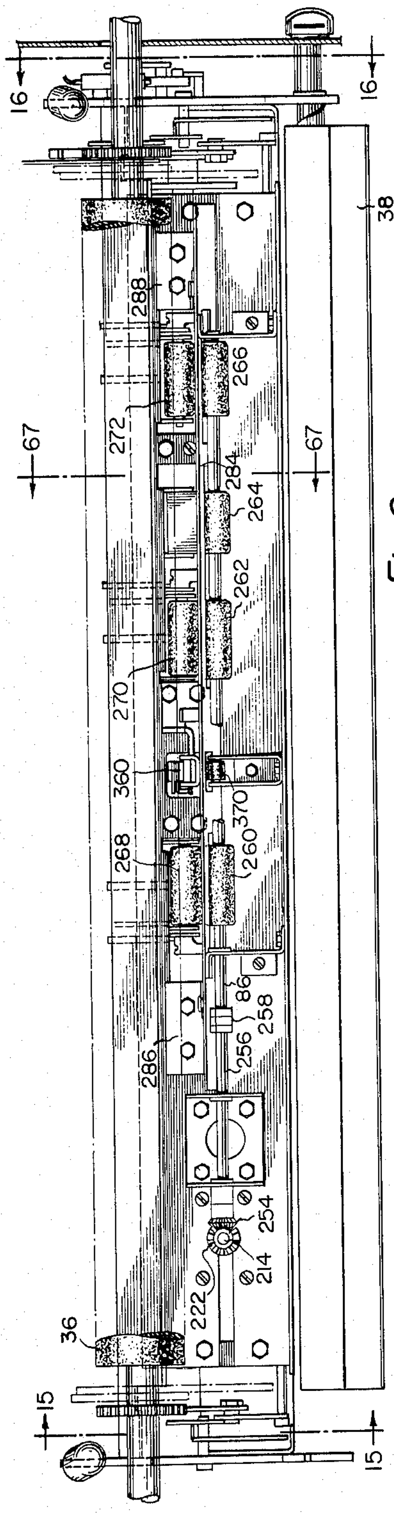
FIG. 8 is a front elevational view taken along the line 8—8 of FIG. 7.
Figures 39, 39A:
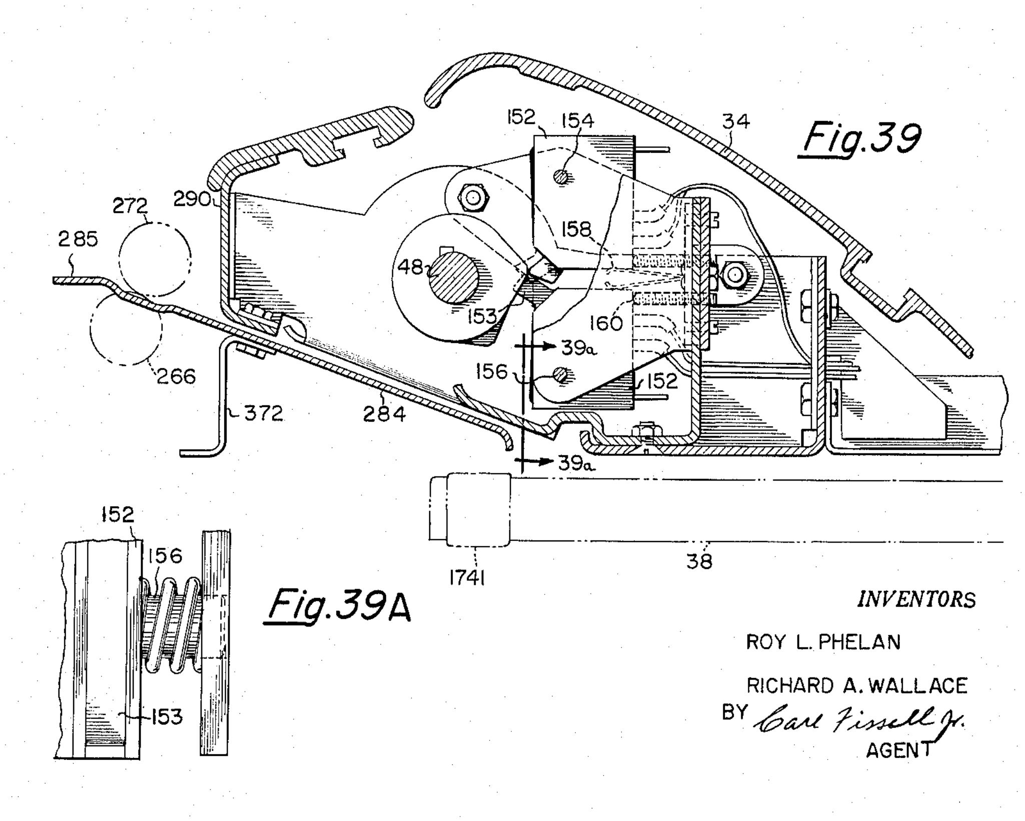
FIG. 39 is a sectional view taken along the line 39—39 of FIG. 7 and showing one end of the program timing cam and switch assembly illustrated in FIG. 38.
Figure 66:
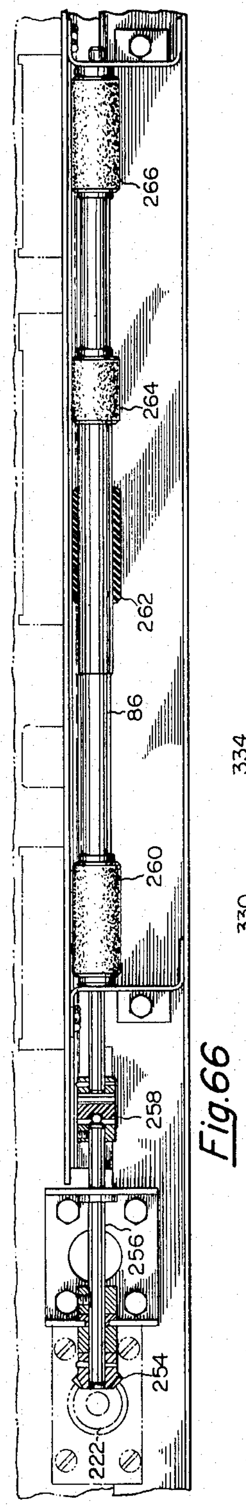
Figures 67, 67A, 68, 69:
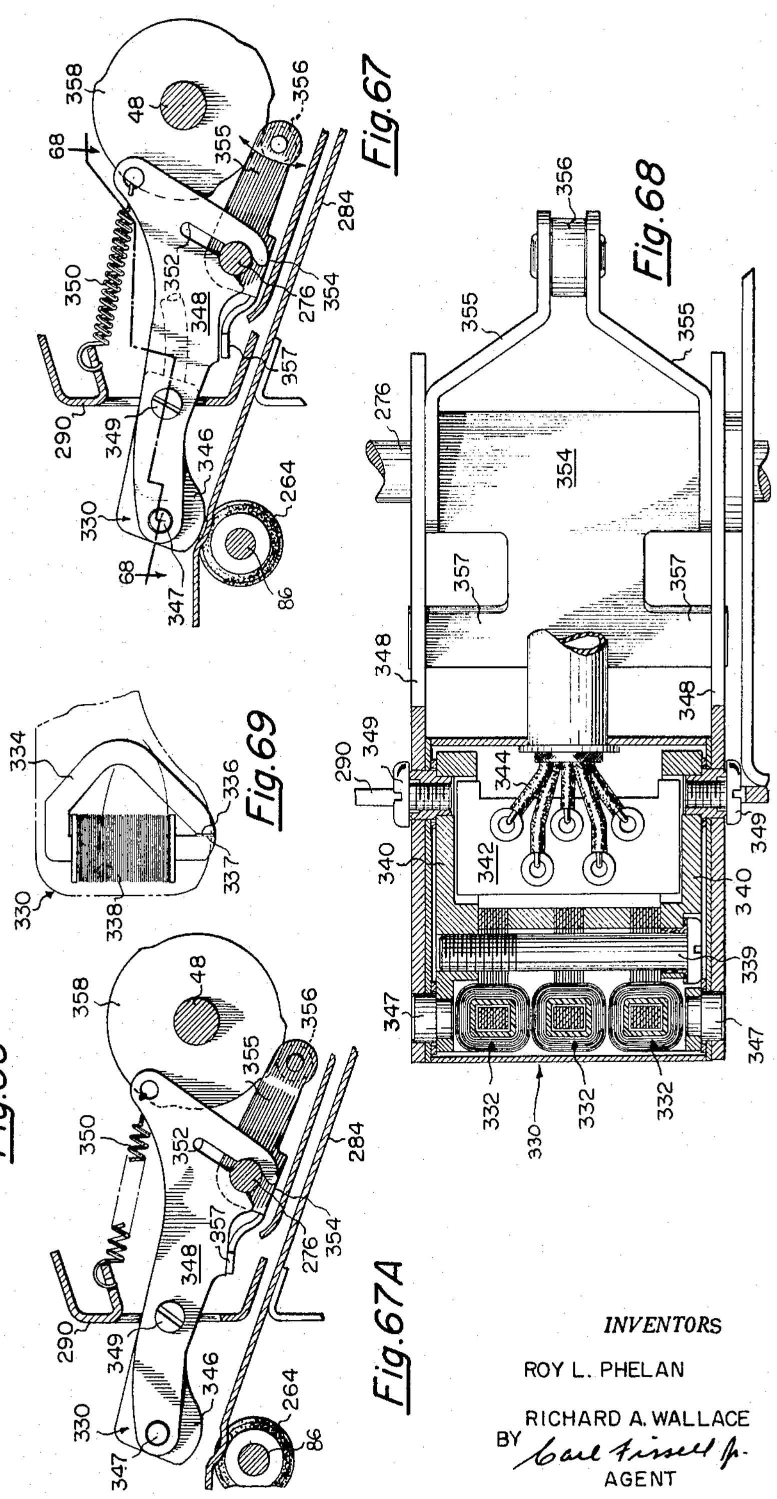
Figures 70, 71:
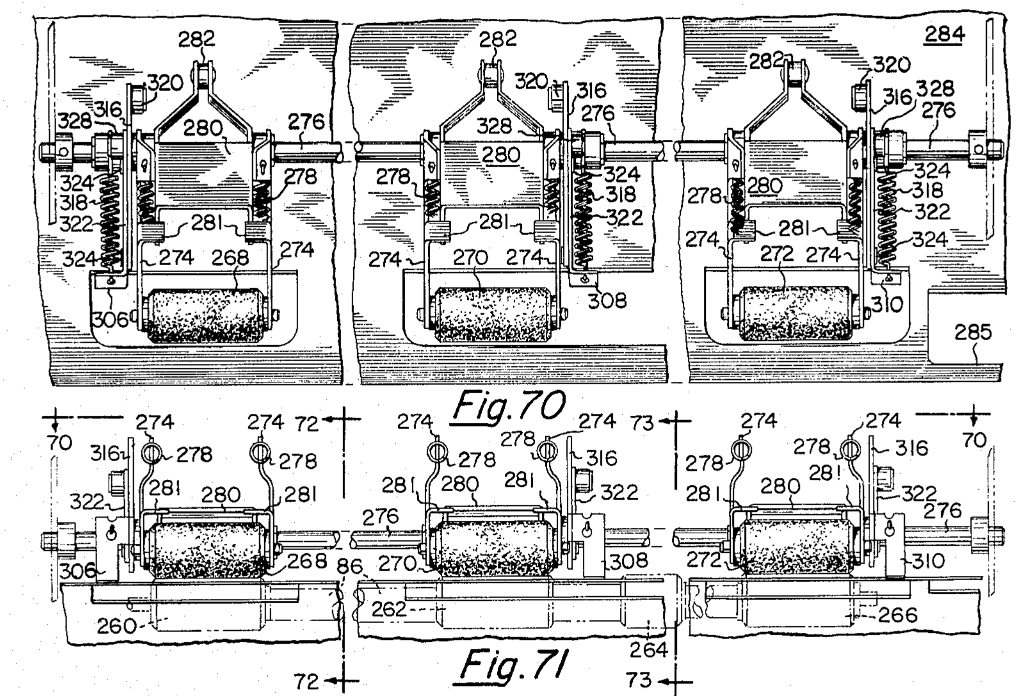
Figures 72, 73, 74:
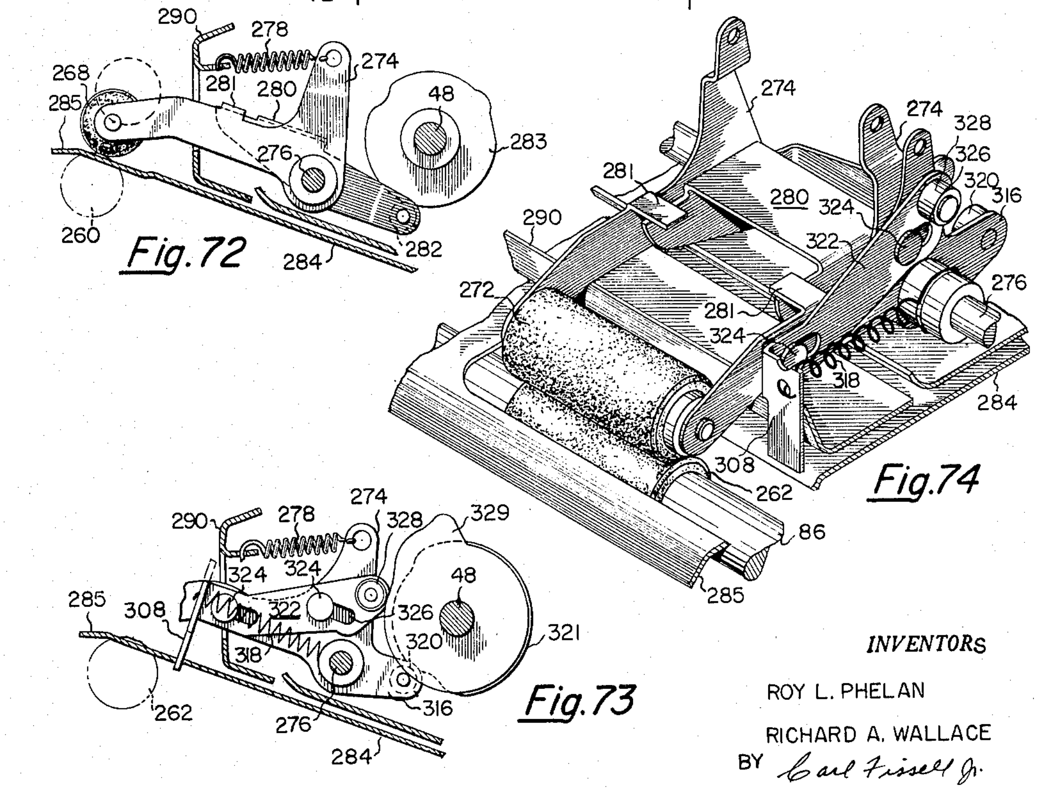
Figures 75, 84A:
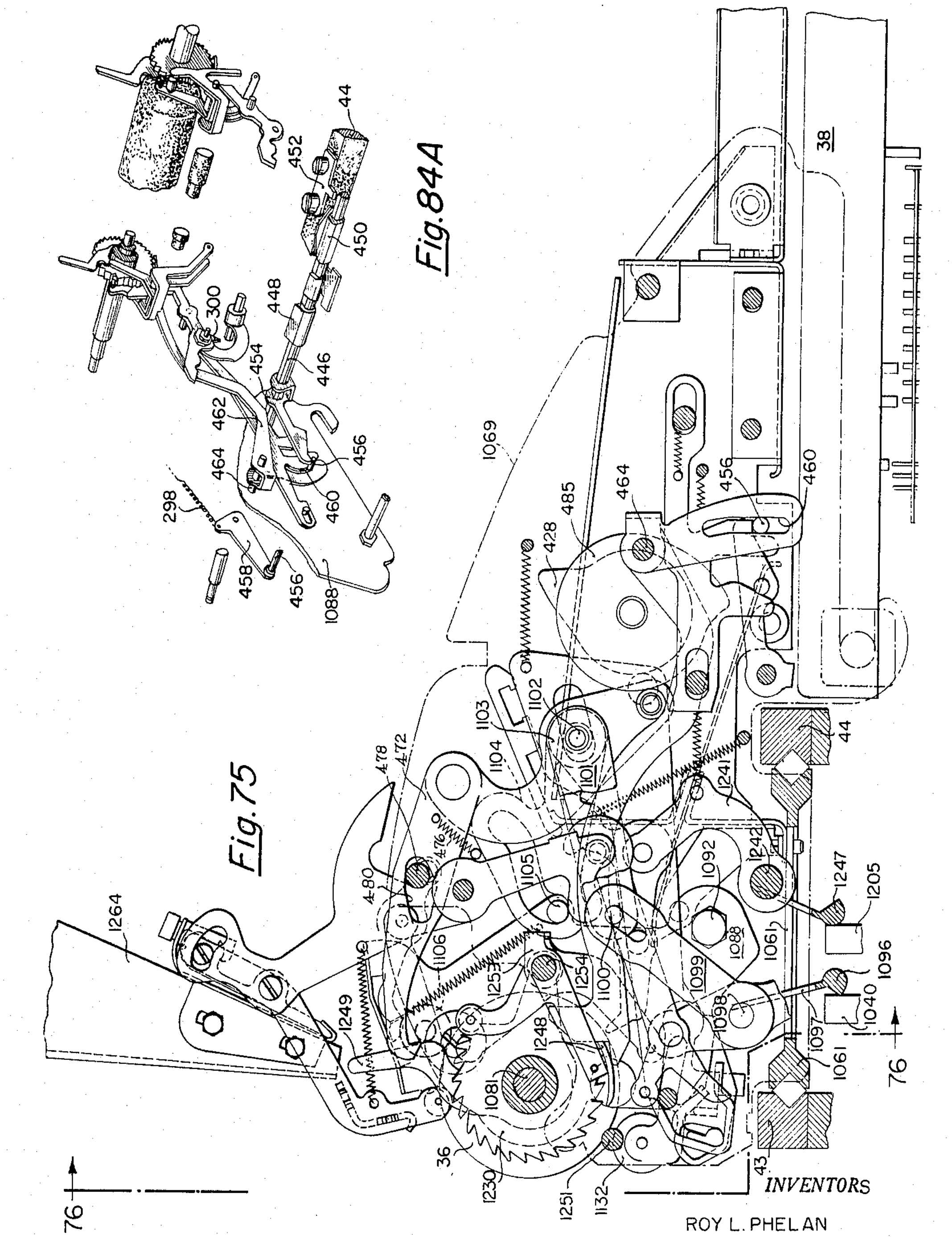
Figure 76:
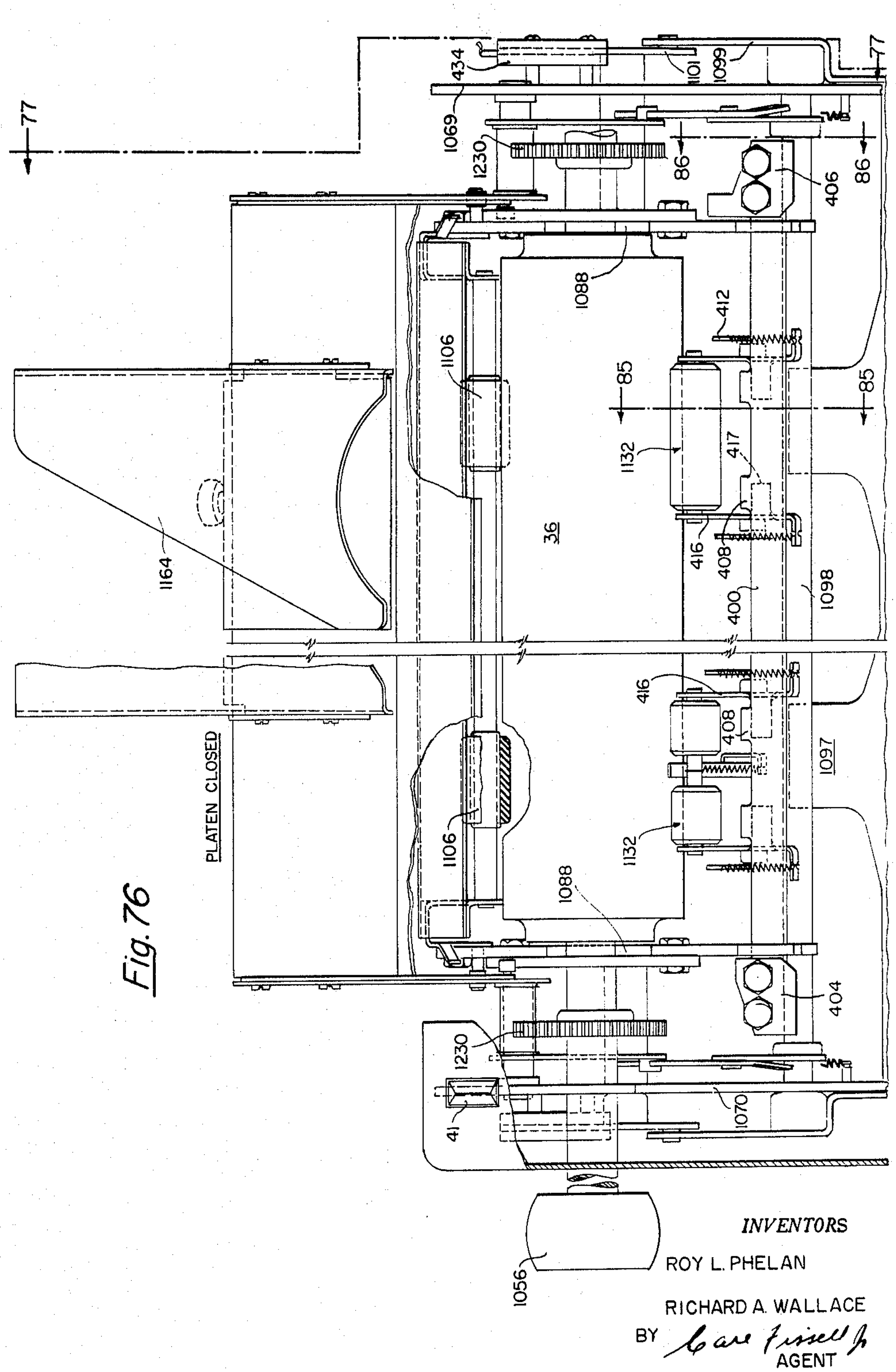
Figures 77, 78:
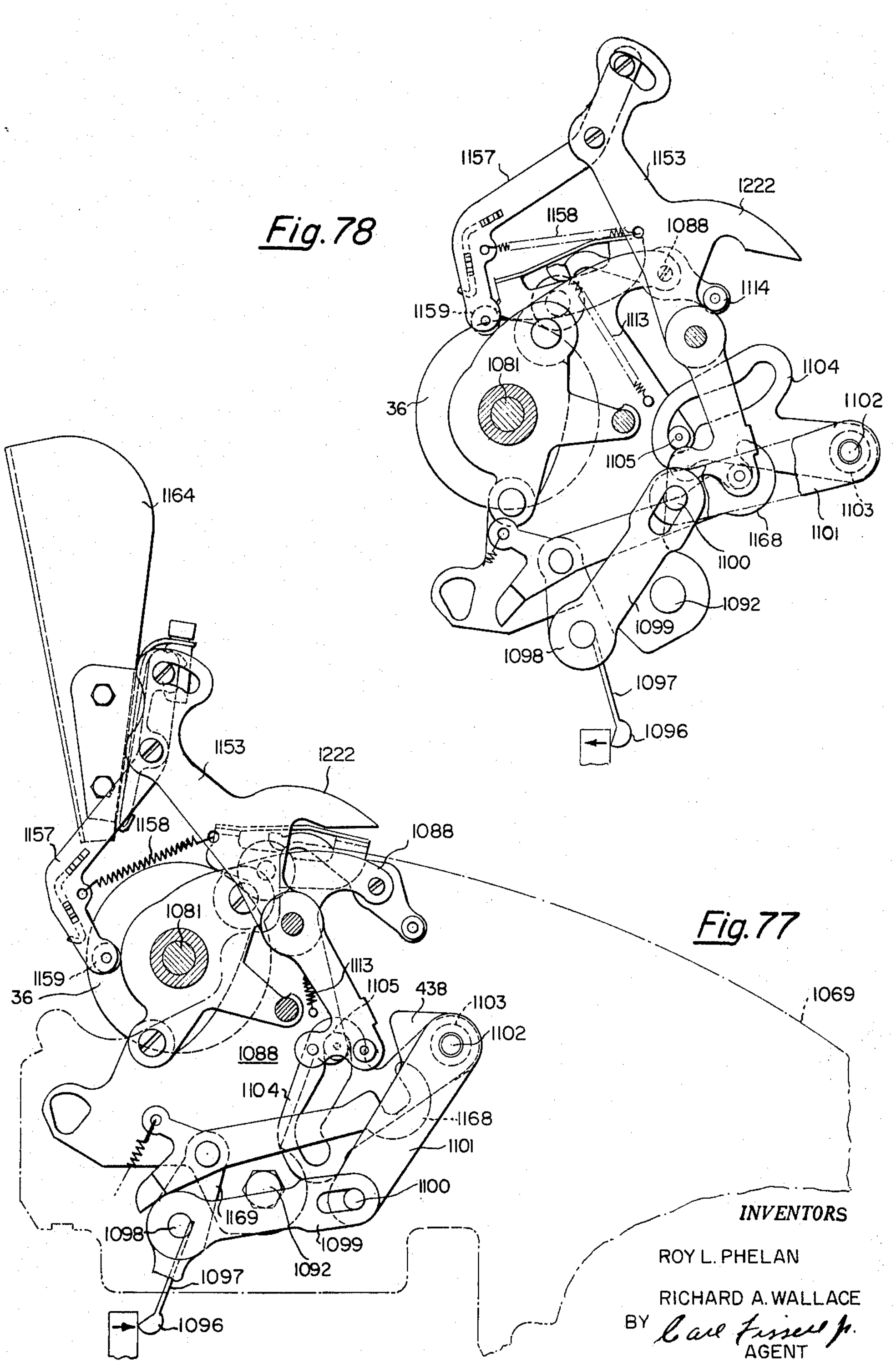
Figure 79:
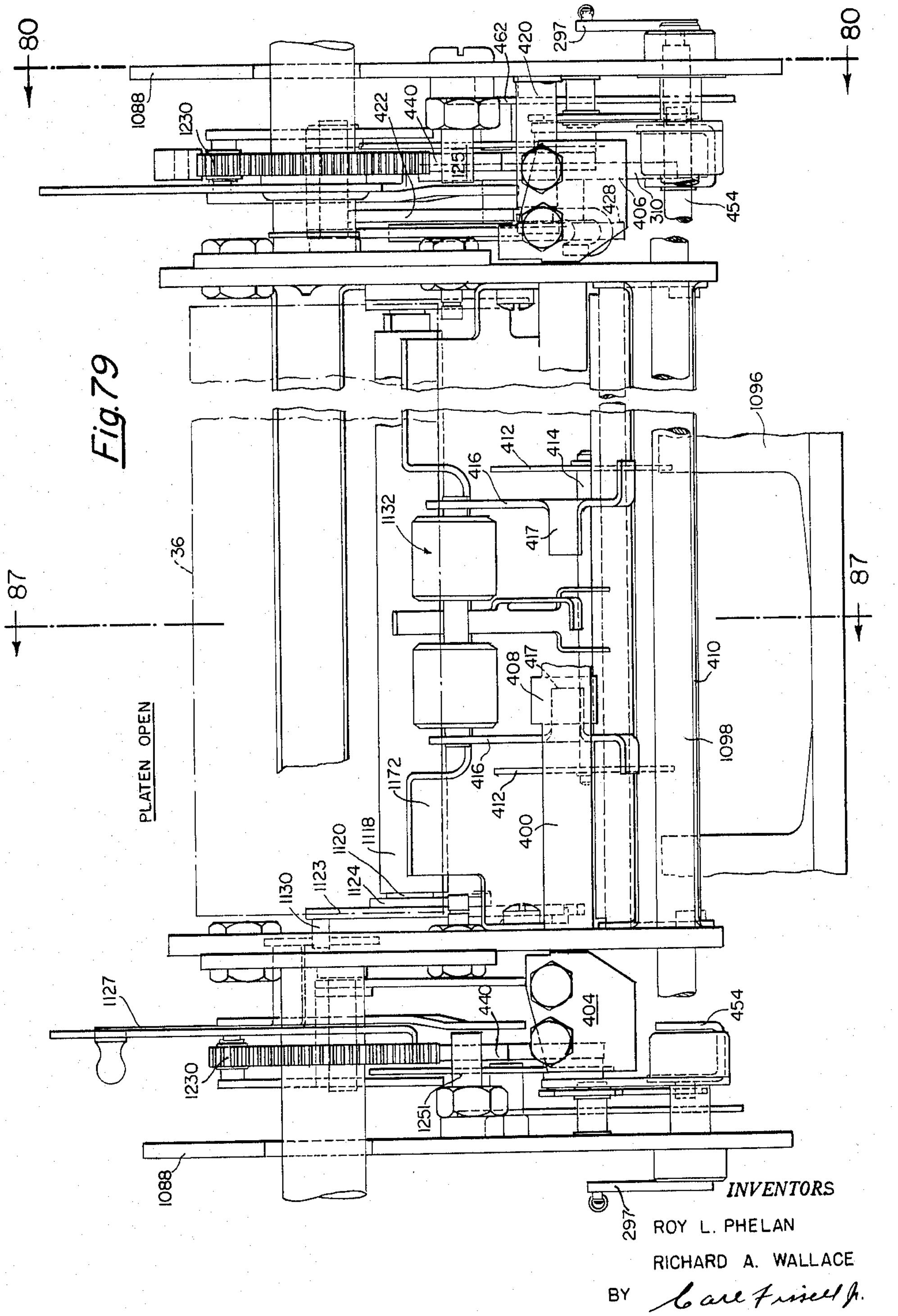
Figure 80:
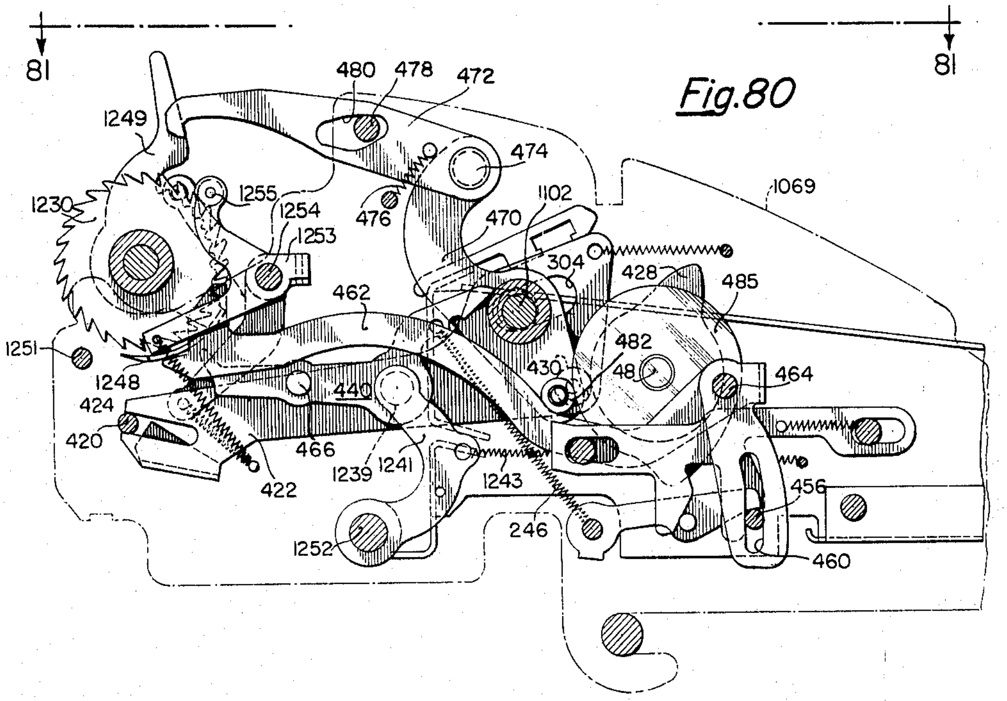
Figure 81:
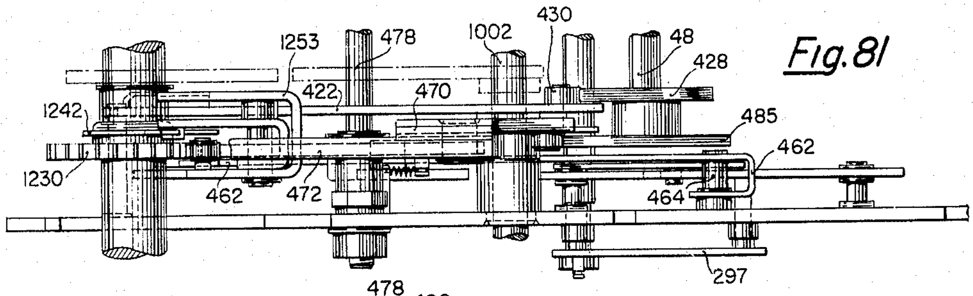
Figure 82:
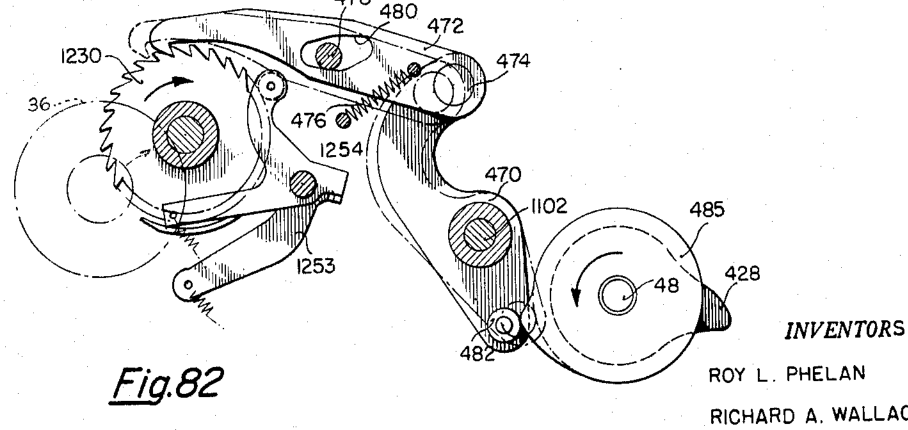
Figure 83:
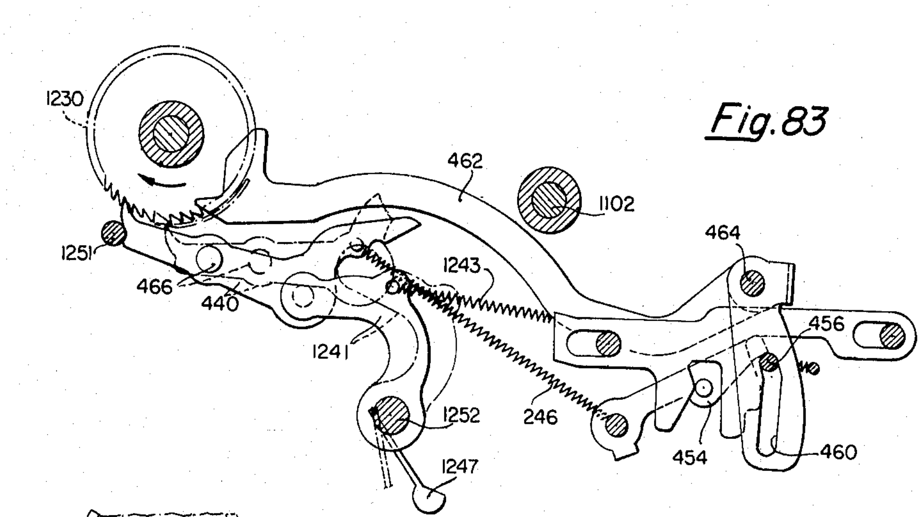
Figures 84, 84B:
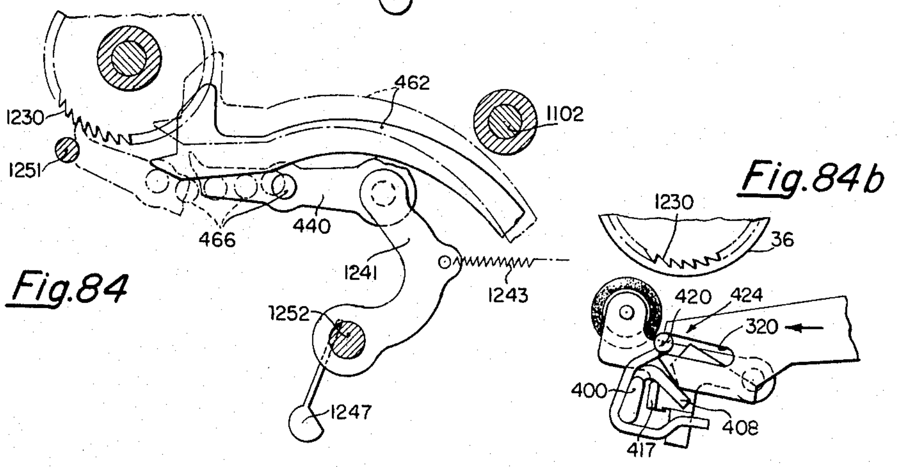
Figure 84C:
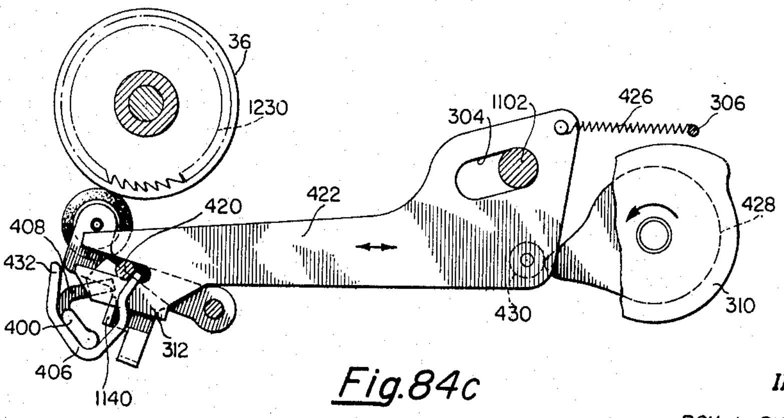
Figure 86:
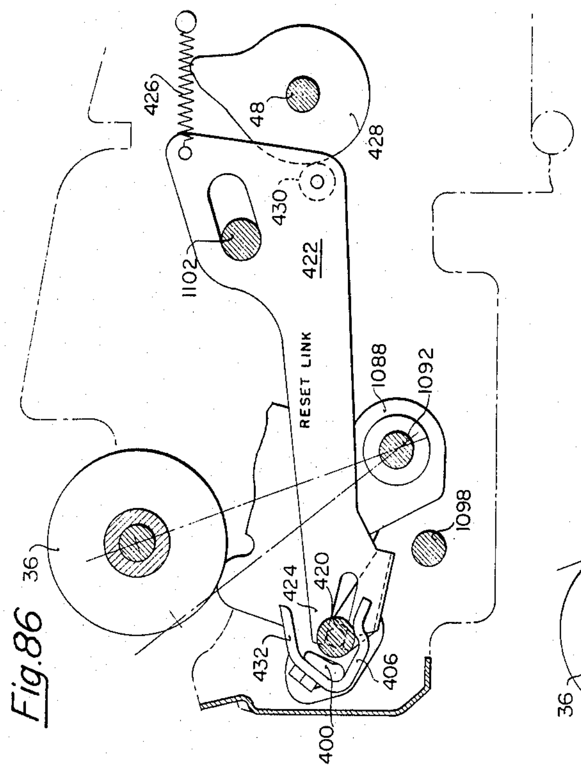
Figure 86A:
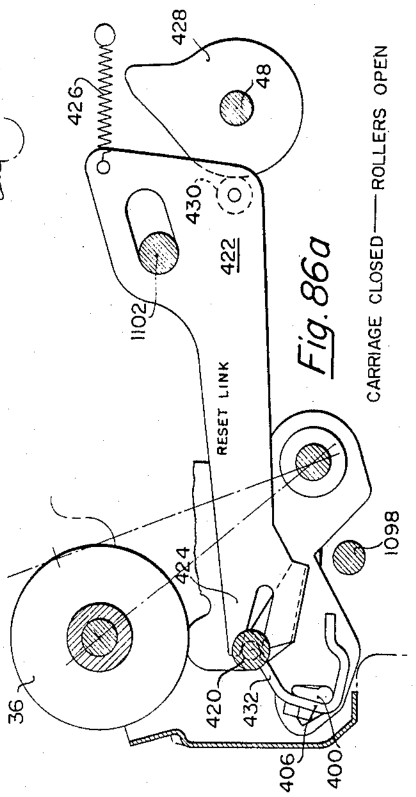
Figure 85:
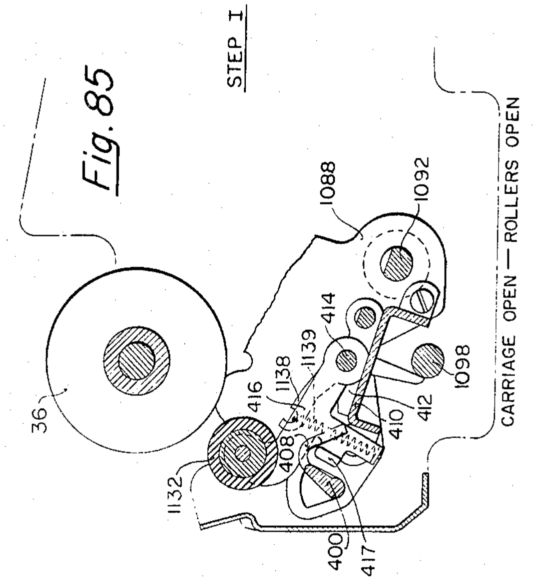
Figures 85B, 85C, 86B, 86C:
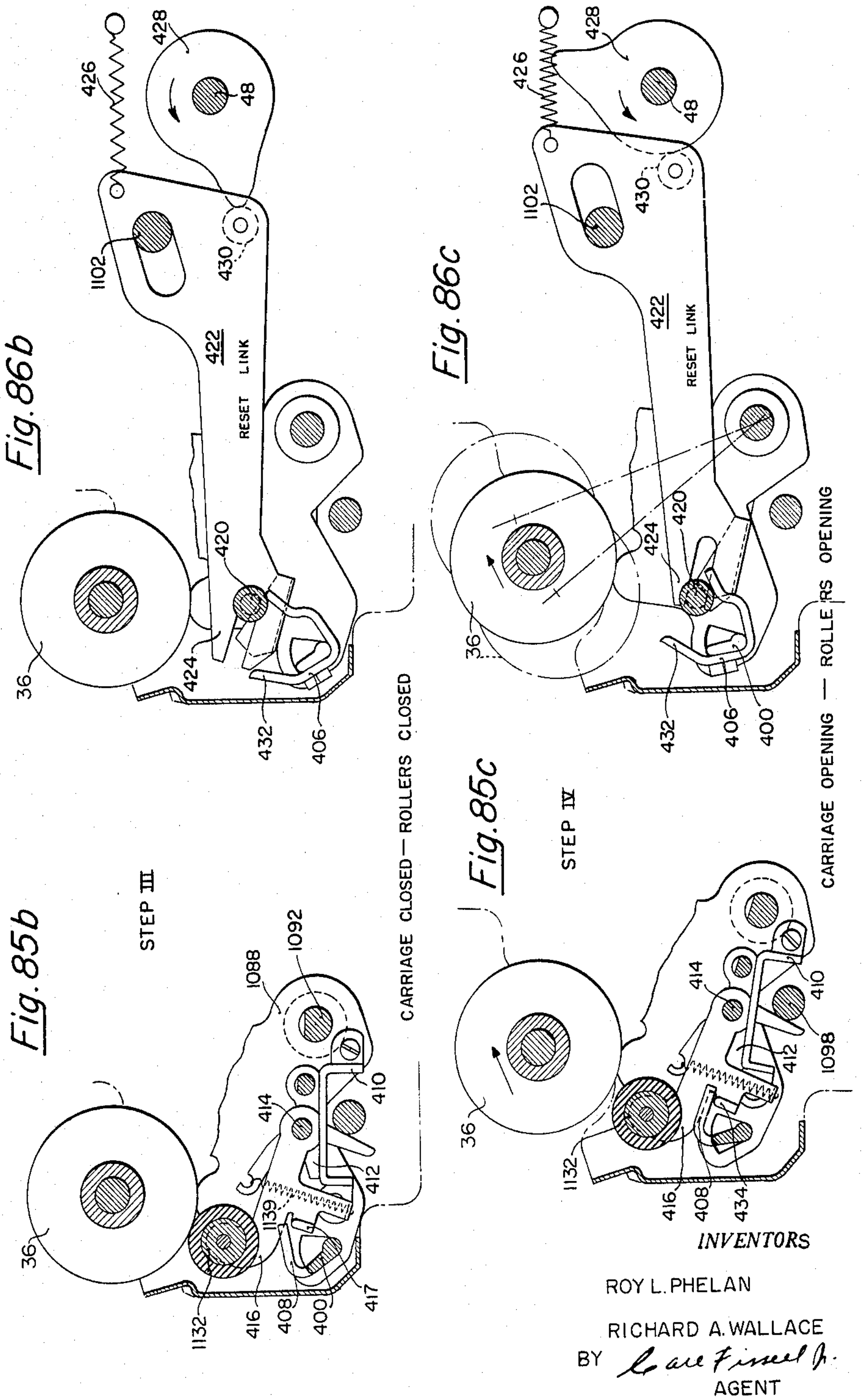
Figures 87, 88:
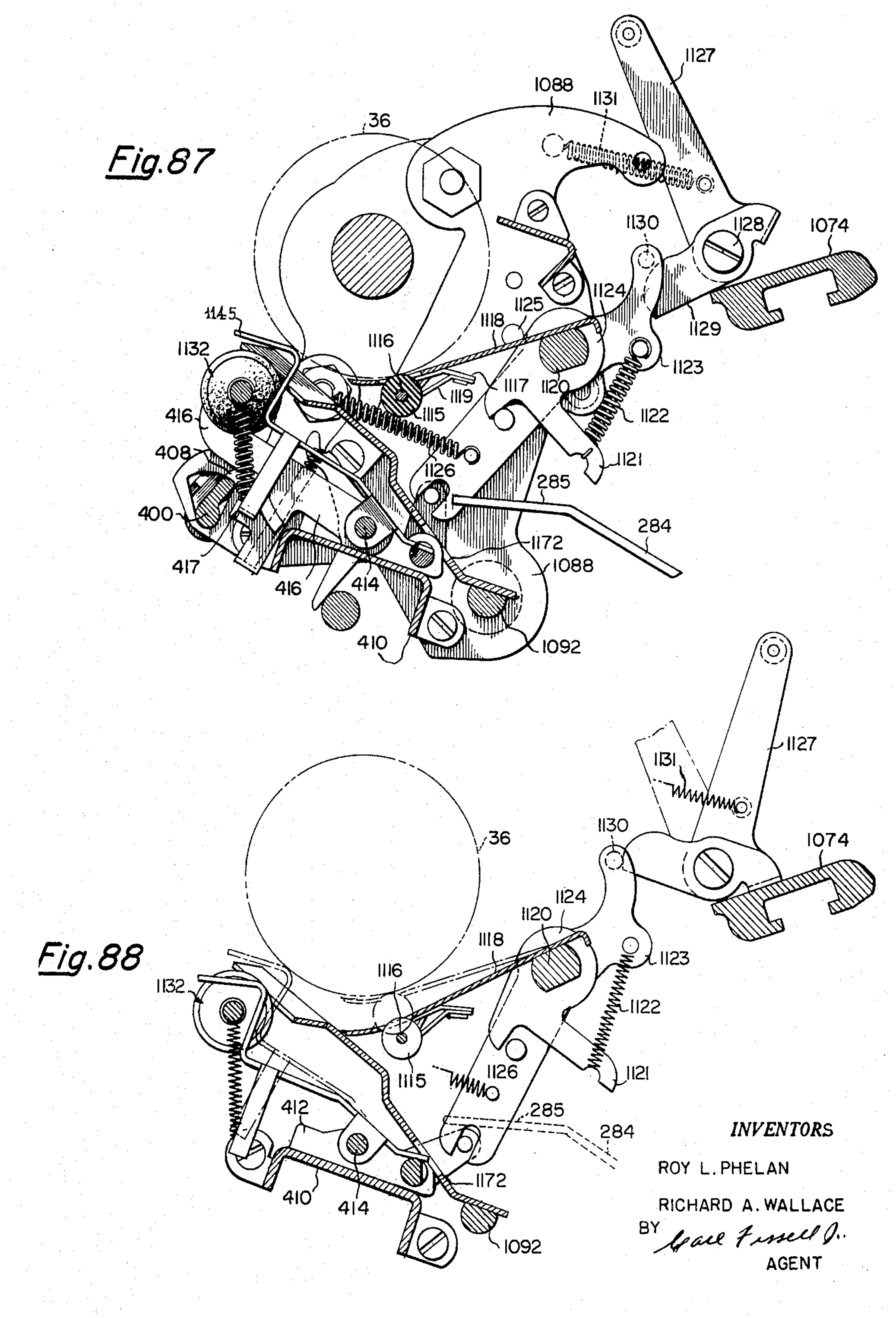
Figure 89:
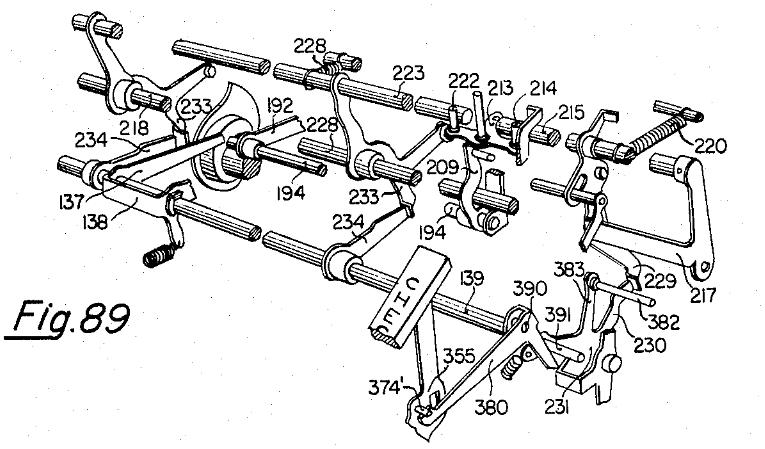
Figures 90, 91:
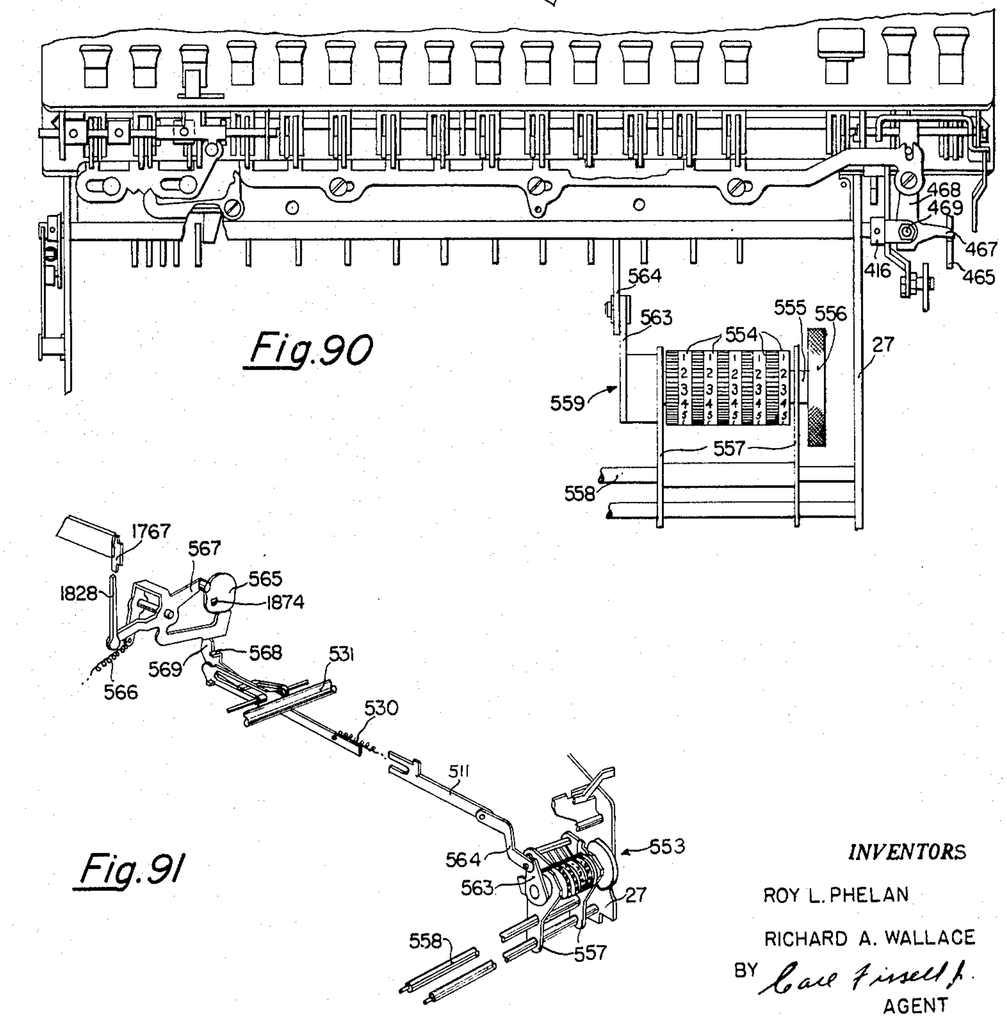
Figure 93:
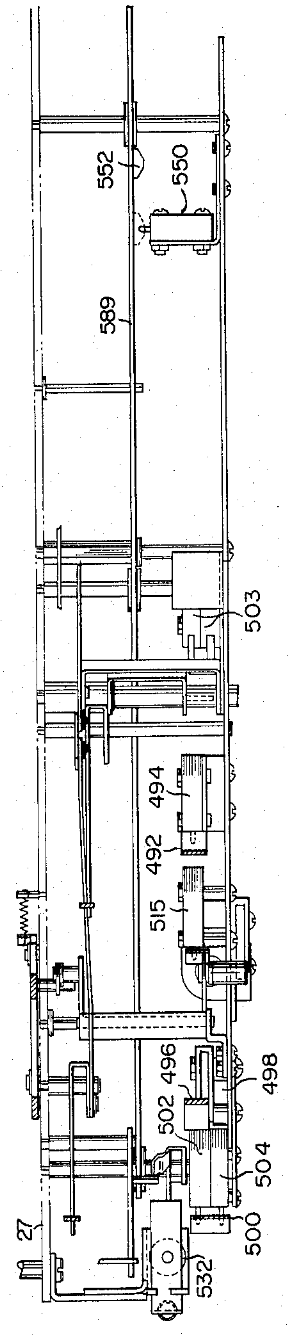
Figure 92:
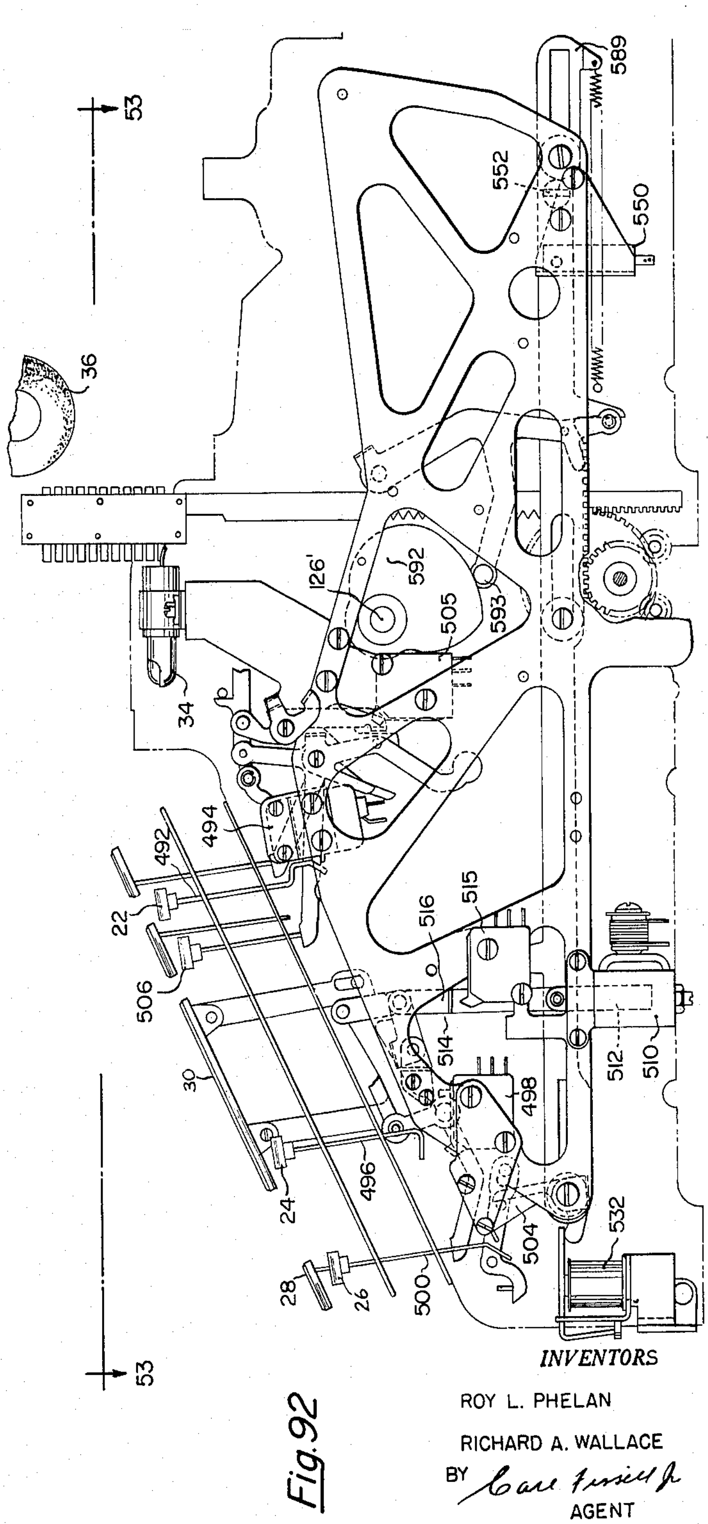
Figures 94, 95, 96, 97:
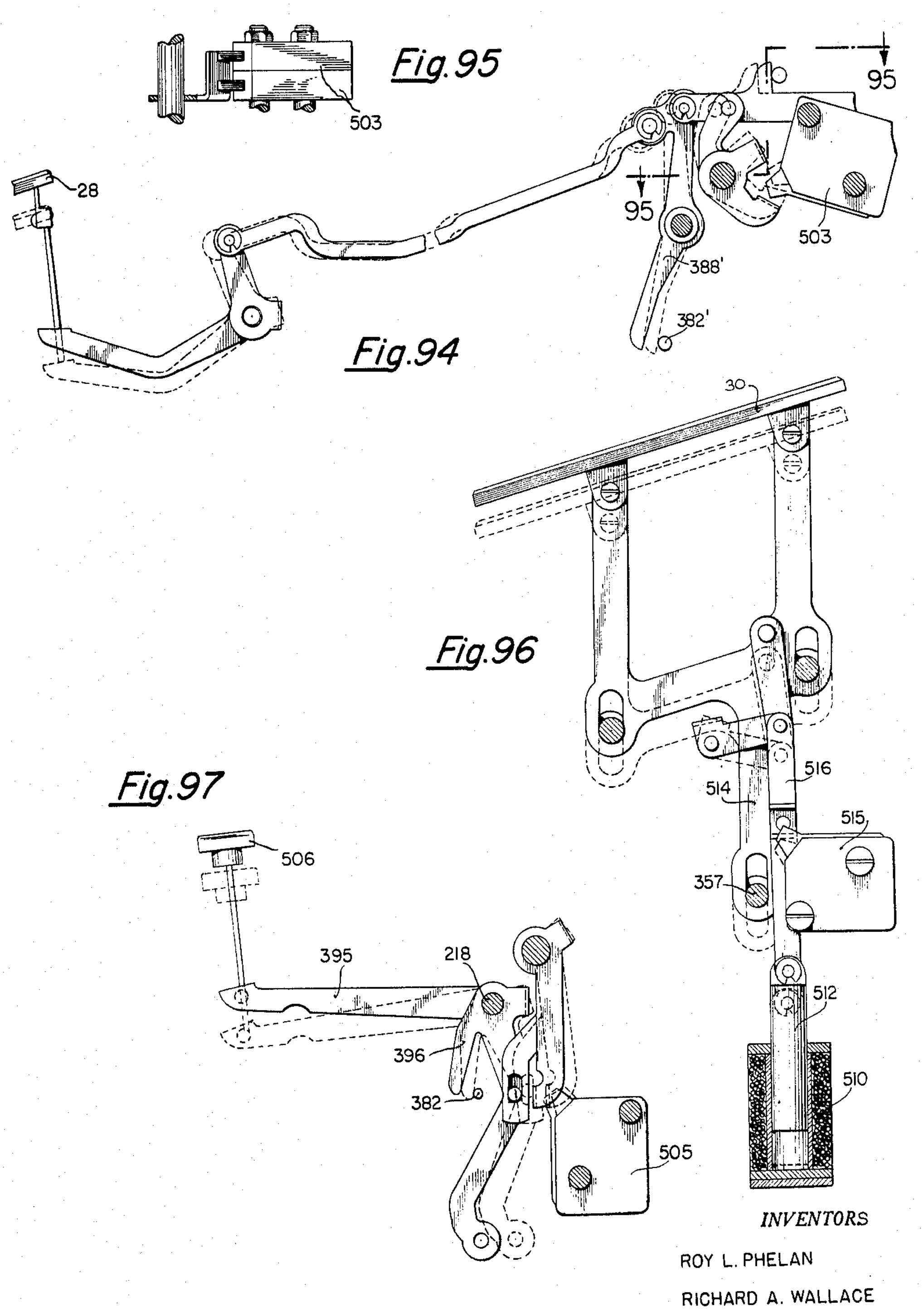
Figure 98:
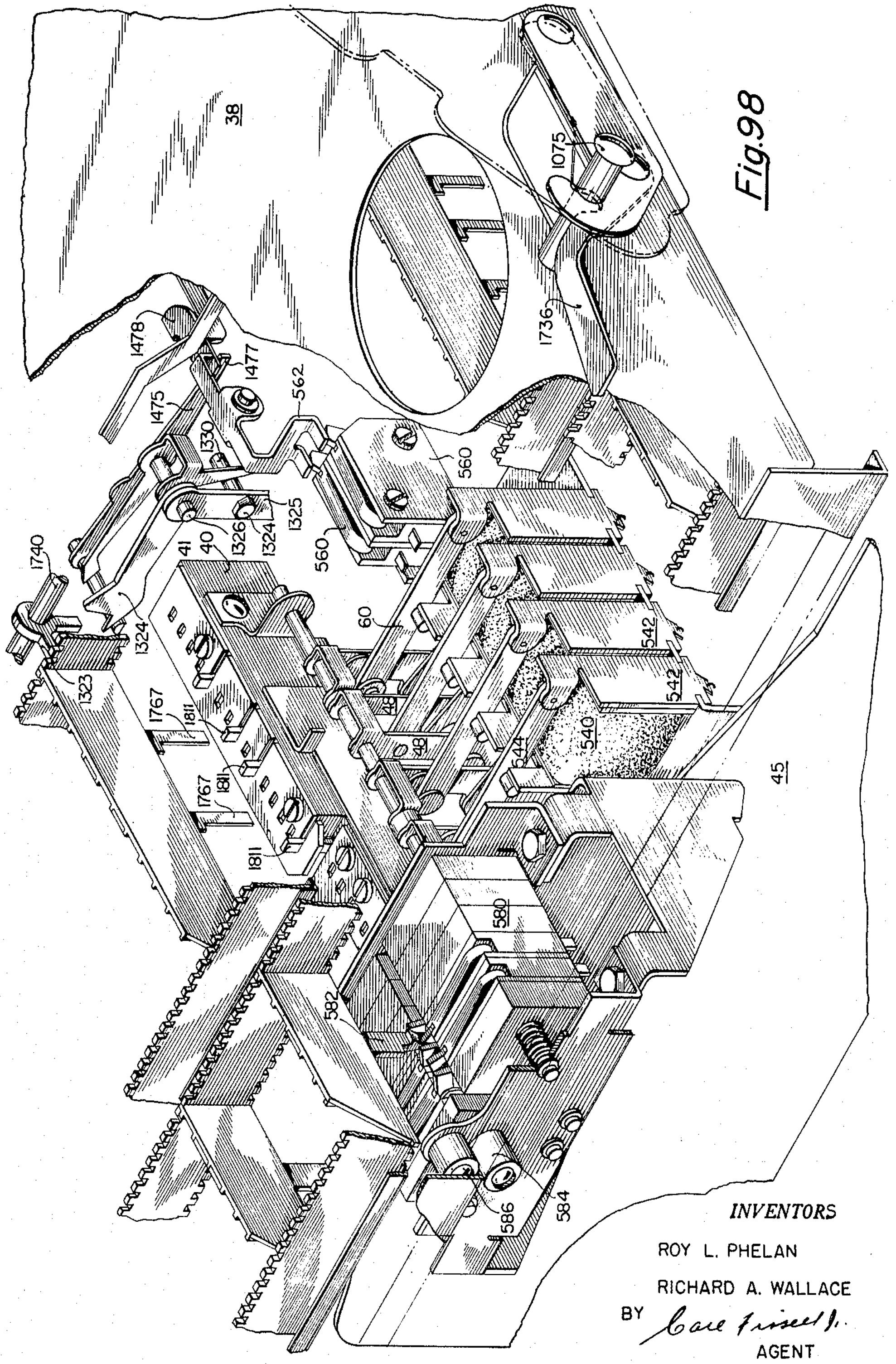
Figures 99, 100, 101, 102:
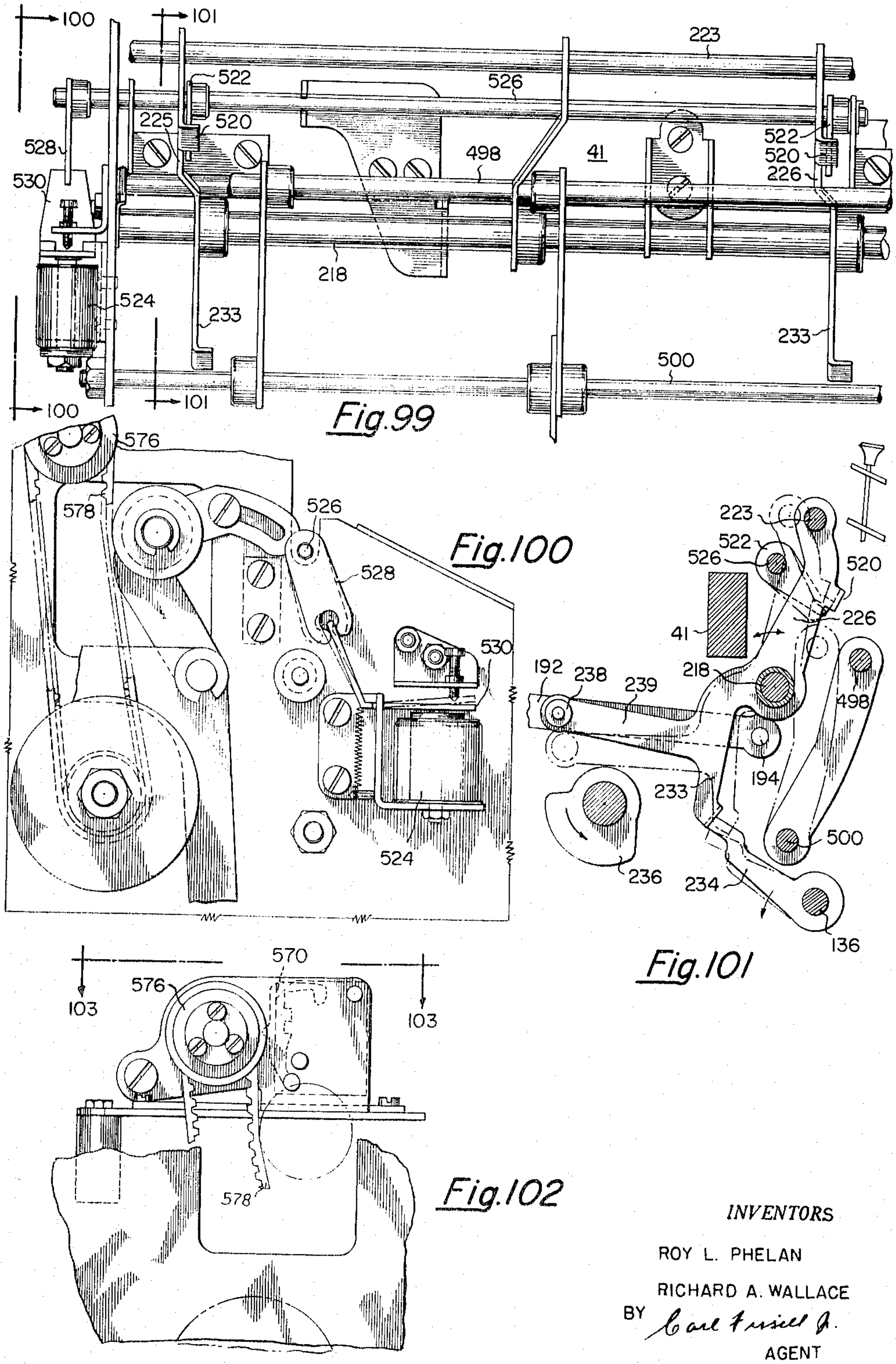
Figures 103, 104, 105, 106, 107:
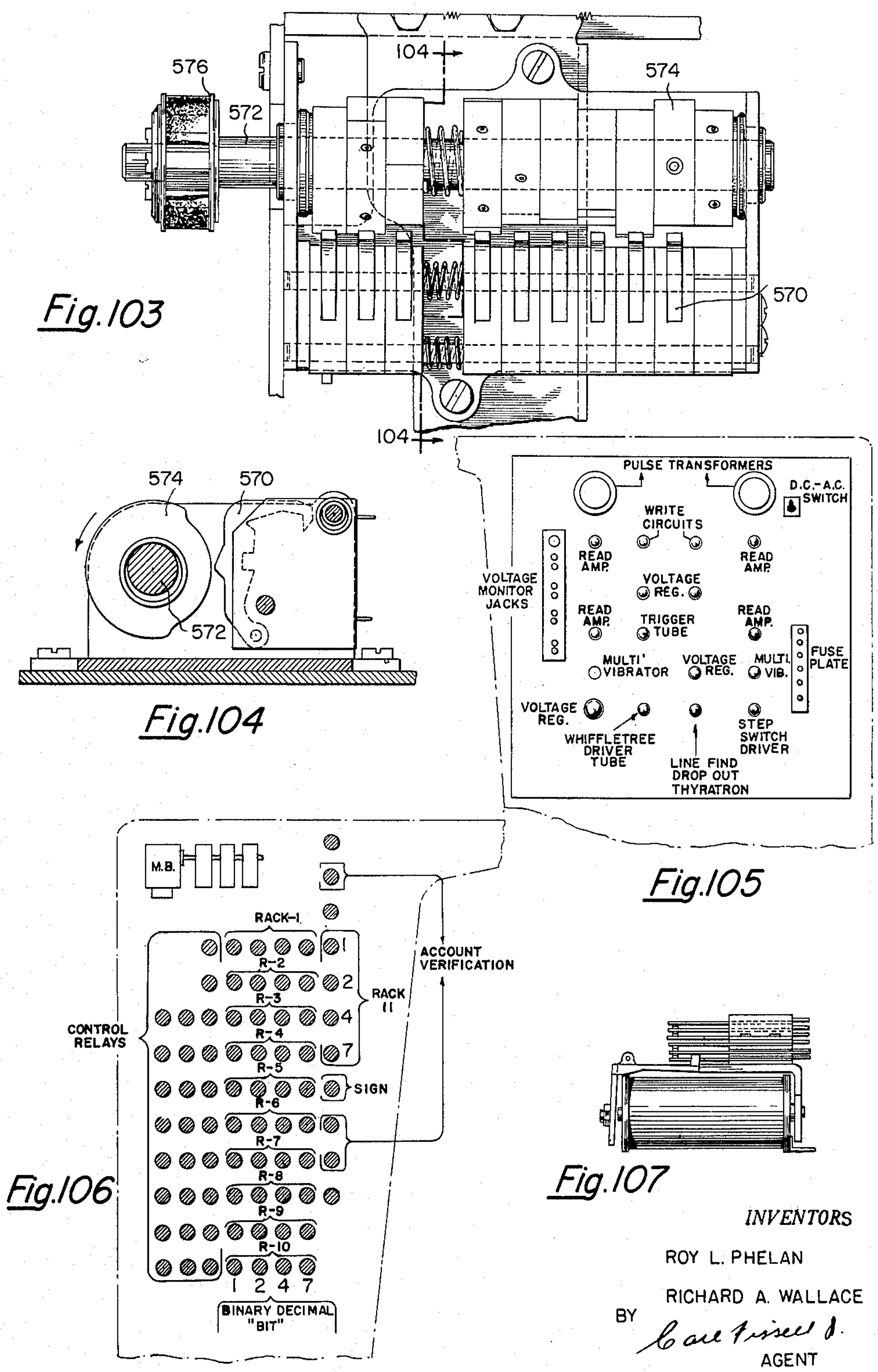
Figure 108:
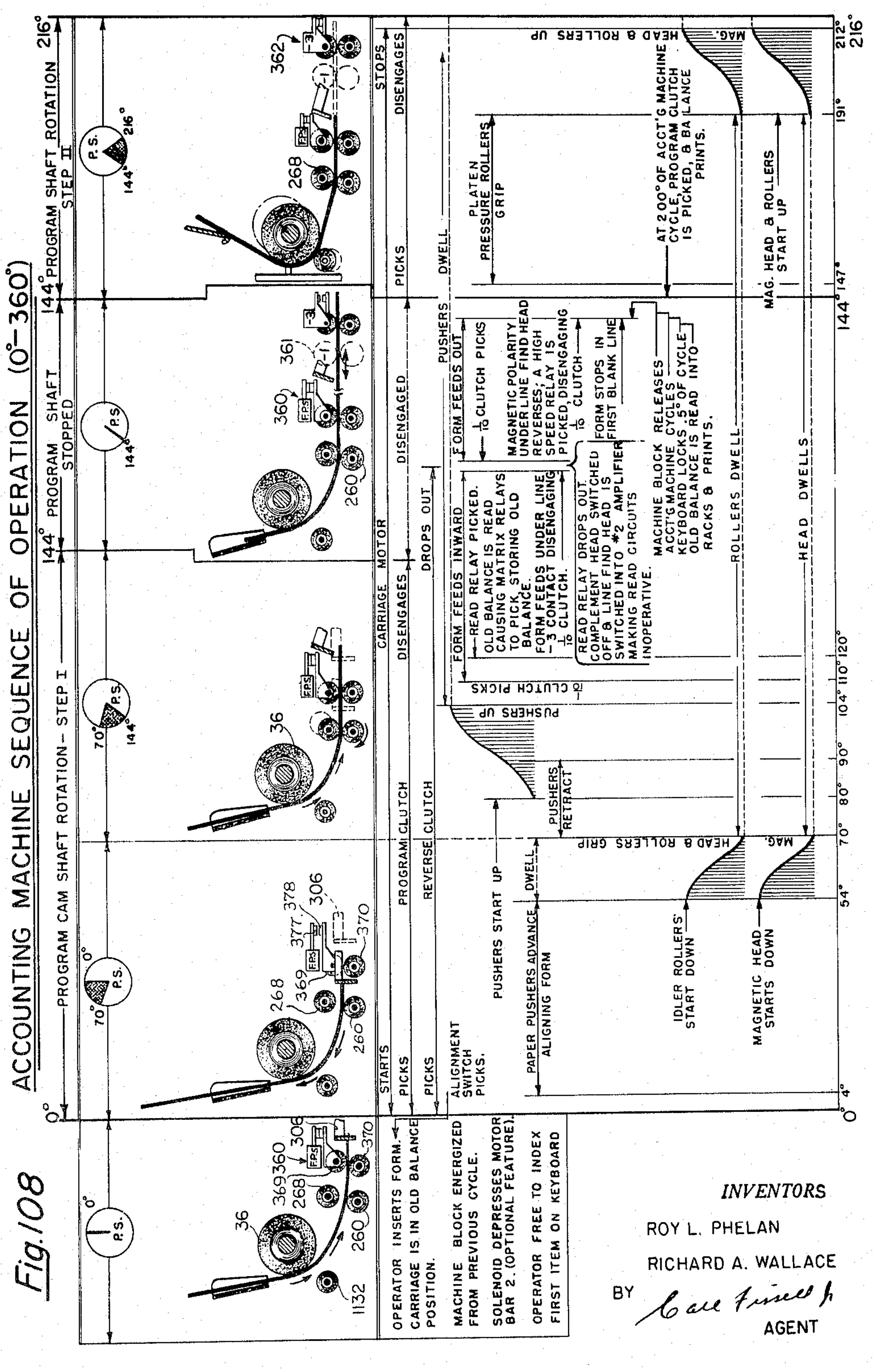
Figure 109:
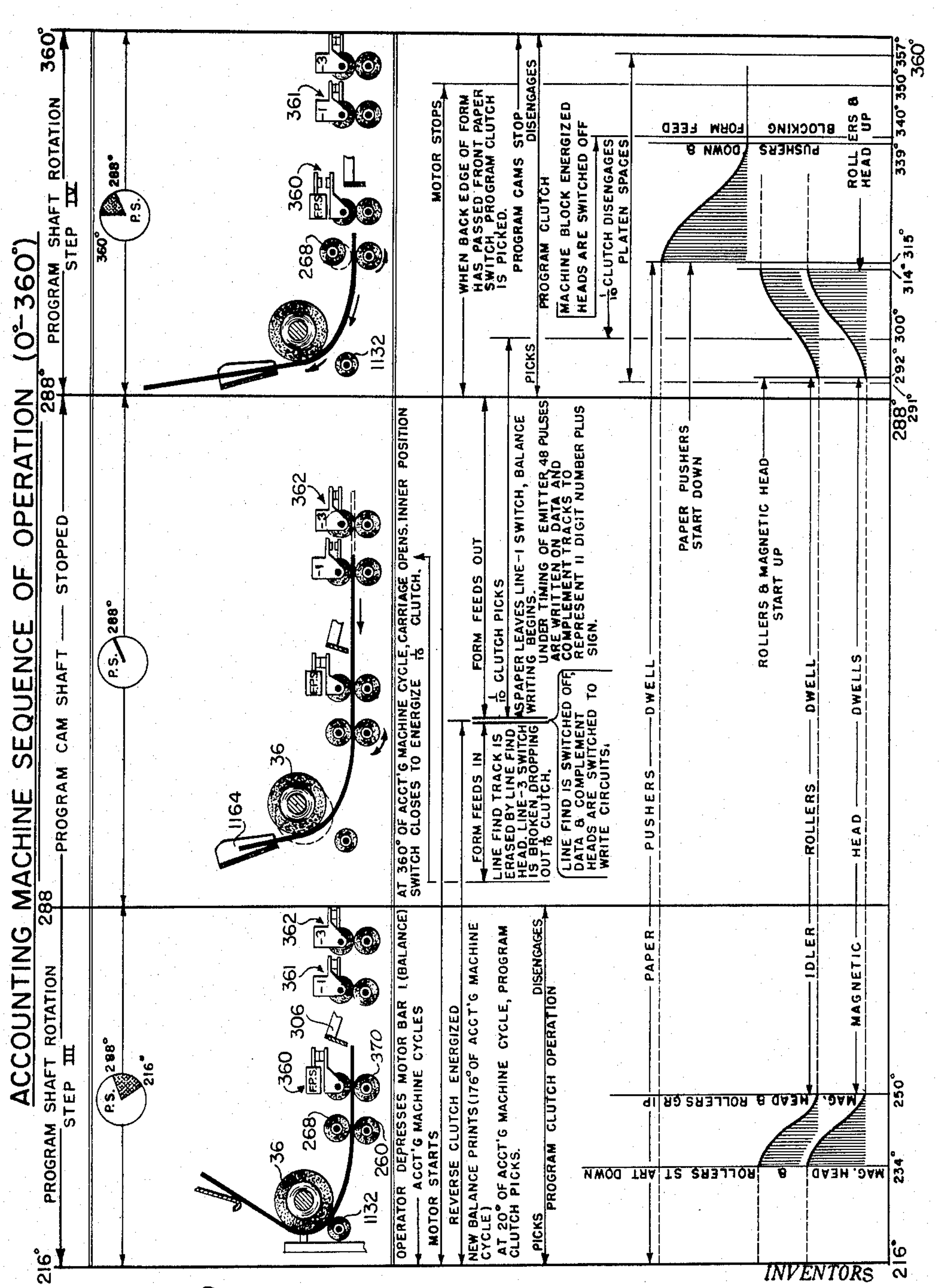
Figure 115:
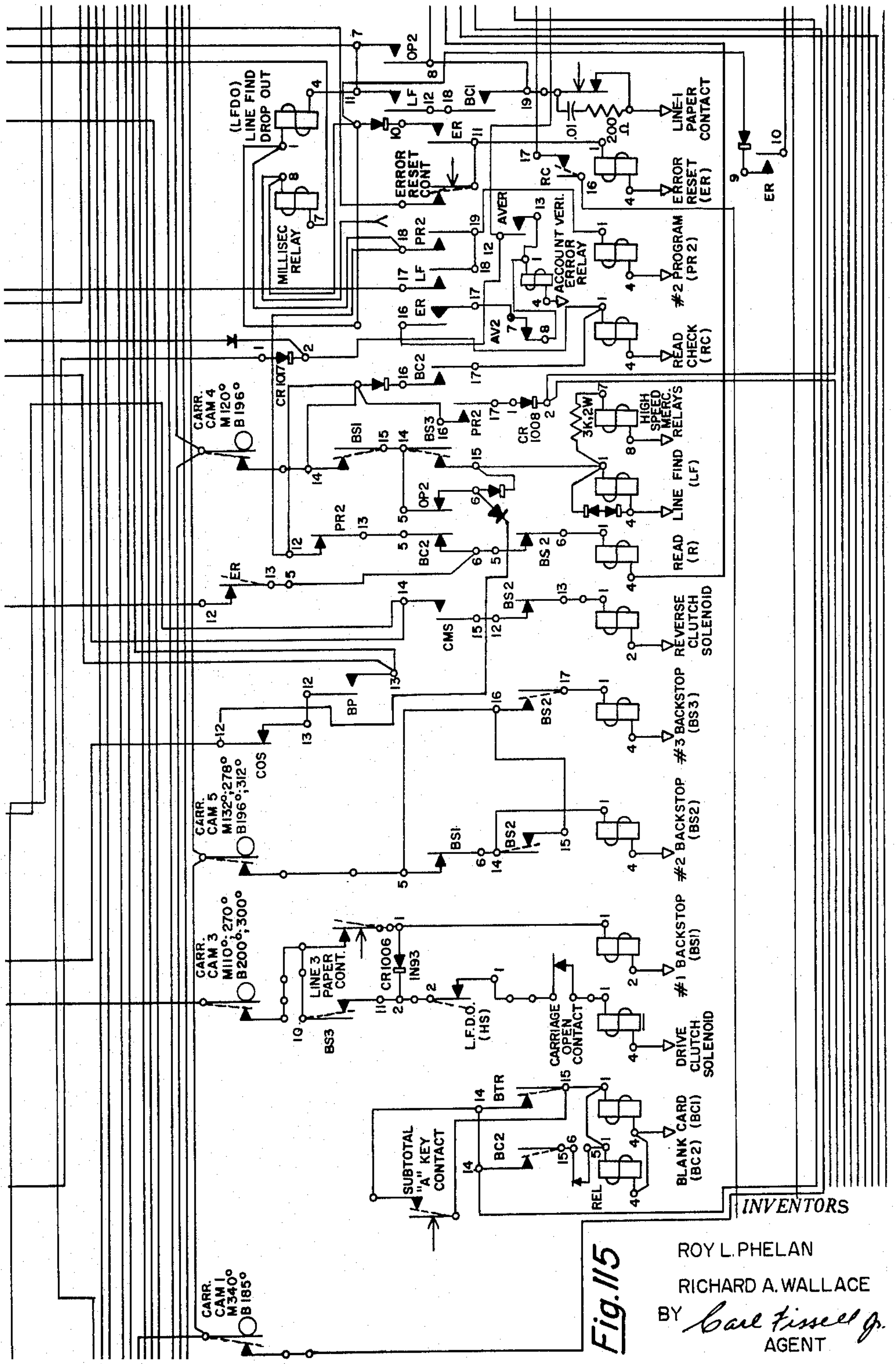
Figure 116:
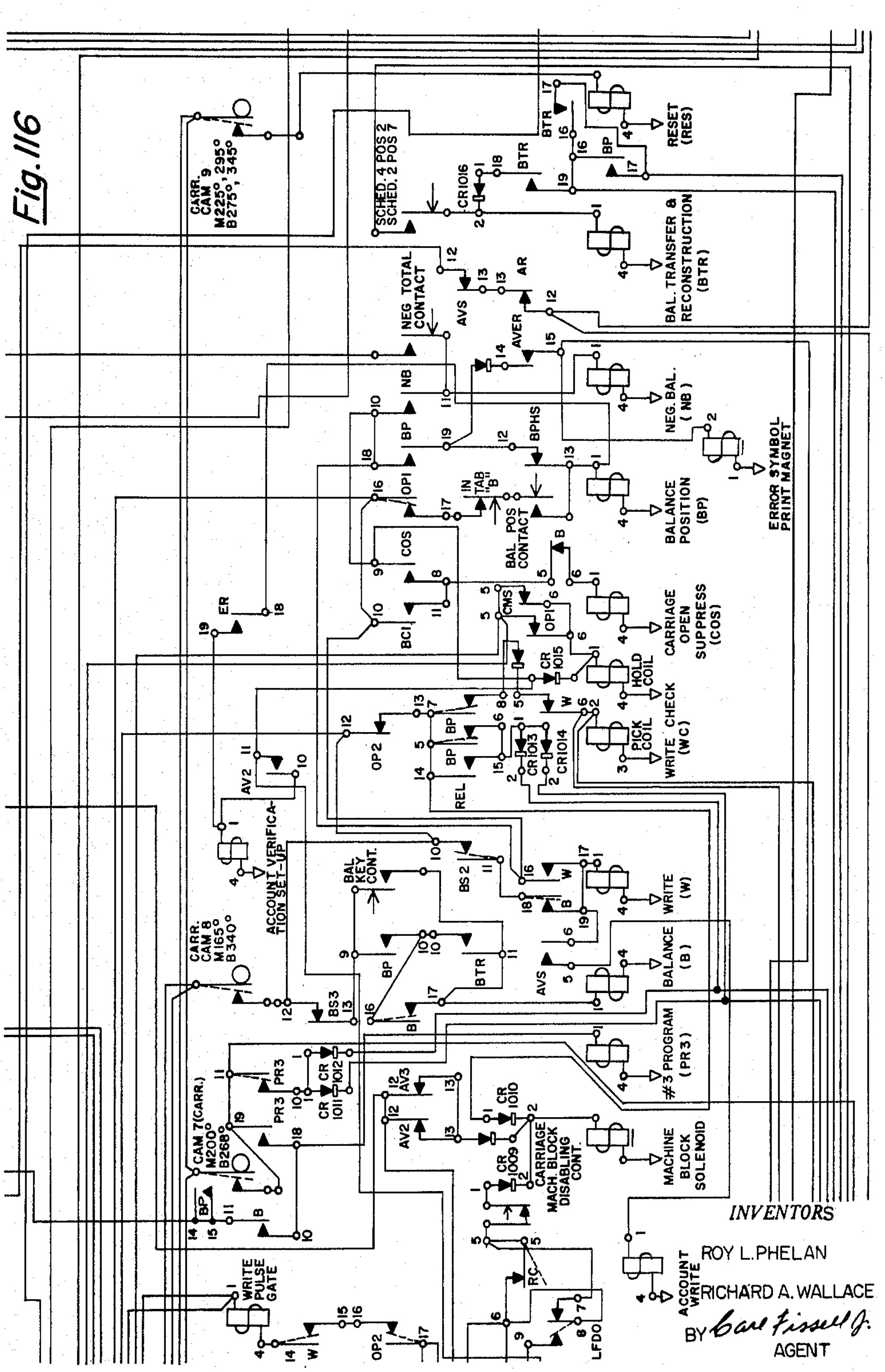
Figures 117, 118:
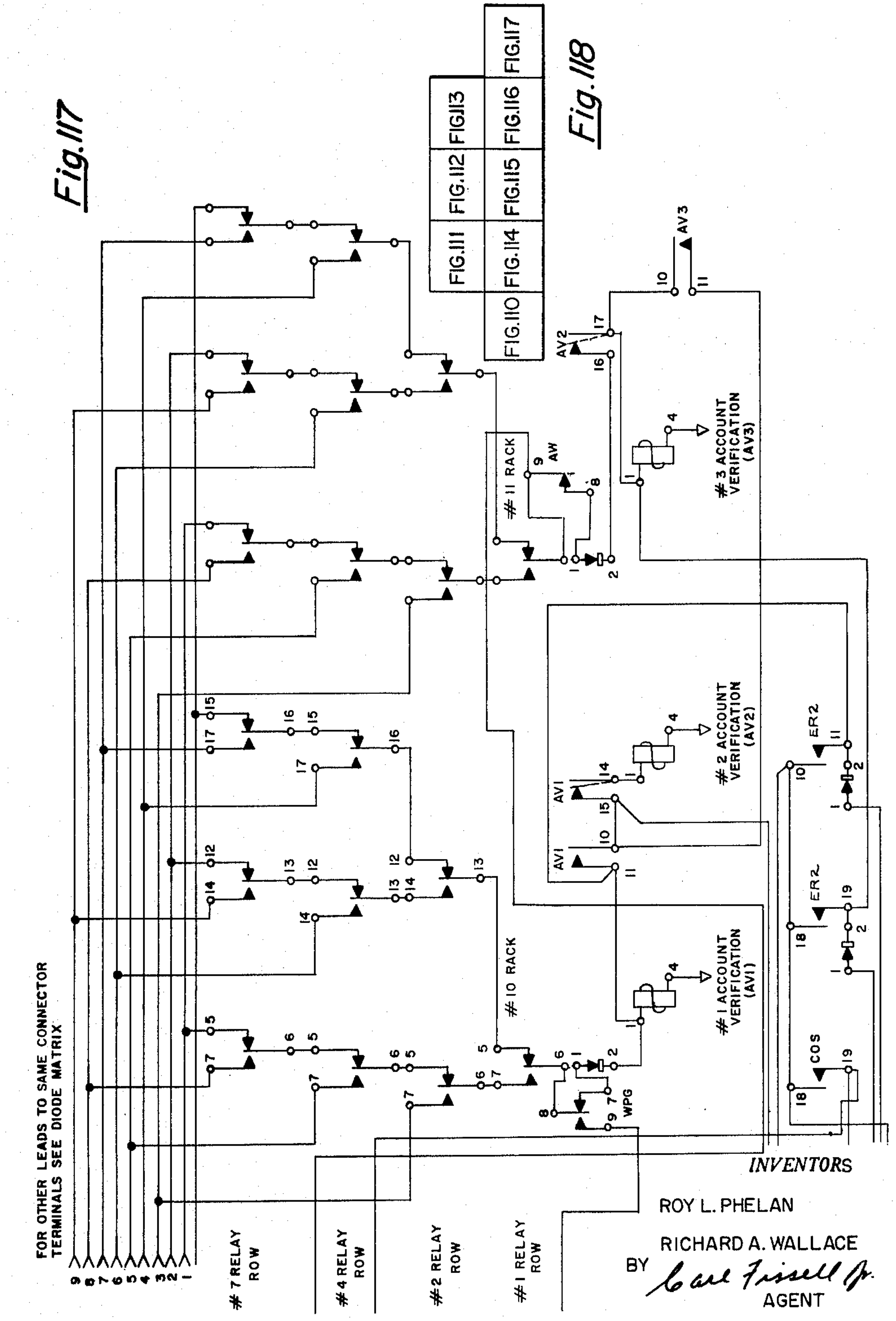

FIG. 39*a* is a detail of one of the switch block tensioning springs of the cam assembly, the view being taken along the line 39*a*—39*a* of FIG. 39;

FIG. 40 is a front view of the carriage program cam shaft showing the mechanical and electrical program cams thereon;

FIG. 41 is a sectional view taken along the line 41—41 of FIG. 40 and showing the paper pusher camming mechanism;

FIG. 42 is a sectional view taken along the line 42—42 of FIG. 40 and showing the cam shaft position indicator;

FIG. 43 is a sectional view taken along the line 43—43 of FIG. 40 and showing the feed roller cams;

FIG. 44 is a sectional view taken along the line 44—44 of FIG. 40 and showing the auto-reset and auxiliary paper spacing cams;

FIG. 45 is a sectional view of the cams of FIG. 44 taken along the line 45—45 of FIG. 44;

FIGS. 46 through 50, inclusive, are views of timing charts illustrating the functional operation with respect to time of the various cams on the carriage program cam shaft of FIG. 40;

FIG. 51 is an enlarged sectional view of the electrical timing cams on the carriage program cam shaft taken axially along the shaft;

FIGS. 52 through 65, inclusive, are views taken cross sectionally at successive positions along the carriage program cam shaft and illustrating the various cams of the electrical program cam shaft;

FIG. 65*a* is a view of an electrical timing chart for the cams of FIGS. 52 through 65, inclusive;

FIG. 66 is a front view similar to FIG. 8 but showing the paper feed drive roller assembly in slightly enlarged scale;

FIG. 67 is an enlarged sectional view taken along line 67—67 of FIG. 8 and showing the electromagnetic sensing assembly of the present invention;

FIG. 67A is a view similar to FIG. 67 but showing the parts in another position of their movement;

FIG. 68 is a sectional view of the sensing assembly taken along the line 68—68 of FIG. 67;

FIG. 69 is a fragmentary view in side elevation of one of the sensing heads of the assembly shown in FIG. 68;

FIG. 70 is an enlarged fragmentary top view of the document engaging idler rollers and document alignment pushers shown in FIG. 7;

FIG. 71 is an enlarged front view of the idler rollers and document pushers of FIG. 7, the view also being similar to but omitting parts of FIG. 8;

FIG. 72 is a side view partly in section, of the idler roller camming mechanism and taken along line 72—72 of FIG. 71;

FIG. 73 is a view similar to FIG. 72 but showing the mounting of the paper pusher thereon;

FIG. 74 is an isometric view of one of the carriage paper pusher and pressure roller assemblies;

FIG. 75 is a vertical sectional view of the carriage of the machine unit taken along line 75—75 of FIG. 7 and illustrating the program unit control tray, the modified spacing mechanism, the auxiliary spacing mechanism, the automatic resetting mechanism and the paper carrier;

FIG. 76 is a front elevational view of the right and left end sections of the carriage taken along the line 76—76 of FIG. 75 and showing the platen in down position;

FIG. 77 is a right side elevational view of the paper carriage control mechanism;

FIG. 78 is a view illustrating a different position of the movable parts of the carriage mechanism of FIG. 77;

FIG. 79 is an enlarged front elevational view of the right and left end sections of the carriage including the journal roll mechanism, the modified spacing mechanism and the automatic resetting mechanism, and showing the platen in raised or open position;

FIG. 80 is a right side view partly in section of the auxiliary spacing mechanism in its retracted or rest position taken along the line 80—80 of FIG. 79;

FIG. 81 is a plan view of the mechanism of FIG. 80 taken along the line 81—81 thereof;

FIG. 82 is a view similar to FIG. 80 but showing a lesser number of parts and by dotted and full line two positions of the parts;

FIG. 83 is a side elevation of the operating elements of the spacing disabling mechanism of the present invention showing the spacing pawl in operating position;

FIG. 84 is a view of a portion of apparatus of FIG. 83 showing by dotted and full lines the movement of the spacing pawl to disabled position so as to prevent spacing;

FIG. 84*a* is an isometric view of the disabling linkage actuating mechanism;

FIG. 84*b* is a fragmentary view of the automatic resetting mechanism showing the mechanism retracted;

FIG. 84*c* is a sectional view of the automatic resetting mechanism showing the reset bar in its full forward position, and the major diameter of its cam forcing the pressure rollers up against the platen;

FIG. 85 through 86*c* are fragmentary views of the automatic resetting mechanism illustrating the operational step by step movement of the parts thereof from the open carriage position to the closed carriage position;

FIG. 87 is a cross sectional view of the auxiliary journal roll mechanism taken along the line 87—87 of FIG. 79;

FIG. 88 is a side view partly in section of a portion of the mechanism of FIG. 87 showing by full and dotted lines the relative movement of certain of the parts thereof;

FIG. 89 is a perspective view of certain elements associated with and controlled from the keyboard for actuating the accounting machine motor starting switch;

FIG. 90 is a fragmentary view in front elevation of the keyboard illustrating the key latching and unlatching means and an item counter associated therewith;

FIG. 91 is a perspective view of the item counter and its actuating linkage shown in FIG. 90;

FIG. 92 is a side elevation of the right side frame of the accounting machine illustrated herein and showing the auxiliary supporting frame and the relative disposition thereon of the various control switches which are employed with the present invention;

FIG. 93 is a plan view of the switch frame assembly along the line 93—93 of FIG. 92;

FIG. 94 is a fragmentary view illustrating the balance key motor bar linkage and showing by dotted and full lines two positions of the parts;

FIG. 95 is a detail of the balance switch mechanism;

FIG. 96 is a fragmentary view partly in section, illustrating the automatic check motor bar switch mechanism and solenoid control linkage;

FIG. 97 is a fragmentary view showing the sub-total A key linkage and switch mechanism therefor and indicating by dotted and full lines two positions of the parts;

FIG. 98 is an isometric view of a portion of the rear side of the accounting machine carriage and with the control panel broken away to illustrate the tappet control solenoid mechanism, the in-tab switch mechanism and various electrical control panel switch apparatus of the present invention;

FIG. 99 is a partial front view of the solenoid operating mechanism for interrupting the operation of the cycling parts of the base structure of the machine;

FIG. 100 is a side view of the cycling interrupting mechanism of FIG. 99 taken along the line 100—100 thereof;

FIG. 101 is a sectional view of the cycling interrupting mechanism taken along line 101—101 of FIG. 99 and showing by dotted and full lines two positions of the actuating linkage therefor and the cam for driving the linkage;

FIG. 102 is a side view of the accounting machine timing cam mechanism;

FIG. 103 is a plan view of the accounting machine timing cam assembly along the line 103—103 of FIG. 102;

FIG. 104 is an enlarged detail view of the camming mechanism of FIG. 103 taken along line 104—104 thereof;

FIG. 105 is a view of the monitoring panel in the interior of the supporting desk and visible when the door to the right side thereof is opened;

FIG. 106 is a diagrammatic view of the relay assembly in the interior of the supporting desk and visible when the door to the left side thereof is opened;

FIG. 107 is a side elevation of a relay of the type used in the illustrated embodiment of the invention;

FIGS. 108 and 109 are diagrammatic flow charts of the sequence of operation of the accounting machine constituting the illustrated embodiment of the invention;

FIGS. 110 through 117, inclusive, are wiring diagrams of the electrical and mechanical control and operating circuitry for the present invention;

FIG. 118 is a chart of the various FIGS. 110 through 117, inclusive, enabling the proper orientation of these views with respect to one another; and FIGS. 119 to 122, inclusive, are schematic circuit diagrams of components of the electrical system for explaining the read, write and erase operations thereof.

The embodiment of the invention illustrated and described herein is designated as an accounting apparatus primarily for bank operations, but it is to be understood that the invention has other applications and may be embodied in other forms for such purposes. Referring to FIGS. 1 and 2, the illustrated embodiment of the invention comprises, in general, a desk unit 10 upon which is supported an accounting machine unit 12. In addition to serving as a support for the machine unit, the desk also functions, as hereinafter described, to house electrical components and circuitry operatively associated with the machine unit. The wiring connections between the two units are not shown in FIGS. 1 and 2.

The machine unit 12 is composed in general of two major parts, a stationary base portion or structure 14 and a movable upper portion or carriage 16. The base and carriage portions of the illustrated embodiment of the invention are similar in exterior configuration and to some extent internally to the accounting machine disclosed in the United States patent to Butler No. 2,629,549 assigned to the same assignee as the present application. The invention is not limited to such structural embodiment and it is to be understood that the features of the invention may be incorporated in equipment of distinctly different design.

Figure 3:
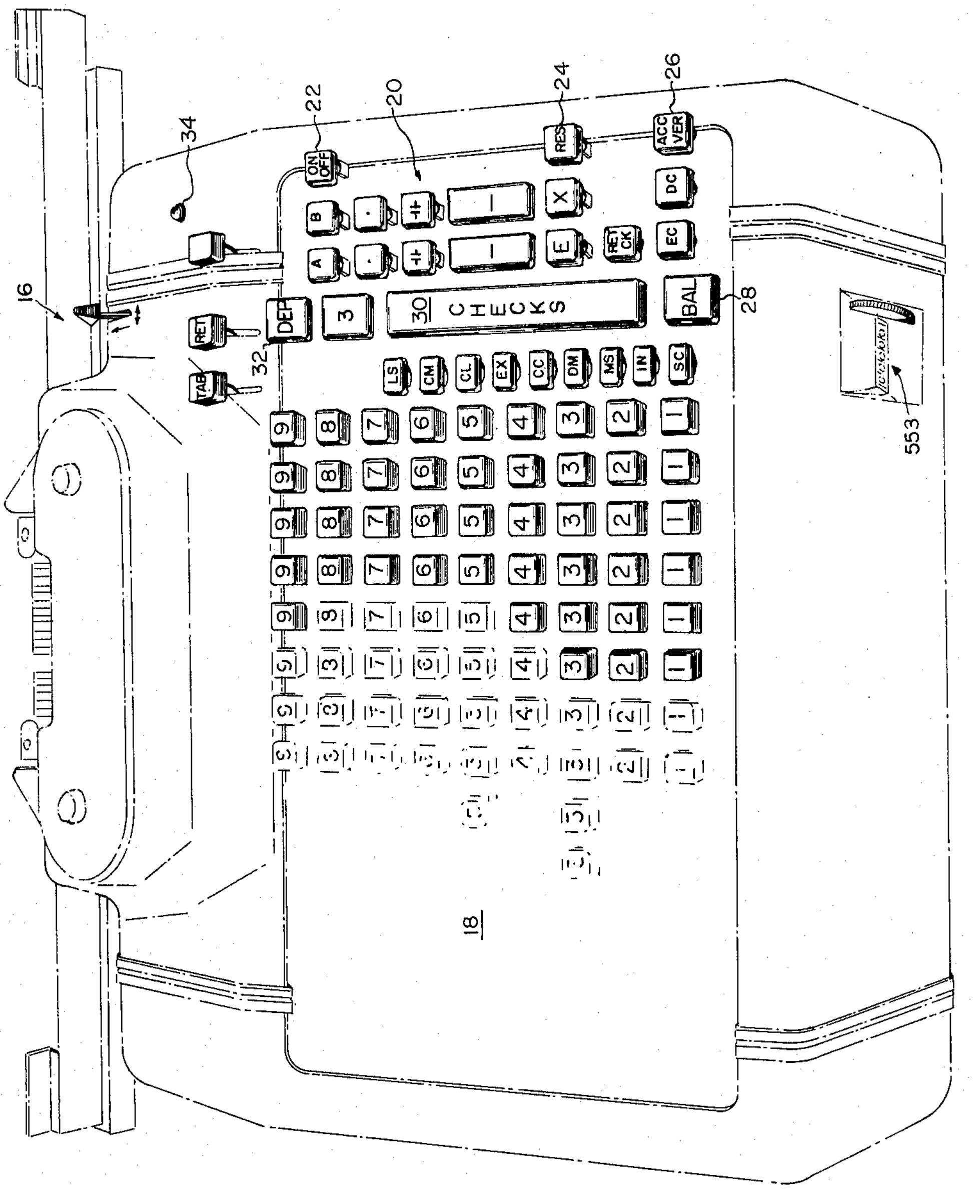
FIG. 3 is a plan view of the keyboard of the accounting machine unit of the illustrated embodiment of the invention with the added function keys being shown in full while the standard keyboard keys are shown partially in phantom and partially in full.

The base structure 14 contains a keyboard 18 for indexing numerical values into the machine and an additional set of control keys identified at 20 for special operations, the latter being located along the right margin of the keyboard. Included in the special control keys are several which have particular bearing on the present invention. Referring more particularly to FIG. 3, these are an on-off key 22, a reset key 24, an account verification key 26, a balance motor bar 28, a check motor bar 30 and a deposit motor bar 32. Additionally, there is provided an electric light indicated at 34 for indicating a "ready" condition for the operation of the machine.

The carriage 16 is mounted for travel on the base structure from left to right and return, as viewed by the operator, and includes automatic form feeding, information sensing and altering and certain machine controlling mechanisms enabling the carriage to be controlled by the record member inserted therein. The carriage may be thought of as comprising two major sub-assemblies. One of these is the exterior structure which is generally similar to that described in the Butler Patent No. 2,629,549, including a platen assembly generally indicated at 36, an electromechanical control panel referred to as a program tray 38, differently colored indicating lamps 40 and 41, extended side covers 42—42 and paper guide or chute 44. Interiorly the carriage structure comprises a form or document handling mechanism for automatically feeding the record medium into and out of the carriage and means for sensing recorded data stored magnetically or otherwise on the record member. As viewed most clearly in FIGS. 6 and 7, major components of the carriage include a drive motor 46, a main program cam shaft 48, a series of front feed rollers mounted on a common axis and generally indicated at 50, paper drive rollers generally indicated at 52, and paper sensing electrical switches generally indicated at 54. The carriage is connected electrically to the base structure 14 of the machine by means of a flexible cable 56, the cable permitting travel of the carriage while maintaining electrical connection between the movable carriage and the stationary base portion.

Various types of documents may be used with the invention, and those herein illustrated pertain more particularly to the banking field. Essentially the documents or record members are so formed that they may receive printed material from type bars for visible inspection and also to receive latent images, usually coded, on an erasable memory portion of the document. More specifically the documents may be of the usual form customarily found in banking institutions with the addition of a portion constituting an erasable memory or storage and formed of magnetizable material or the like. Three types of record media or documents are shown in FIGS. *4a*, *4b* and *4c*. These documents are shown partially rolled about the platen assembly 36. The platen assembly of the embodiment of the invention is preferably split into two sections, one of which is relatively long and identified at 58, and a shorter section identified at 60. These two platen sections are mounted for rotation about a common axis, but as will be described hereinafter, may be independently rotated with respect to one another.

Figure 4A:
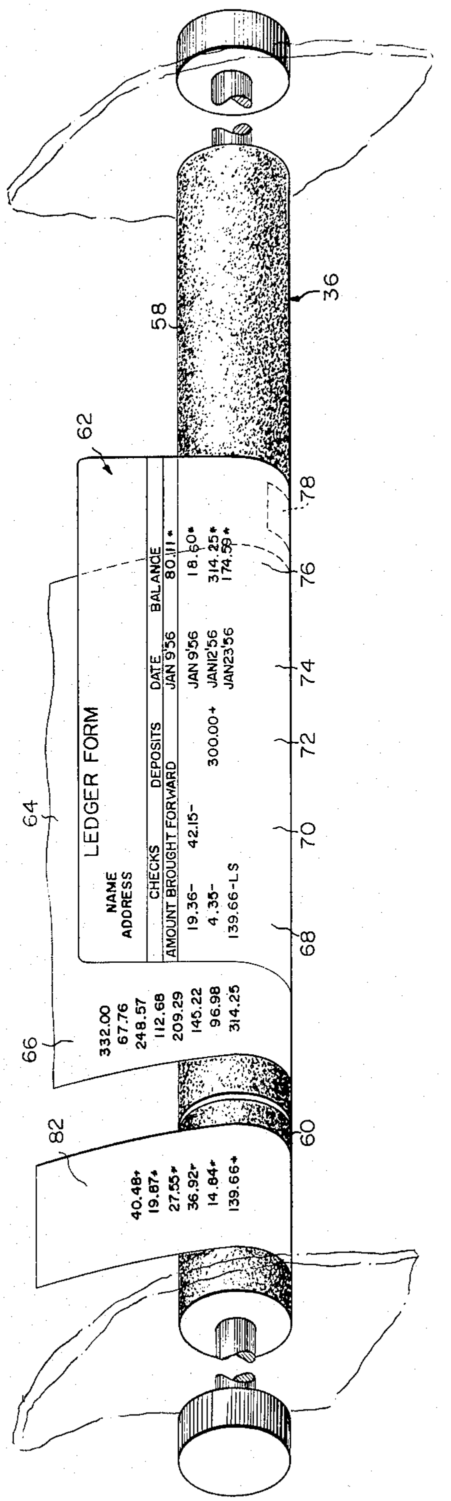
FIGS. 4A, 4B and 4C are diagrammatic illustrations of samples of a ledger form, a statement form and a combined ledger-statement form, respectively, which may be employed with the present invention.

FIG. 4A shows a ledger form 62 partially wrapped around the platen section 58. Under the ledger form and between the same and the platen is a carbonized journal web or sheet 64 which may underlie all but the right hand portion of the ledger form, as shown. Reading from left to right on the overlapping journal sheet and ledger form, there is provided a column on the journal sheet indicated at 66 for dates and old accounting balances, only the old balances being illustrated in FIG. 4A. On the ledger form 62 there are provided two check entering positions 68 and 70, a deposit entry position 72, and finally a position for dates 74 and new balances 76.

Of particular significance is the provision for an erasable memory or storage portion on the form. The ledger form 62 carries an erasable memory portion upon which information may be stored and later removed. For banking purposes, this memory portion may temporarily store the last new balance which then becomes the old balance when a new transaction is entered on the ledger form. In the illustrated embodiment of the invention, the information storage portion of each document is preferably located on the back or reverse side thereof and in the ledger form illustrated in 4A, constitutes a coating of magnetic material indicated in dotted outline at 78. This magnetic portion may take the form of a narrow elongated column, as will be more particularly described in connection with FIG. 5A, and as shown in FIG. 4A, the magnetizable column is located along the right margin beyond the journal sheet or web 64.

Figure 4B:
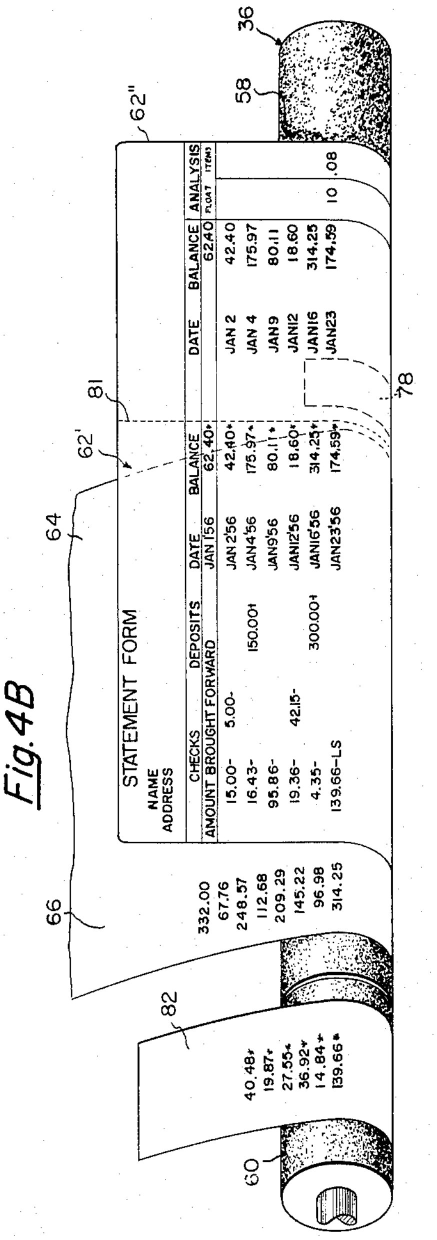
Figure 4C:
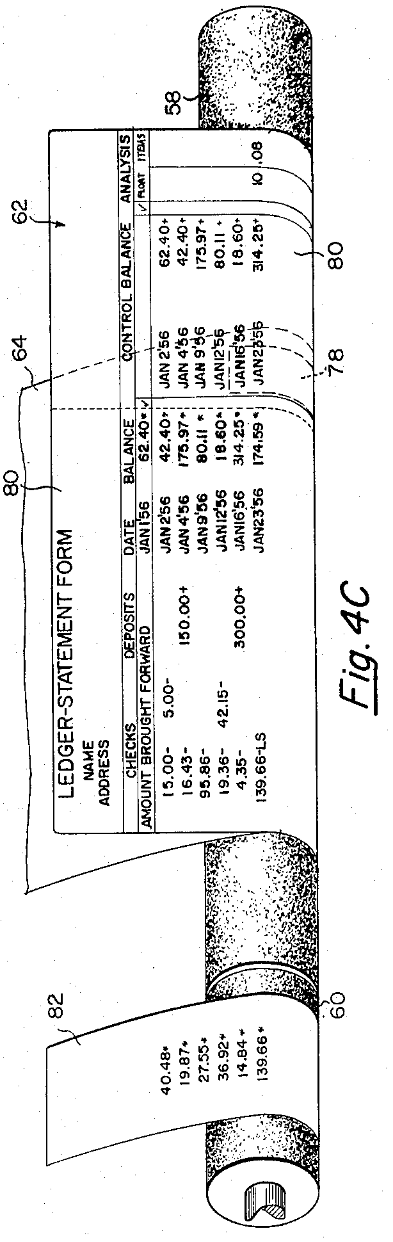

FIGS. 4B and 4C show different forms of banking documents associated with the platen assembly. In FIG. 4B a statement form identified at 62′ is shown. The statement form of FIG. 4B contains a stub or removable portion identified at 62″, the line of severance therefor being indicated at 81. For the purpose of this invention, the magnetic column or strip 78 is preferably placed on the back of the removable portion 62″ of the statement near the line of severance.

FIG. 4C shows an improved combined ledger-statement form generally indicated at 80 and having the legends at the top similar to those previously described in separate ledger and statement forms. The layout of the columns and the magnetic strip are the same as previously described on the conventional forms. The titles of the columns on the left of the magnetic strip 78 of the improved combined form are the same as on the conventional type. However, the balance printed on the stub is the old balance rather than the new. The column headed "analysis" of the stub is the same as on the conventional statements. The journal sheet or web 66 used with the improved combined statement form is in a different position from that shown in FIGS. 4A and 4B and, as indicated, it is moved to the right until its left edge is substantially flush with the left edge of the improved ledger-statement form and the right edge extends under the stub portion sufficiently far so that the old balances will print on the journal web but the amounts in the analysis column will not.

In all three views, FIGS. 4A, 4B and 4C, the shorter platen section 60 may contain a web 82, such as adding machine tape, for listing all check entries for obtaining a sub-total.

Figure 6:
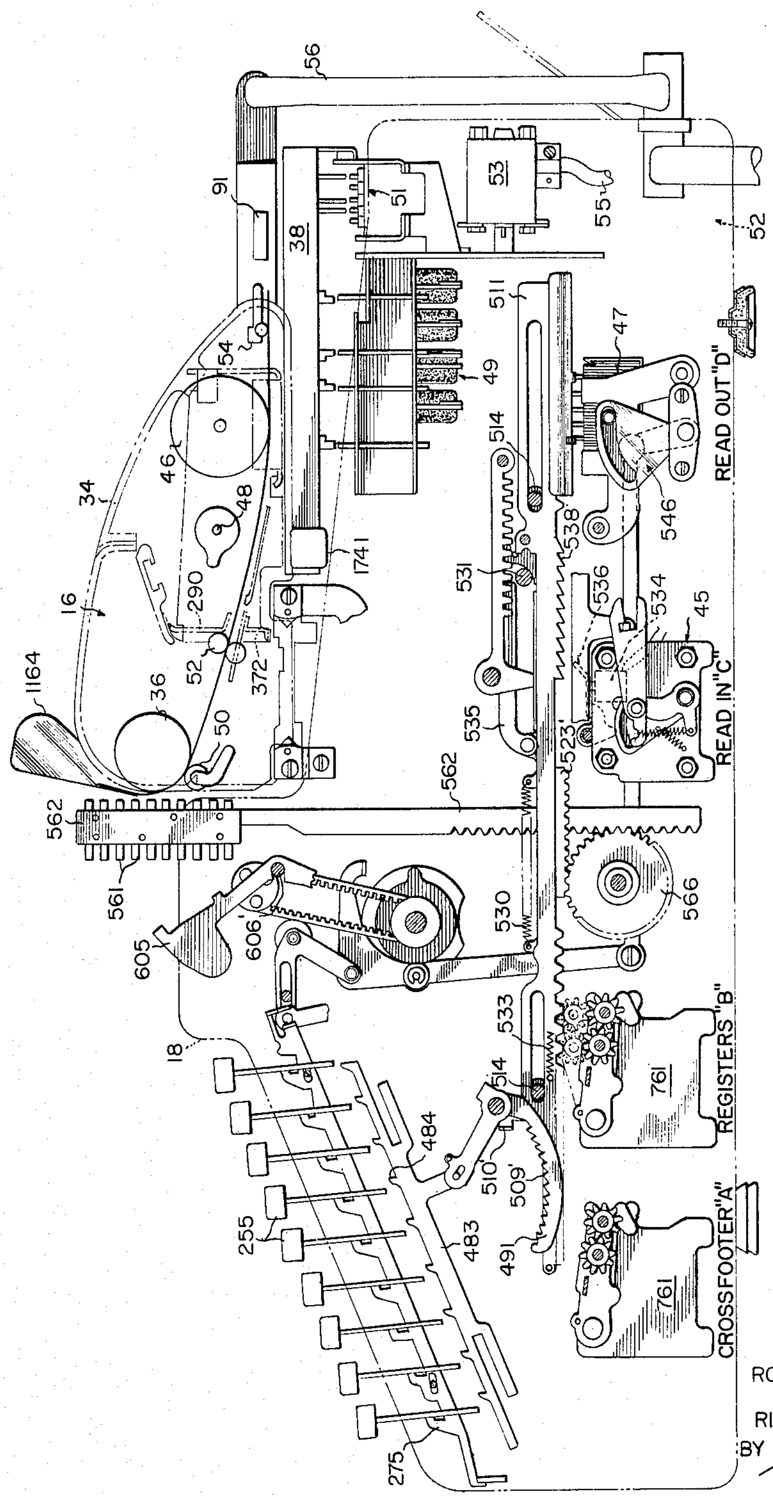
FIG. 6 is a vertical sectional view through the accounting machine unit of the illustrated embodiment of the invention showing the differential stop means and the differential actuator means controlled thereby, but with numerous other elements being omitted for purpose of clarity.

FIG. 6 is an internal vertical sectional view through the machine unit 12, and as previously mentioned, many of the parts of the machine are similar to those disclosed in the Butler Patent 2,629,549. For a detailed understanding of the construction of operation of these parts, reference may be had to the Butler patent. In order to expedite cross-referencing, the reference characters employed in the instant disclosure will, to the extent that it is practical, be identical to those designating similar elements in the above identified patent to Butler.

Referring again to FIG. 6, the printing types 561 are carried by a plurality of vertically extending print bars 562 and associated therewith are an equal number of horizontally extending actuator racks, 511, all of which lie in planes parallel to that of the drawing. The actuator racks are forwardly and rearwardly slidably supported by two rods 514—514 riding respectively in slots in the racks and extending transversely across the machine to have their ends fixed to the machine side plates. As may be seen from FIG. 6, the print bars carry at their upper ends a plurality of type slugs 561 which are movable transversely of the bars. Forwardly of the bars, and pivoted about a shaft 606, are the hammers 605, each associated with an individual one of the print bars, and being capable upon striking an aligned slug in its associated print bar to cause the slug to leave an impression upon a recording medium interposed between the slugs and the platen assembly 36.

Each rack 511 is urged by a spring to the left, the spring being identified at 533 in the aforesaid Butler patent, and this movement performs the functions of setting its associated type bar in the desired position for printing. For carrying out this function the rack 511 has an attached plate 523 having teeth in mesh with a gear 566 which in turn meshes with the rack teeth on a selected one of the print bars 562. When a key 255 of the keyboard 18 is depressed, the lower end of its stem will be engaged by the corresponding stop 484 on the slide 483 to arrest the slide and the connected differential stop sector 491 in a differential position appropriate to the value of the particular key 255 which has been depressed. The stop sector 491 has a series of spaced stop shoulders 509 adapted to cooperate with a laterally disposed lug 510 on the actuator rack 511. When the lug 510 engages a selected shoulder 509, the rack 511 is stopped in the position corresponding to the key number depressed. During the movement of each rack 511, its associated gear 566 is rotated and elevates its print bar 562. In this manner the type slug for the selected number is elevated to the position where it may be struck by its associated hammer 605 when the latter is swung about its pivotal axis.

Associated with the parts so far defined in the base structure of the machine unit are two crossfooters identified at 761. These appear with similar reference characters in the aforesaid patent to Butler. The first crossfooter 761 is identified as a front crossfooter "A" and the second similarly identified is referred to as register "B." Further associated with the equipment in the base structure of the machine unit are read-in and read-out devices generally identified at 45 and 47 respectively. The read-in unit identified at 45 is disclosed and claimed in copending application of Bradshaw et al., Serial No. 492,186, filed March 4, 1955, now Patent No. 2,822,752, for "Indicating Apparatus," and assigned to the same assignee as this application. The read-out device identified by the general reference character 47 is disclosed and claimed in copending application of Deighton et al., Serial No. 492,232, filed March 4, 1955, now Patent No. 2,914,759, for "Data Storage, Read-Out and Transfer Apparatus," and assigned to the same assignee as this application. These read-in and read-out devices do not form a part of the present invention except insofar as they serve respectively as media for transferring incoming electrical pulses to rack positions and for converting rack positions to electrical signals. The read-in device 45 serves to stop the racks 511 in accordance with received electrical signals and convert such signals to representative rack positions determining the numbers to be printed, and the read-out device 47 serves to sense rack positions representing numbers to be printed and convert the number represented by such position into electrical signals.

Identified in FIG. 6 by the general reference character 49 is a bank of tappet control solenoids capable of cooperating with depending pins on the under side of the control panel 38 of the carriage. The construction and operation of this component will be described in detail hereinafter. The component employed in the illustrated embodiment of the invention is described and claimed in copending application to Banik et al., Serial No. 492,266, filed March 4, 1955, now Patent No. 2,836,355, for "Remote Function Control System," and assigned to the assignee of the present application. Similarly, there is provided a bank 51 of electrical control panel switches which are arranged to cooperate with the carriage and sense tabular positions thereof. This device and its operating characteristics are described in more detail hereinafter. It is also described and claimed in copending application to Smith, Serial No. 445,870, filed July 26, 1954, now Patent No. 2,782,287, for "Switch Mechanism," and assigned to the assignee of the present application.

The rear side of the base structure contains a horizontal row of removable pluggable connectors generally indicated at 53, one of which is disclosed in FIG. 6. In FIG. 2, a rear panel door of the base portion of the machine has been opened to expose to view the row of pluggable connectors 53. Attached to each connector is a cable, one of which is identified at 55 in FIG. 6, which leads downwardly to the desk unit 10 for electrical connection with the control circuitry and power supply contained therein. The operating connections between the various electrical components of the apparatus are disclosed in the circuit diagrams embodied in FIGS. 110 through 122 hereof where reference may be had for a detailed description.

*General machine operation*

As an aid to a fuller understanding of the subject invention a brief description of the general operational characteristics of the dual document accounting machine is provided in advance of the detailed description. This general description is illustratively directed to banking applications.

The machine is turned on by depressing the on-off key 22. After approximately ninety seconds a green "ready" light 34 will illuminate signifying the machine is in operable condition. The carriage is opened to receive a document and tabulated to the old balance position. A ledger or statement form having a magnetizable portion thereon is selected from either a tub file or lap tray and inserted into the form guide means 1164 of the carriage. This act initiates automatic operation of the machine. From then on the document will automatically feed into the carriage, reverse its direction, and move out a sufficient distance to position the document to the first blank posting line. The carriage will close, gripping the form, and means in the carriage is provided for sensing the old balance recorded in the magnetizable portion of the document and print the old balance on the document, after which the carriage will automatically tabulate to the first check position. During this automatic cycle the keyboard is open and the amount of the first check may be indexed. As soon as the machine finishes tabulating, the first item may be posted.

If the operation requires posting only one check, the balance bar is depressed. The check amount will be printed on the document and the new balance computed, and the carriage will tabulate to the new balance position where the new balance will be automatically printed. The carriage will open and as it automatically tabulates to the old balance position, the document will automatically first move back into the carriage, reverse, and then be moved to ejected position within the chute means. The line position of the document as the printing of the new balance and the inward and outward movements of the document following the printing of the new balance are utilized for indicating on the magnetic memory portion of the document the new balance and the next available line for printing so that the document will be available for automatic pick-up of the balance and for line finding when next inserted in the machine. The operator may spend the time during automatic movement of the document to search for the next account. As soon as the document is completely out of the carriage it can be returned by hand to the file.

Should the operation require posting several items, the appropriate motor bar can be depressed as in conventional machine operation. Each of the machine's four motor bars are destination motor bars. Depression of any of them will cause the carriage to tabulate automatically to the position indicated by the motor bar named. To post the final item the balance motor bar is depressed, and the machine will behave as described above.

If the first item to be posted is a deposit, as the form is moving into the carriage the deposit key is depressed, after which the amount of the deposit can be entered into the keyboard. After automatically finding the posting line and printing the old balance, the machine will move to the deposit position ready for entry of the deposit amount.

*Carriage structure*

The improved carriage of the present machine is adapted for independent automatic operation as a unitary assembly apart from, but connected to, the stationary base structure of the type disclosed in the aforesaid Butler patent. To this end, as shown in FIGS. 6 and 7, the carriage is provided with the main driving motor 46 which is operably coupled through a gear box 84 to drive both the main program cam shaft 48 and a paper feed drive shaft 86. The motor is adapted to fit into the available space and is provided with a conventional speed governor 88, shown in detail in 25A, which is essentially a centrifugally operated switch affixed to the armature shaft and connected in series with the motor circuit. The motor may be provided with a conventional built-in speed reducer (not shown) in order that its output speed is better adapted to drive the carriage mechanisms. The electrical lead wires 90 from the motor are brought out through the carriage framework and are suitably attached to certain terminals of one of two similar terminal blocks 91—91 located at the rearward portion of the inner carriage structure. The leads are connected to a source of electrical potential which is operative as will be described under the detailed description of the machine's operation.

An emitter or contactor pulser unit 92 shown in plan in FIG. 7 is located in the inner carriage structure immediately adjacent the output side of the carriage drive motor. This emitter provides discrete pulses which are used to write the coded information onto the magnetizable portion of the documents handled by the carriage. In other words, the emitter is a synchronizing element between the paper and the pulse writing equipment.

Figure 21:
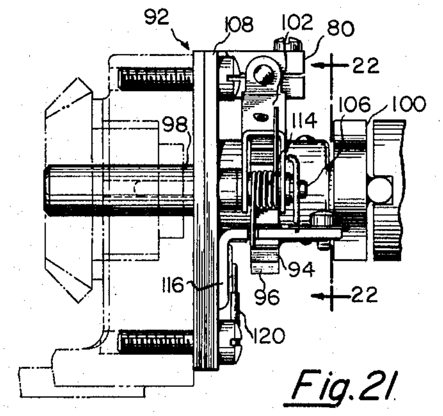
FIG. 21 is an enlarged view in elevation of the pulse emitter mechanism, the view being taken along line 21—21 of FIG. 17.
Figure 22:
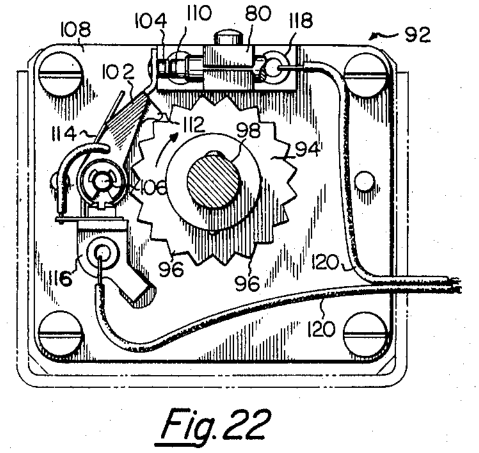
FIG. 22 is another view of the pulse emitter taken along the line 22—22 of FIG. 21.
Figure 24:
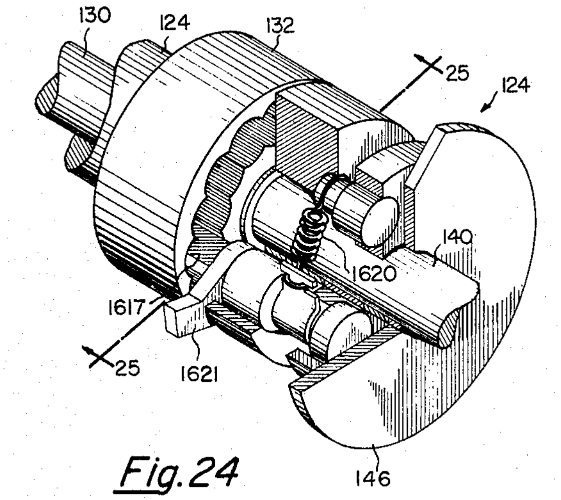
FIG. 24 is a perspective view of the clutch mechanism employed in the illustrated embodiment of the invention.

The emitter 92, shown most clearly in FIGS. 21 and 22, comprises a cam 94 which is provided with a plurality of V-shaped notches or teeth 96 formed around its periphery. The cam is securely fastened to the motor drive shaft 98. Torque is transmitted to shaft 98 from the drive motor 46 through a flexible coupling 100. A rockable U-shaped contactor arm 102 carrying a contact button 104 at its flat projecting end is pivotally mounted by means of the stud 106 disposed on one surface of a dielectric backing plate 108 which provides a supporting structure for the fixed emitter contact button 110. A wedge shaped cam follower 112 is secured to the contactor arm 102 with the apex of the wedge in engagement with the notches 96 of the cam 94. A torsion spring 114, FIG. 21, coiled within the U-shaped portion of the contactor arm and surrounding the pivot stud 106 effectively biases the arm and its contact button 104 into engagement with the fixed contact button 110. Each of the contact buttons 104 and 110 are provided with a respective electrical terminal 116 and 118 from which two separate conductive lead wires 120 are brought out through the framework where they are attached to the left terminal block 91 as shown in FIG. 7 and are thus connected to a source of electrical potential which is operative as will be described under the detailed description of the machine's operation.

In operation, torque from the drive motor 46 causes cam 94 to rotate which in turn causes the follower 112 to rock about its pivot so that contact buttons 104 and 110 make and break at a rate depending on the speed of the motor. Square, discrete electrical pulses are thus produced.

A one revolution clutch 124 is used to control the rotation of the cam shaft 48 which is the main controlling element of the carriage. FIG. 7 shows the clutch with its axis perpendicular to that of the motor and located toward the left side of the carriage.

As can be seen in FIGS. 7, 17, 23, 24 and 25, there is connected to the output side of the drive motor 46 through the emitter unit 92 a bevel gear 126 which is journaled in the right hand end portion of the gear box 84. The gear 126 is in constant mesh with a second similar bevel gear 128 secured on one end of a stub shaft 130, FIG. 23, journalled in the gear box rear transverse wall. It can thus be seen that rotation of the motor output shaft will cause gear 128 to turn. Gear 128 is secured to a housing 132 which serves as the driver of the one revolution clutch 124.

The clutch mechanism 124 employed in the illustrated embodiment of the present invention is substantially identical in construction to the one revolution clutch mechanism shown in FIGS. 144 through 147, inclusive, and as described in detail at columns 147 through 149, inclusive, of the aforesaid patent to Butler No. 2,629,549.

Figures 17, 19:
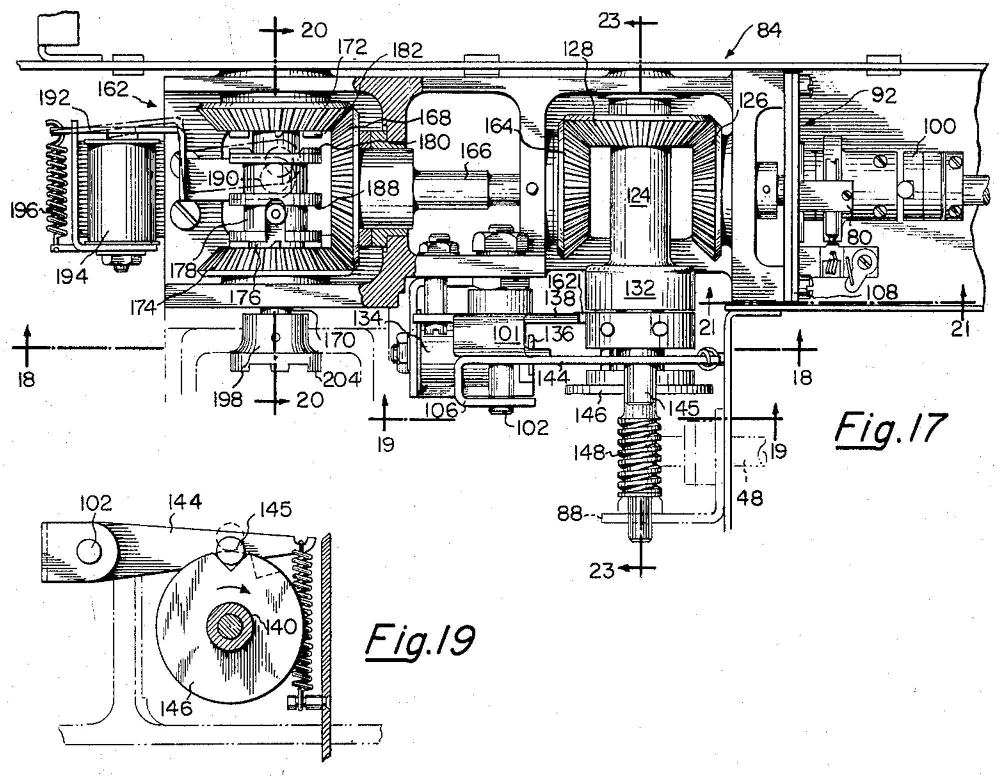
FIG. 17 is an enlarged view of the area enclosed by the dotted line section XVII of FIG. 7 and illustrates the major portion of the carriage gear box.
FIG. 19 is a detail of the one revolution drive clutch detent mechanism, the view being taken along the line 19—19 of FIG. 17.
Figure 18:
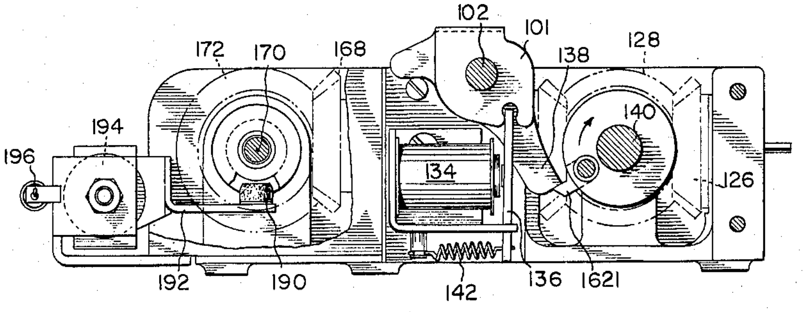
FIG. 18 is a sectional view along the line 18—18 of FIG. 17.

When used with this invention, the one revolution clutch is actuated by electrical pulses rather than by a mechanical linkage such as is shown in the Butler patent. As shown in FIGS. 17 and 18, a magnet 134 when energized actuates a clapper 136 which in turn swings link 138 away from the axis of the clutch, thereby freeing the clutch arm 1621 and allowing the clutch dog 1617, FIG. 24, under the urging of spring 1620 to engage the outer driver housing 132 with the inner driven shaft 140 in the manner shown in FIG. 25. The pulse energizing the magnet is of a few milliseconds duration. When it stops, spring 142 swings link 138 back into the path of dog clutch arm 1621. Thus when clutch arm strikes the extremity of link 138, the engagement between driver 132 and the driven shaft 140 is broken and the driven shaft comes to a stop. Counter rotation of driven shaft 140 is prevented by anti-backup link 144 having a stop 145 resting in the V notch of cam 146 shown in FIG. 19.

Figure 23:
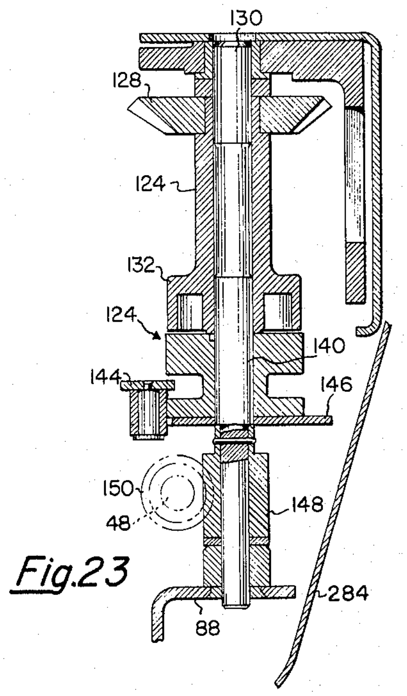
FIG. 23 is an enlarged longitudinal sectional view of the one revolution clutch mechanism taken along the line 23—23 of FIG. 17.
Figure 25:
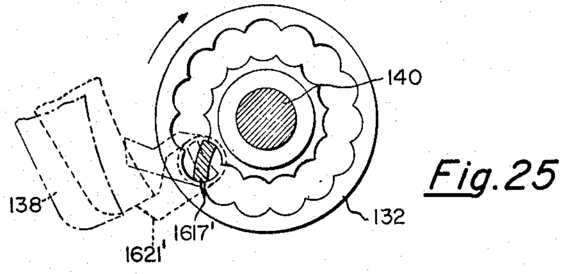
FIG. 25 is a section cut along the line 25—25 of FIG. 24 and showing by full and dotted outline the position of certain parts in the clutch and unclutch conditions of the mechanism.
Figure 25A:
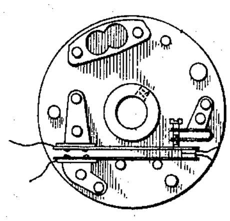
FIG. 25A is a view of the governor for the carriage drive motor mounted on the right end thereof as viewed in FIG. 7.
Figure 26:
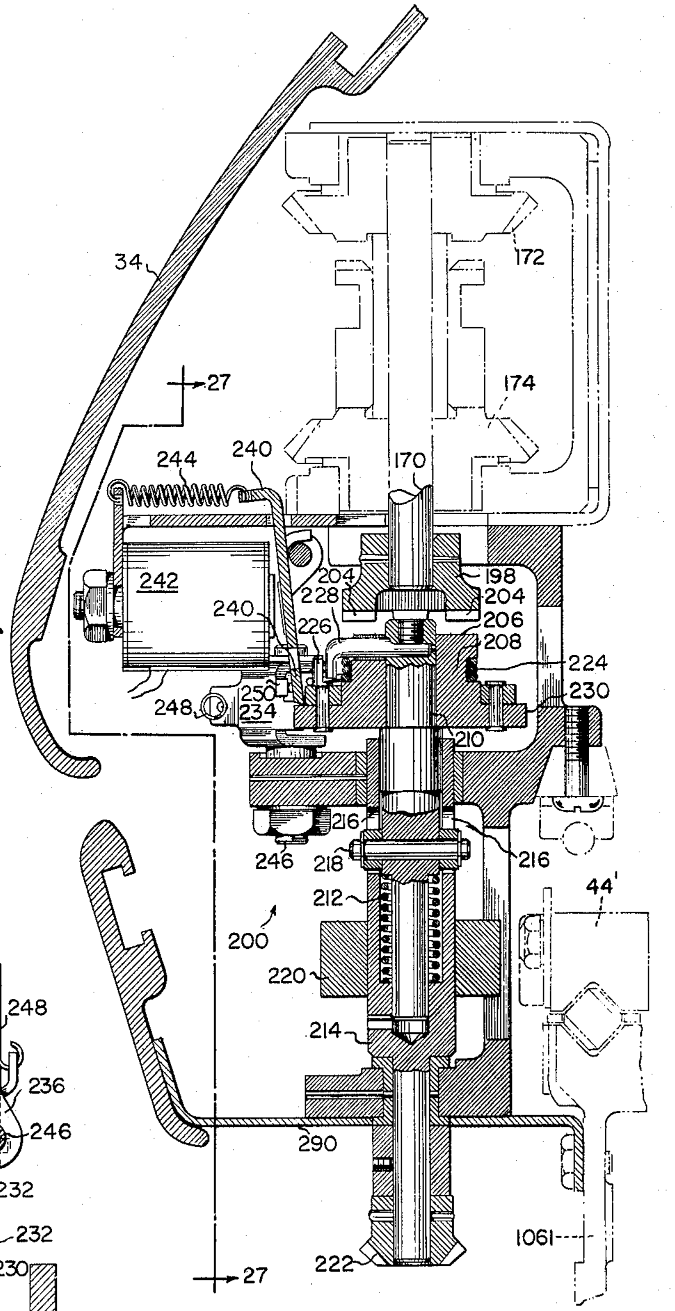
FIG. 26 is an enlarged sectional view of the fractional revolution, bidirectional drive clutch mechanism.

The driven shaft 140 of the clutch carries a worm 148 which meshes with a gear wheel 150, FIGS. 7 and 23, securely attached to the cam shaft 48. This combination provides a five-to-one reduction such that one full revolution of shaft 140 rotates shaft 48 through seventy-two degrees. Leads from the magnet 134 are brought out through the framework and attached to the left terminal block 91 and are thereby energized as will be described hereinafter in connection with the operation of the machine.

Program cam shaft 48, FIGS. 7 and 40, which is the main controlling element of the invention runs longitudinally through the main carriage structure, its axis parallel to the axis of the drive motor 46. In the illustrated embodiment of the invention, the cam shaft operates five different kinds of mechanical cams and fourteen electrical switches. The mechanical cams control the paper aligning and gripping mechanisms, the magnetic head, and various functions of the platen motion which will be described hereinafter. The electrical cams control switches which are required for operation of the electro-mechanical system.

The shaft 48 is connected with the output of the one revolution clutch as beforementioned through worm 148 and gear wheel 150 and is journaled at four places throughout its length. As the machine operates automatically, cam shaft 48 rotates in four discrete steps. As illustrated in the flow charts of FIGS. 108 and 109 the first step extends from zero degrees to one hundred forty-four degrees, the second from one hundred forty-four degrees to two hundred sixteen degrees, the third from two hundred sixteen degrees to two hundred eighty-eight degrees, and the fourth from two hundred eighty-eight degrees to three hundred sixty degrees. A precise description of this mode of cycling will be explained herein in the description of the machine operation.

Figure 38:
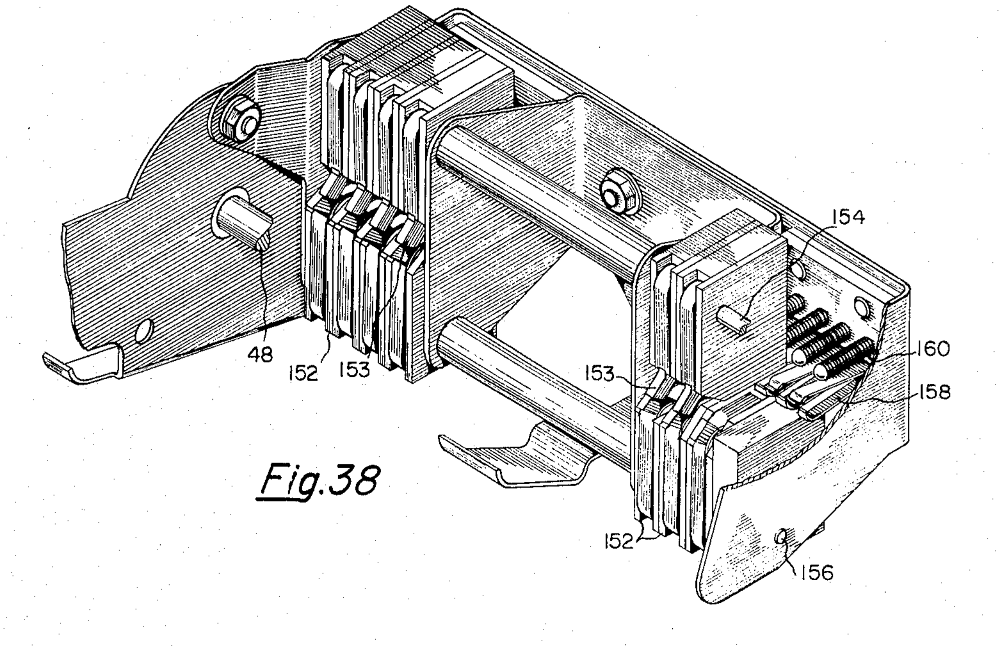
FIG. 38 is an isometric view of the electrical timing switch unitary assembly for the carriage program shaft.

As shown in FIGS. 7, 38 and 39, there is a group of cam driven switches 152 located at the right side of the carriage behind the cam shaft 48. These switches, called the program cam switches, send signals to various remote parts of the accounting machine as required for automatic operation. Detailed descriptions of their separate operations are set forth in detail hereinafter in the description of the machine's operation.

As shown most clearly in FIGS. 38 and 39, the group of program cam switches are disposed in two double stacked banks of eight each. They are further divided within each group into four top mounted switches and four bottom mounted switches. The switches are a momentary contact type such that when the lobe of a cam strikes their actuator 153, they switch a single circuit. The electrical leads from the switches are brought out through the framework and attached to the right hand terminal block 91 as viewed in FIG. 7. The structure of each switch 152 employed in the illustrated embodiment of the invention is described and claimed in the copending patent application to Smith, Serial No. 445,-870, filed July 26, 1954, entitled "Switch Mechanism," and assigned to the same assignee as the present application.

To provide for precise individual adjustment of the switches, they are pivotally mounted on shafts 154 and 156. Spring blades 158 are provided, one for each switch unit, tending to rotate the same in the direction urging the lower end of the unit away from the cams. Adjustable set screws 160 prevent this motion. As the ends of the set screws move inward, the switches will tend to actuate sooner than normally. Conversely, when the end of the set screws move in the other direction or rearward, the switches will operate later than usually.

The ledger and statement forms are adapted to be moved automatically in two directions, into and out of the carriage, as will now be explained. As shown in FIG. 7, a positive engagement, magnet-operated reverse clutch generally indicated at 162 is located near the left rear of the carriage and provides bi-directional rotation of the form feeding mechanism from the unidirectional rotating source of power provided by motor 46.

Figure 20:
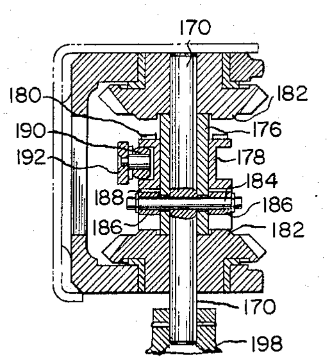
FIG. 20 is a detail sectional view of the reverse clutch shifter mechanism, the view being taken along the line 20—20 of FIG. 17.

Referring to FIG. 17, it can be seen that driving torque is transmitted from the motor 46 to the reverse clutch mechanism progressively through bevel gears 126, 128 and 164. Gear 164 is securely attached to shaft 166 which is journaled at both ends. On the opposite or left hand end of shaft 166 bevel gear 168 is located. Perpendicular to, and in the same plane as shaft 166, is shaft 170 which is journaled at both ends in oppositely facing bevel gears 172 and 174. Bevel gears 172 and 174 are in turn journaled in the frame and both mesh with bevel gear 168. Between bevel gears 172 and 174 mounted on shaft 170 is a hollow sleeve 176, FIG. 20, to keep them separated. Over the sleeve is a slidable dog member 178. Member 178 contains projecting dog or buttress teeth 180 on both ends for engagement with mating teeth 182 on the faces of gears 172 and 174. Through shaft 170 is mounted a torque pin 184, FIG. 20, carrying two freely rotating rollers 186. Rollers 186 bear against face 188 of dog 178, thus transmitting torque from member 178 to shaft 170. The rearward portion of member 178 contains a radial groove in which a freely rotating roller 190 is disposed. Roller 190 is mounted at the end of clapper 192 which is in turn actuated in one direction by magnet 194 and in the opposite direction by spring 196.

In operation, as bevel gear 168 rotates in one direction, bevel gear 172 is caused to rotate in one direction, while bevel gear 174 rotates in the opposite direction. When magnet 194 is de-energized spring 196 urges member 178 to engage the teeth on the face of gear 172, thus turning output shaft 170 and driver wheel 198 in one direction. When current is applied to magnet 194, clapper 192 moves toward magnet 194 causing member 178 to slide forward, breaking engagement with the teeth on the face of gear 172, and making engagement with the teeth on gear 174, thus turning output shaft 170 and driver wheel 198 in the opposite direction.

Since the printed information on the forms handled by this invention must appear on discrete lines and since the form is driven in two directions, mechanism is provided which when driven from a continually rotating source is capable of stopping and starting the form on discrete lines, whether the source is rotating in one direction or the opposite.

Referring to FIG. 7, a magnet actuated bi-directional form feed drive clutch 200 has been mounted at the left side of the carriage, with its axis perpendicular to the axis of the drive motor 46. The clutch is driven by the output shaft 170 of reversing clutch 162 and is coupled to the feed roll shaft 86 for driving the same in opposite directions.

The clutch 200 which is the subject of a copending application will be briefly described here. For an expanded description of its operation, reference is made to copending application to Wallace, Serial No. 536,121, filed September 23, 1955, now Patent No. 2,927,670, entitled "Fractional Revolution Bi-Directional Clutch," and assigned to the same assignee as the present application.

Structural details of the clutch are shown in FIGS. 26, 26A, 27 and 28. Clutch drive wheel 198 has teeth 204 to engage matrix teeth 206 on driven wheel 208. Driven wheel 208 is mounted on a shouldered stub shaft 210 biased by compression spring 212 toward driver wheel 198. Stub shaft 210 is slidably mounted in the tubular end portion of the output shaft 214 and is secured therein by slots 216 and pins 218. Around the tubular portion of shaft 214 is a flywheel 220 to provide positive disengagement of driver wheel 198 and driven wheel 208. Output shaft 214 is suitably journaled at both its ends, and to its forward end is secured a bevel gear 222 to transmit torque to the form feed drive rollers.

Figure 28:
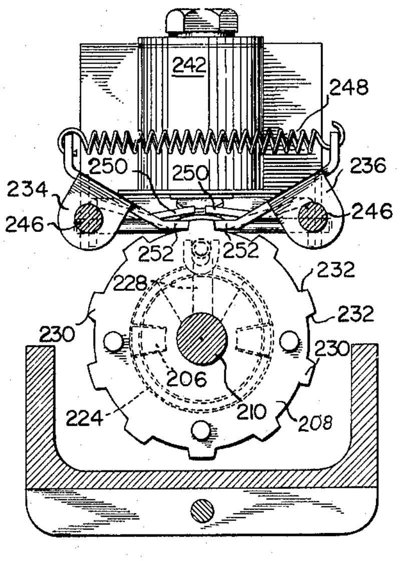
FIG. 28 is a sectional view along the line 28—28 of FIG. 27 showing the toothed wheel of the clutch mechanism and further showing the declutching and locking elements associated therewith.

Driven wheel 208 is free to rotate on stub shaft 210, but transmits torque to it by helical spring 224 which has its opposite ends arranged to straddle pins 226 and 228. Pin 226 is fastened to the wheel 208 and pin 228 is fixed to shaft 210. Thus the two pins 226 and 228 and the spring 224 form a yielding connection for driving the output shaft 214, and serve to restore the driven parts to an exact zero position when the driven wheel 208 is declutched. As shown in FIG. 28, wheel 208 has ten radial projections or dogs 230. The space between each dog corresponds to the space of a line on the forms handled by the carriage. Each dog has oppositely disposed faces 232 to engage detents 234 and 236, and a V-shaped end portion 238, FIG. 27, to engage a pivotal clapper 240.

The forward end of the clapper 240 is V-shaped as shown in FIG. 27 and is actuated upwardly by magnet 242 to engage driven wheel 208 with driver wheel 198 and pulled downwardly by spring 244 to disengage wheel 208 from wheel 198. The two locking elements or detents 234 and 236 are provided to stop the rotation of wheel 208. They are mounted on pins 246 with their axes parallel to shaft 214 and are biased downward by spring 248. Both detents 234 and 236 are arranged to be lifted by clapper 240 by bifurcating their operating ends as shown in FIGS. 27 and 28 so that one arm 250 is offset upwardly so as to be engaged by the clapper while the other arm 252 is bent downwardly to engage the side faces 232 of dogs 230.

Operation of clutch 200 may be explained by assuming magnet 242 to be energized which means that clapper 240 and detents 234 and 236 are raised and not touching any part of wheel 208 allowing spring 212 to urge wheel 208 into engagement with wheel 198. Thus torque in one direction will be transmitted through the clutch.

The control magnet 242 of which the clapper 240 is the armature is arranged to be energized by an electric signal or pulse as will be later described. When the magnet 242 is de-energized the clapper 240 is urged by the spring 244 into the path of travel of the dogs 230 and thus have one of the dogs engage a sloping side of the clapper and cause the wheel to be cammed thereby away from the driver wheel 198 to its retracted or unclutched position. As shown in FIG. 28, there may be provided ten equally spaced dogs 230, which illustratively provide ten stops per revolution of the drving wheel. For the purpose of paper feed control, these ten stops provide ten lines for each revolution of the driven shaft.

As a means to stop the rotation of the multi-dog wheel 208 and lock the same in stop position, two locking elements or detents 234–236 are provided and arranged in juxtaposed relation to the swinging movement of the clapper and adjacent to the dog peripheral portion of the wheel 208. Thus the detent 234 is carried by a pivot 246 forming an axis parallel to the shaft 214 and the detent 236 is carried by a pivot 246 forming an axis parallel to the shaft but on the opposite side of the clapper. A tension spring 248 is stretched between the outer extremities of the detents to bias their stop ends toward the wheel 208 where the spacing between these stop ends is such as to receive a dog 230 therebetween.

The two stop and locking detents 234–236 are arranged to be controlled by the shifting movement of the clapper 240. For this purpose the two detents are each provided with a laterally disposed arm 250 setting on top of the V-cam of the clapper through the medium of a spacing button formed of non-magnetic material.

The two stop and locking detents 234 and 236 are each provided with a finger identified at 252 which is capable of engaging the side of a dog 230 when the driven member is declutched. When the clapper 240 is moved by the spring 244 it causes the detents 234–236 to move therewith toward the dog wheel 208. When the clapper falls into the space between two of the dogs, the continued rotation of the wheel 208 causes the dog to strike the beveled camming surface of the clapper. Further rotation of the wheel 208 causes a camming reaction to take place, axially moving the wheel and stub shaft 210 downwardly and compressing the spring 212, the movement being sufficiently far enough to disengage the driven wheel 208 from the driving wheel 198. The two detents move into the spaces on opposite sides of the cammed dog and abut the same as the tip of the clapper 240 aligns with the tip of the cammed dog 230, as shown in FIGS. 27 and 28. One detent serves to prevent any forward movement of the driven wheel and the other to prevent backward rotation of the wheel. When the wheel 208 comes to an abrupt stop against one of the detents the inertia of the driven parts will cause the spring 224 to wind and act as a shock absorber. When all kinetic energy has been absorbed to this spring it will return the overriding driven parts to a zero position. Thus wheel 208 is positively locked against motion in either direction in this manner while driving wheel 198 continues to turn and the shaft 214 is stopped at a discrete point which will serve as a printing line on the document.

It can be seen that the disengaging action will take place irrespective of which direction driver wheel 198 is turning, the only difference being that the role of detents 234 and 236 are interchanged and the opposite inclined faces 232 of dogs 230 and clappers 240 engaged.

When magnet 242 is energized, clapper 240 will be drawn thereto causing detents 234–236 to also retract from the path of travel of the dogs 230, thus freeing the driven wheel 208 which will then be urged to slide into engagement with the driving wheel 198 by spring 212 and rotate in whichever direction the driving wheel is turning.

To propel the ledger and statement documents a drive and idler roller mechanism has been provided as shown in FIGS. 7, 8, 66 and 70 through 74, inclusive. The drive rollers are located on the shaft 86 which is rotatable in either direction determined by the reversely operable clutch 162. The shaft has its axis parallel to the axis of the motor 46 and is located immediately to the rear of the platen.

As shown in FIGS. 8 and 66, bevel gear 222, which is secured to output shaft 214 of the fractional revolution bi-directional clutch, drives bevel gear 254 which is secured to one end of stub shaft 256. Shaft 256 is journaled at both ends and carries flexible coupling 258 on its output end. Flexible coupling 258 is also fastened to the paper feed roller drive shaft 86 which is suitably journaled at each end. On shaft 86 are four rubber rollers 260, 262, 264 and 266. Rollers 260, 262, and 266 operate to drive the paper while roller 264 serves as a backup roller for the magnetic head assembly to be later described herein.

An idler roller mechanism is associated with each drive roller 260, 262, and 266 and together therewith serves to grip and move the record medium or document. The idler roller mechanism is shown in FIGS. 70, 71, 72 and 74 and comprises three rollers 268, 270 and 272 separately suspended over their associated drive rollers. Each such suspension means comprises a pair of L-shaped arms 274—274 which pivot on common bar or rod 276. Springs 278 urge their respective idler rollers 268, 270 and 272 against driver rollers 260, 262 and 266. Mounted between arms 274—274 of each idler roller mechanism and pivoting on shaft 276 are lifter members 280. The forward end of each of lifter member 280 is shaped to engage the underside of tabs 281 attached to arms 274—274 of its respective idler roller assembly. The opposite end of each lifter member 280 is yoke-shaped and carries a cam follower roller 282 which is engaged by a cam 283 attached to program cam shaft 48.

In operation, when the cams 283 on rotatable shaft 48 which the lifter mechanism rollers 282 engage reach one of their minor radii springs 278 will urge arms 274—274 to pivot on rod 276 and urge rollers 268, 270 and 272 toward the drive rollers thereby gripping a document fed therebetween. The dimensions of the links of the lifter mechanisms are such that members 280 drop free of tabs 281 and allow the idler rollers 268, 270 and 272 to make complete line contact with the driving rollers. When cam shaft 48 rotates such that the lifter operating cams reach one of their major radii, the lifter members 280 raise the idler rollers out of engagement with the drive rollers.

In the illustrated embodiment of the invention the form or document receiving elements associated with the platen 36 generally follow the arrangement shown and described in the aforesaid Butler patent and to facilitate understanding, like reference characters are employed for the same parts. The platen is journalled in and supported at its opposite ends by two platen frames having a permissible rocking movement as described in the Butler patent about the axis of shaft 1092 to provide bodily movement of the platen either into contact with or slightly spaced from a series of spaced apart platen pressure rollers 1132 arranged on a common axis.

Associated with the pressure rollers are light pressure fingers 1145. When a form or document is front fed into the carriage, the pressure rollers are spaced from the platen and the document is fed between the same and also between the fingers and the platen. The leading edge of the inserted document engages an upwardly and forwardly inclined plate 1172 and is guided thereby in its movement. The inner edge of the plate 1172 is secured to the flattened side of a rockable shaft 1092 and is secured at its sides to the platen frame members 1088—1088.

Figures 29, 30, 31, 32, 33, 34:
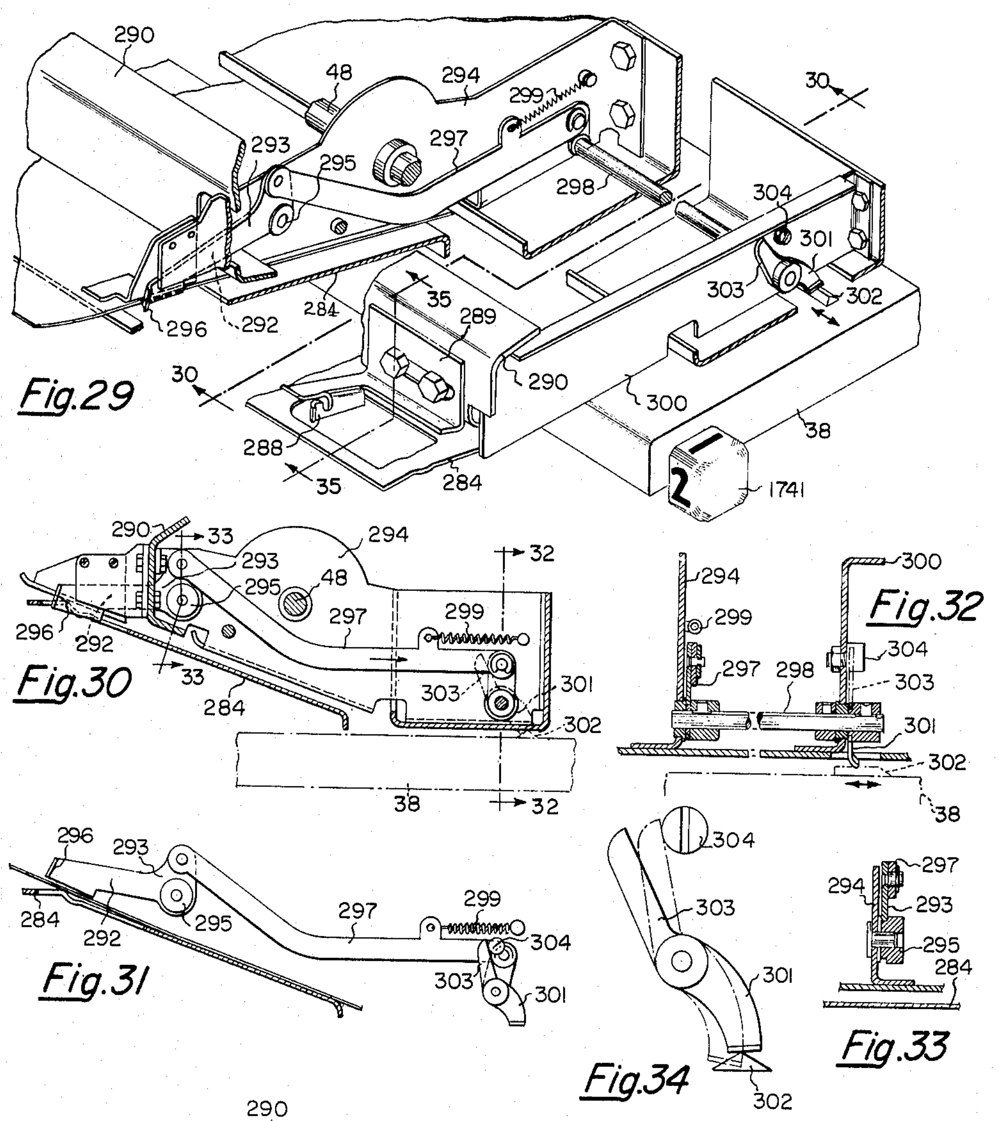
FIG. 29 is an isometric view of the document or form width guiding mechanism.
FIG. 30 is a sectional view of the form width guiding mechanism taken along the line 30—30 of FIG. 29.
FIG. 31 is a view of the detent illustrated in FIG. 30 but showing the receipt of a document and the detent in the raised position.
FIG. 32 is a sectional view taken along the line 32—32 of FIG. 30 and illustrating the function of the control cam for the form width guiding mechanism.
FIG. 33 is a detail sectional view of the camming link taken along the line 33—33 of FIG. 30.
FIG. 34 is a detail of the operating shoe of FIG. 29.
Figure 35:
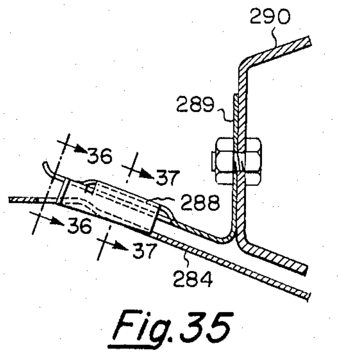
FIG. 35 is a detail sectional view taken along the line 35—35 of FIG. 29.
Figures 36, 37:
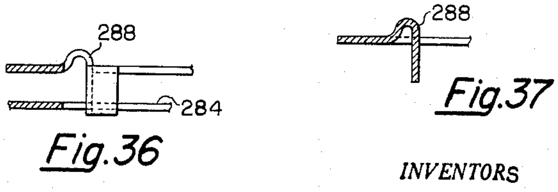
FIG. 36 is a detail in section of the paper guide taken along the line 36—36 of FIG. 35.
FIG. 37 is a detail in section of the paper guide taken along the line 37—37 of FIG. 35.

Referring to FIGS. 70 through 74, in order to provide further proper guidance and support of record media utilized by the machine, a metallic sheet or plate 284 is provided which is upwardly inclined and has its front margin projecting beyond the drive rollers 260, 262, 264 and 266 and bent to provide a horizontal lip portion 285 overlapping upon the rear portion of the plate 1172. The plate 284 is provided with openings along its front margin, four of which accommodate the drive rollers aforesaid. As shown in FIGS. 29 and 30, the rear end of inclined plate 284 overlies the forward end of the control panel tray 38 and the upper surface of the latter serves as the balance of the guiding support for the inserted forms and documents. As will be described in detail hereafter, when the leading edge of an inserted document passes beyond the lip 285 of plate 284 it trips an electric switch causing the motor 46 to operate and rotate the paper drive rollers 260, 262, and 266 in the direction to draw the document further into the carriage.

To permit the utilization of record media of different widths, front and sidewise aligning and guiding mechanism are provided. For sidewise guiding there are provided a pair of spaced apart initially settable guides 286 and 288, the latter being shown in detail in FIGS. 29 and 25 to 37. Each guide forms an integral part of a bracket 289 bolted to a front longitudinal frame member 290 of the carriage. A slot is provided in each bracket as shown in FIG. 29 and it is evident that sidewise adjustment of the guides may be made toward and away from one another to accommodate different width forms. Usually the guides are adjusted at time of installation, and are not accessible for ready adjustment by the operator. The paper guides 286–288, as shown most clearly in FIG. 8, constitute opposite left and right hand guiding elements for contact with the side edges of the document or form and serve to keep the paper properly guided so the magnetic portion thereof passes correctly by a magnetic head assembly as hereinafter described.

To permit the operator to adjust the carriage to receive forms of various widths, there is provided a knob controlled, edge form aligning guide or bail which, in the embodiment of the invention exemplified herein, is located closer to the right hand guide 288 than to the left hand guide.

Referring to FIG. 29, the operator controlled guide is indicated at 292 and comprises an elongated boot-shaped member 293 pivoted at its heel portion to a supporting cross rib 294 by means of the headed stud 295. The forward end 296 of the guide 292 is bent or flared outwardly so as to present a curved surface to the paper. The toe of the boot-shaped member is pivoted to the forward end of a bent link 297. The rear end of the link 297 is connected through a short crank arm to the rotatable shaft 298, the connection being such that rotation of the shaft will act through the link to raise or lower the guide 292 depending upon the direction of rotation of the shaft. A coiled spring 299 yieldably biases the link assembly to the raised inoperative position. One end of the shaft 298 projects slightly beyond the end supporting cross rib 300 and is provided with a depending pivoted sensing finger 301 having a lateral projection at its lower end forming a foot engageable with a camming projection 302 rising above the upper surface of the program tray 38 of the carriage. The opposite end of the finger is provided with an arm 303 engageable with a stop 304 on rib 300 to limit movement of the finger in absence of the camming projection.

The engagement of the camming projection 302 is determined by the relative position of the control panel tray 38 with respect to the carriage. A slight bodily adjustment of the tray relative to the carriage is provided to enable the machine to operate on several different accounting procedures or schedules. This provision and its adjustment by the contact knob or twirler 1741 is described in the aforesaid Butler patent and particularly from line 74 of column 157 to line 18 of column 158. When the knob 1741 is moved to schedule 1, which is set up for ledger posting, a smaller document is used. Rotation of knob to schedule 1 position causes the tray 38 to shift and bring the camming projection under the sensing finger 301 thus lowering the forward end 296 of guide 292 to form a right edge guide for the ledger.

For all other schedules, larger documents are used and in these scheduled positions the camming projection 302 does not engage the finger 301 thereby enabling spring 299 to raise the guide 292 out of the way.

A feature of the invention is the provision of an automatic fine alignment of the ledger or statement form after the operator has casually inserted it within the carriage throat. This is provided by means of three cam actuated paper aligning members or pushers 306, 308 and 310 illustrated in FIGS. 70, 71, 73 and 74, and operable to engage spaced portions of the leading edge of the inserted document. A paper pusher is associated with each idler roller assembly 268, 270 and 272.

FIG. 74 shows a typical paper pusher 308 beside an idler roller 272. As shown, each paper pusher extends in an approximately vertical plane and is capable of being moved from a raised inoperative position to a lower paper-engaging position. As best illustrated in FIG. 73, there are two major links to the mechanism. The riser link 316 pivots on shaft 276 and is biased by tension spring 318 to cause its roller 320 to engage a cam 321 mounted on program cam shaft 48. On link 316 is mounted pusher link 322, the forward end of which is bent laterally to form the paper-engaging pusher element 308. The pusher link is slidably connected by pins 324 through elongated slots 326. The pusher link carries a follower roller 328 on the rear end thereof which engages a cam 329 on shaft 48.

In operation, the cam 321 with which the roller 320 engages causes the link 322 to be lowered and drop the pusher element 308 into the path of travel of the document and preventing the same from being thrust past this point. During this time, link 316 is in its retracted position. When the automatic cycle starts, the cam 329 associated with the roller 328 is so cut that as it rotates the pusher link 322 moves forward and causes its pusher element 308 to engage the leading edge of the document forcing the document back to a predetermined zero position. Similar operating cams are provided for all paper pushers and they move forwardly simultaneously for the same distance of travel. A document having its leading edge engaged by the forwardly moving pusher elements 306, 308 and 310 is shifted back toward ejected position and is squared by the time these elements reach the zero position. Thus if the document has been inserted askew or does not quite touch all of the pushers when links 322 push forward, any misalignment of the document will automatically be corrected. As shown in FIGS. 73 and 74, after link 322 has reached its apogee, it retracts while link 316 rotates upwardly thus moving the pusher 308 clear of the leading edge of the document. At the end of the cycle, link 316 lowers so that link 322 is again fully retracted and the pusher 308 will again block entry of a document beyond that point.

As before mentioned, numerical information is encoded magnetically on the record member with respect to the amount of the old balance, account number verification, as well as information for automatically indexing the platen so that the first available blank line on the record member is brought into position for printing after each totaling or sub-totaling operation or otherwise as the case may be. For this purpose a magnetic sensing and recording assembly 330 is provided which is shown in FIGS. 67 through 69 and comprises a plurality of identical, individual electromagnetic "read-record" heads 332. In the illustrated embodiment of the invention three such heads are used. Each head consists of a generally D-shaped armature 334, FIG. 69, constructed of multiple laminations of any suitable thin magnetizable material. An air gap 336 is provided which separates the pole pieces of the armature. As is conventional practice, during fabrication of the head structure, a silver shim 337 may be introduced into the air gap of each head. An electrically conductive energizing winding 338 is disposed on the leg of one of the pole pieces of each of the heads. The three heads 332 are placed side by side and held rigidly together by screw 339 so as to anchor the same between end plates 340—340. Wires from the windings on the heads are brought back to a terminal board 342 where they are spliced to shielded leads 344 which in turn are conducted through the carriage framework and secured to the right hand terminal block 91.

The completed magnetic head structure, FIG. 67, is then secured within a shielding cover 346 after which the whole sensing assembly may be potted with a standard potting compound of plastic material so that all of the heads are sealed against the ingress of dust, moisture or corrosion. Each air gap is exposed to view, during the final stages of assembly, by grinding a slight radial curvature, FIG. 69, across the lower end of the head package so that a minimal surface portion of the sensing assembly, which includes the air gaps of all the read-record heads, may be brought into physical contact with the record media.

The potted unitary magnetic head assembly is adapted to be adjustably mounted within the framework of the machine carriage and to this end it is secured between the longer sections of two parallel L-shaped crank arms 348—348 by means of a pair of forwardly disposed laterally projecting studs 347—347 and a pair of rearwardly disposed screws 349—349 disposed intermediate the ends of the arms. This arrangement affords rigid securement of the head package to the two crank arms while permitting easy insertion and removal or replacement of the unit as desired.

Each L-shaped arm 348 is provided near its shorter section with a mounting slot 352. The open end of each slot 352 is cut with a radius of curvature sufficient to permit its arm to be pivotally mounted on the dead or fixed shaft 276, FIG. 7. The L-shaped arms are biased by springs 350—350 to lower the magnetic head assembly 330 against the drive roller 264.

The sensing assembly is designed to be self-aligning due to the freedom of movement provided it by the slotted arms and the tension springs. A certain amount of yieldingly resisted floating movement is thus permitted which allows the magnetic head assembly to adjust itself to any unevenness of the record medium or the magnetic strip, as the case may be.

As viewed from the above an H-shaped lifter member 354 is pivotally mounted for rocking movement about the fixed shaft 276 between the parallel crank arms 348—348. The rear end of the member 354 is shaped to provide a yoke 355 and carries a cam follower roller 356. The forward end is shaped to provide laterally projecting legs 357—357 which are disposed beneath the parallel crank arms and are adapted to engage the lower edge portion thereof. It is apparent that rotation of the cam 358 associated with the follower 356, in a manner to be explained later on, is adapted to cause the magnetic head assembly to be lifted out of engagement with its drive roller 264 against the tension of the springs 350—350. As will be pointed out in more detail hereinafter, the magnetic head assembly actuating cam is provided with two circularly high points or protuberances to cause the assembly to contact the record medium twice during each cycle of the program cam shaft 48.

With the exception of the variable digital information such as appears on checks or deposit slips which from time to time are entered manually on the ledger form during the course of the accounting procedures, the accounting machine of the present invention is adapted to be operated automatically. Electrical signal means is provided for sensing the record medium or document inserted into the machine and for controlling the operation of components in the carriage for shifting the document to certain positions to accomplish the desired functions. A flow chart or diagram illustrating the complete operational cycle of the present invention is set forth in FIGS. 108–109.

Figures 9, 10, 11, 12, 13, 14:
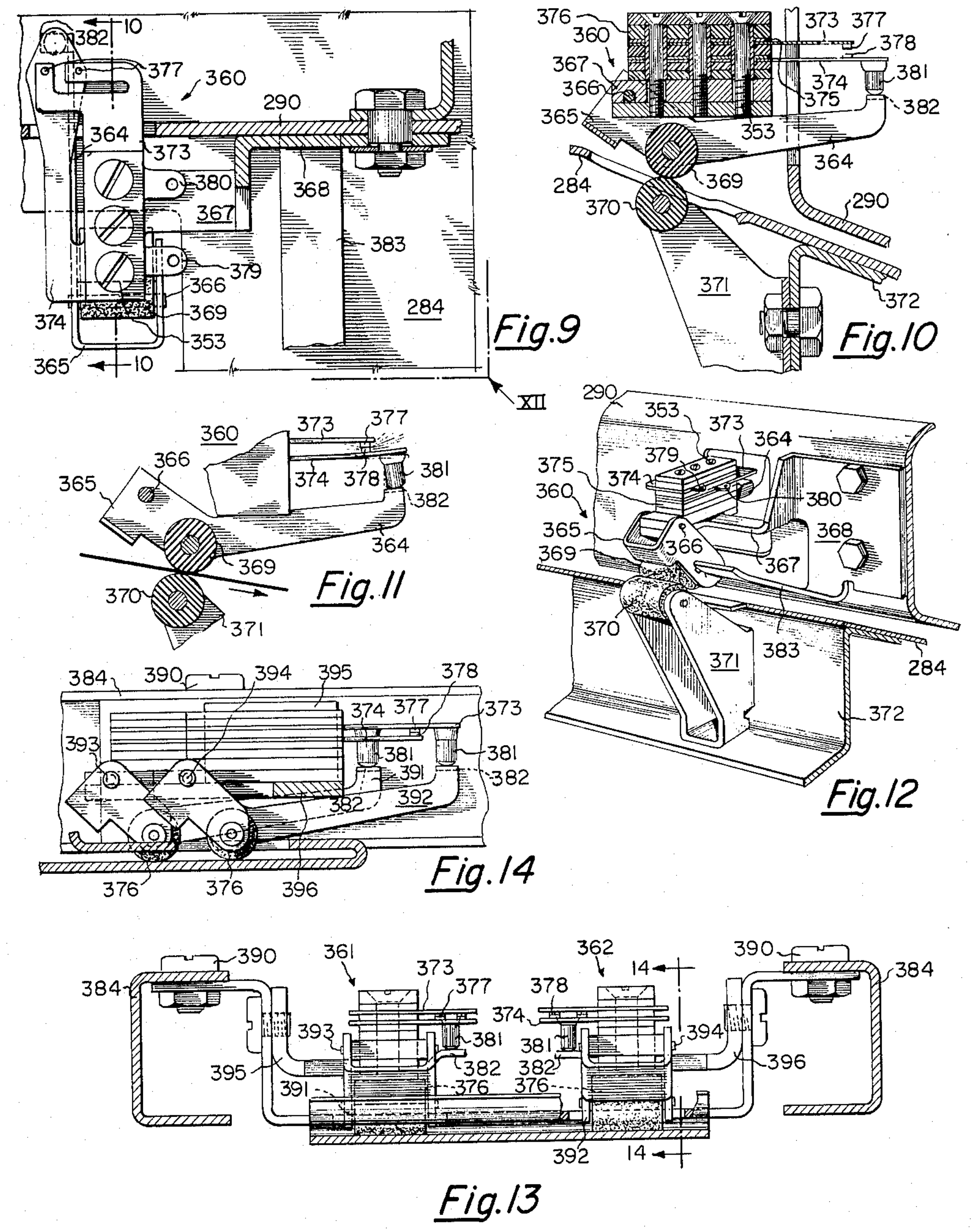
FIG. 9 is an enlarged view of the area of the carriage within the dotted outline identified at IX of FIG. 7, the view being partly in section and illustrating the front paper alignment switch.
FIG. 10 is a sectional view of the front paper alignment switch taken along the line 10—19 of FIG. 9.
FIG. 11 is a diagrammatic sectional view of the alignment switch at the moment the switch contacts are closed caused by a document being fed between the rollers thereof.
FIG. 12 is an isomteric view of the alignment switch taken from the angle indicated from the arrow XII in FIG. 9.
FIG. 13 is an enlarged front sectional view along the line 13—13 of FIG. 7 illustrating the rear paper switches in their normally closed condition.
FIG. 14 is a side view in section along the line 14—14 of FIG. 13.

The automatic initiation of the electrical control thereof is performed by means of electrical circuits which include paper sensing switches preferably of the roller actuated type shown in detail in FIGS. 7, 9 and 13 inclusive. Three paper switches are employed in the illustrated embodiment of the invention, one shown at 360 and located near the front of the carriage, while two similar switches 361 and 362 are located at the rear of the carriage intermediate the terminal blocks 91—91. The front paper switch 360 is located on the forward frame member 290 of the carriage framework as shown in FIG. 7, and is shown in details in FIGS. 9 to 12. This switch comprises an actuator arm 364 having an integral U-shaped forward end portion 365 which is pivotally mounted by means of pin 366 to a lateral extension 367 of a switch mounting bracket 368 secured to the frame member 290. A lightweight plastic idler roller 369 is mounted between the parallel sections of the U-shaped end portion of the arm 364. An idler back-up roller 370 is mounted between the upstanding arms of a U-shaped bracket 371 mounted below the paper guide plate 284 and is secured to a frame member 372 serving as the support for the guide plate. The back-up roller 370 is supported by its bracket for projection through an aperture in the paper guide plate and in position to make line contact with the switch arm roller 369.

Referring to FIGS. 9 and 10, there are two contact elements or blocks 373 and 374 of resilient material having their free ends disposed in vertically spaced apart relation and their opposite end sections insulatively mounted in a switch body 375 in which the blade end sections alternate with strips of dielectric material 376 disposed therebetween and are secured together by means of the screws 353. The free portion of the lower blade 374 extends along side of the switch body for the major portion of its length and is relatively flexible. The upper blade 373 projects directly out of the switch body and its free portion is relatively short. The free portion of the latter is provided with a bifurcated lateral extension as shown in FIG. 9 to overlie the extremity of the lower blade. Each bifurcated section of the upper blade carries a pair of conductive contact buttons 377 which cooperate with a similar pair of buttons 378 on the free portion of the lower blade. The upper and lower contact blades 377 and 378 respectively carry a lateral projecting terminal 379 and 380 which are connected by leads (omitted from FIGS. 9 to 13) to the control circuit of the machine. The underside of the free end of the lower blade 374 carries a depending insulating stud 381, the rounded extremity of which is engaged by a laterally bent ear 382 on the end of the switch actuator arm 364. Integral with the switch mounting bracket is a forwardly projecting paper guide finger 383 which is disposed immediately above the paper guide 284 and cooperates therewith to provide a throat near the paper switch 360 for the record medium as it enters the carriage.

The two rollers 369 and 370 of the switch 360 are adapted to be brought into engaging contact by means of the spring tension developed by the resiliency of the lower blade acting through the downwardly projecting stud 381. As shown in FIG. 11, the record media is passed between the two rollers and the thickness of the paper lifts the roller 369 and rocks the actuator arm upwardly so as to cause the upper and lower contact buttons 377 and 378 to make contact thus completing an electrical connection to the control circuit. In this manner an electrical signal is developed to indicate that the paper is in the carriage. As the result of the closing of the paper switch 360, the paper pushers 306, 308 and 310 are actuated in the manner before described and come forward and square the paper in the carriage after which the feed drive rollers grip the paper and propel it further into the carriage. An automatic squaring adjustment of record media is thus provided by means of the three paper pushers in cooperation with the paper switch 360. Handling of records and paper by permitting the operator to merely insert the record sheet or document into the carriage without spending time and effort is thus measurably speeded up.

Electromechanical line spacing of the record media is controlled by means of two additional paper switches of generally similar construction and operation to that of the aforementioned paper alignment switch 360. Referring to FIGS. 7, 13 and 14, the two switches 361 and 362 are mounted, one on each of two opposite parallel horizontal rails 384—384 formed as lateral projections of two wedged shaped frame members 386—386. The rails are slotted as indicated at 388 to permit their respective switches to be adjustably disposed therealong by means of the bolts 390. In this fashion, the rear paper switch assemblies 361 and 362 are each capable of slidable adjustment with respect to the carriage and to one another and are capable of being adjusted to the position shown in dotted outline in FIG. 7. This enables adjustment of the machine to accommodate record media of different lengths.

Although the two rear paper switches 361 and 362 are geenrally similar to front paper switch 360, they are constructed to operate in a reverse manner, that is to say, the two rear switches normally have their contact buttons in closed position but are moved to open position when a paper sheet is fed between their respective rollers. Referring to FIGS. 13 and 14, it is evident that the actuator contact arms 391 and 392 of the two switches 361 and 362 respectively are pivoted at 393 and 394 to separate supporting brackets 395 and 396 upon which the switch bodies are mounted in a similar manner to the actuator 364 of the front paper switch. The two rear switches are separated by a distance equivalent to a predetermined line spacing such as two printed line spaces on the record member or document. Thus, the two rear switches are operated at separate times as the leading edge of the record member is moved in either direction thereby. As hereinafter described, the rear paper switches control the reversible clutch 162, FIG. 7.

It should be appreciated that in the operation of the illustrated embodiment of the invention the advancing edge of the record member or document is actually the bottom edge thereof and that this edge in cooperation with the rear paper switches 361 and 362 controls the recording of information onto the document, when it is first used, in line measured relationship to the top edge of the document. Thereafter, stored information on the memory strip 76 and 78 of the record member will contribute to the control of the movement thereof and particularly to find the proper line for recording information onto the member. Although different arrangements may be made for providing a zero reference line on the record member, the herein described procedure is desirable for the operation of the embodiment of the invention disclosed herein.

With particular reference to the ledger form illustrated in FIG. 4A, the line identified as "Amount Brought Forward" is considered as the starting position or zero printing line. This zero line is located approximately four printing lines from the upper edge of the ledger form. The lines between the zero reference line and the upper edge of the ledger are referred to in order as "minus four line," "minus three line," "minus two line" and "minus one line." The rear paper switches 361 and 362 so control the clutch 162 that when they are actuated by the movement of the edge of the ledger between their respective rollers they stop the ledger at the next adjacent line position in the direction it is travelling. Thus, to control the stoppage of an unused ledger form so that its zero line is in print position, the rear paper switch 361 is located on the carriage for operation when the "minus one line" is in print position and becomes active to control the stoppage of the paper drive clutch 124 when the zero line is in print position.

The distance between the switches is sufficient to allow time for the actuation of various electrical control circuit elements which in turn cause the paper driving rollers, by gripping the record member therebetween, to position the record member at the printing station such that the old balance will be printed in the area of the ledger or statement form identified as the "amount brought forward" line. Closing the line minus one switch, for example, drops out the read relay, stops the record medium in the line zero position during a blank card operation and provides proper timing for the energization or picking of the write pulse gate relay in order to initiate the writing of a numerical balance on the record medium. The line minus three switch gives an indication that the record media has reached the rearmost paper stop position. Each one of these and associated functions will be described in detail more fully later on.

*Terminal boards and cable*

At the extreme rear of the carriage frame and secured thereto by bolts 397 are two transverse terminal boards 91—91. These two members provide means for the interconnection of the various electrical components of the movable carriage (see FIG. 7).

*Carriage open switch*

Figure 16:
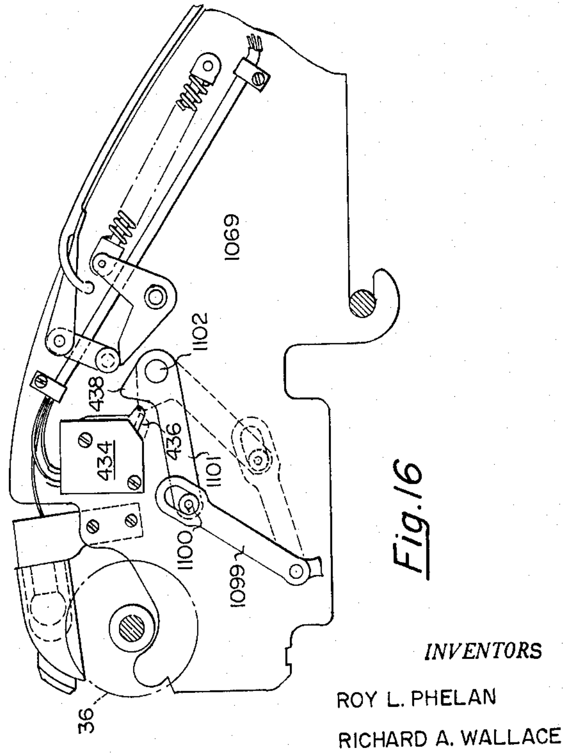
FIG. 16 is a view of a portion of the carriage opening and closing mechanism together with its associated switch, the view being in section taken along the line 16—16 of FIG. 8.

As a means of preventing damage to various operating linkages in the carriage of the machine and also to indicate that the carriage is in an "open" position, i.e. with the paper gripping rollers withdrawn from the platen, an indicating mechanism including a switch 434 is provided, see FIG. 16. The actuator 436 of the switch is located adjacent to the link 1101 so that as the latter link is moved, as later described, from the dotted line position to the full line position, as shown most clearly in FIG. 16, a cam surface 438 integral with the link 1101 engages the actuator 436 and this energizes the switch 434. It is apparent from the foregoing that an electrical indication of the open condition of the carriage paper rollers is thus provided. The electrical circuitry required for the operation of this mechanism is described later on in conjunction with the description of the overall circuit operation of the base machine.

*Carriage exterior structure—Platen opening and closing mechanism*

To facilitate the insertion of papers from in front of the platen, as is described in detail in the Butler patent, the platen frame 1088, FIG. 87, may be rocked clockwise about the axis of the shaft 1092 to move the platen 36 rearwardly from its normal printing position, and counterclockwise to move the platen forwardly to its normal printing position. For this purpose a bail member 1096, FIGS. 75, 77 and 78, extending transversely of the machine substantially from end to end of the carriage is supported to swing forwardly and rearwardly beneath the rail member 1061 by a plurality of arms 1097 extending upwardly between the race rails of the member 1061 and secured at their upper ends in flattened sears on a platen frame rocking shaft 1098 journaled near its ends in bushings spun into the carriage end plates 1069 and 1070.

Arms 1099 secured at their lower forward ends to hubs pinned on each end of the shaft 1098 each has in its upper rear end a longitudinally elongated slot embracing a roller stud 1100 secured in the lower forward end of a respective one of two arms 1101. Each arm 1101 is secured on a hub pinned on the outer end of a respective one of the two shafts 1102 each journaled in a bushing 1103 secured in the respective carriage end plate 1069 or 1070. Each of two cam arms 1104 is secured on a hub pinned on the inner end of a respective one of the shafts 1102 and each has a cam slot embracing a roller 1105 rotatable on a stud secured in the rear portion of the adjacent one of the platen frame end plates 1088, FIGS. 87 and 88. The cam slot in each cam arm 1104 has an upper rear and lower front dwell portion concentric with the shaft 1102, the lower front dwell portion being at the greatest radius from the axis of the shaft 1102, and an inclined portion connecting the two dwell portions.

When the bail 1096 is swung forwardly by movement of element 1040, as seen in FIG. 77, and as described more fully in the Butler patent, the cam arms 1104 are swung downwardly pulling the rollers 1105 and the platen frames rearwardly about the shaft 1092 to retract the platen 36 rearwardly from its printing position. When the bail 1096 is returned rearwardly, as seen in FIG. 78, the frame end plates 1088 are returned forwardly to move platen 36 to printing position. The openings in the carriage end plates, as shown most clearly in FIG. 101 of the Butler patent, through which the ends of the platen shaft 1081 extend outwardly are elongated arcuately about the shaft 1092 to accommodate the swinging movement of the platen shaft as the platen frame is swung about the shaft 1092.

*Carriage exterior structure—Pressure roller actuating mechanism*

In this invention it is necessary to maintain positive control of the documents fed into the carriage. To prevent movement of the document, i.e., buckling or stretching, when the carriage opens and closes, the pressure roller actuating mechanism has been modified somewhat from that shown more particularly in FIG. 104 and FIGS. 108 and 109 of the Butler Patent 2,629,599.

Referring to FIGS. 7, 76, 79 and 85 to 86*c*, inclusive, of the present application, a locking bar 400 is shown to be journaled at its opposite ends through holes disposed in inner carriage end plates 1088—1088, and at two intermediate points in brackets 402—402, FIG. 7. Bolted to the locking bar 400 at the left end is locking cam 404 while at the right end is locking cam 406. Cams 404 and 406 serve to rotate bar 400 in its journals, as will be described later, and to prevent it from axial movement, relative to end plates 1088—1088.

Disposed at regular intervals along the length of bar 400 between plates 1088—1088 are camming tabs 408. A pair of tabs is used to actuate each of the pressure roller assemblies 1132. These assemblies may comprise both single and multiple pressure rollers, as shown.

Rearwardly of the locking bar 400 is an inverted channel shaped member 410, FIGS. 87 and 88, similar to the member 1094 of Butler, which is securely attached at its opposite ends to the inner carriage end plates 1088—1088. Secured to the channel member 410 at regular intervals throughout its length are tabs 412. A shaft 414 runs through each of the tabs. Pivotally mounted on shaft 414 are pressure roll arms 416, which carry the resilient pressure rolls 1132 at their outer extremities, and are urged upwardly by springs 1139. The camming tabs 408 of the locking bar 400 are adapted upon arcuate rotation thereof to engage the tabs 417 of the arms 416 so that as locking bar 400 is rotated towards the rear of the carriage, the pressure rolls 1132 are pulled away from the platen 36. Conversely, when the bar 400 is rotated toward the front of the carriage the springs 1139 pull the pressure rolls 1132 into contact with the platen 36.

Attached to the carriage outer end plates 1088—1088 are pins 420, FIGS. 79 and 86 to 86*c* inclusive. These pins engage locking cams 404 and 406 so that as the inner carriage is opened the locking bar 400 is caused to rotate toward the rear of the carriage and thus open the pressure rolls. When the carriage closed the pressure rolls remain away from the platen. To bring the pressure rolls into contact with the platen after the inner carriage is closed, a reset lever or link 422 has been provided. Link 422 slides at its rearward end on pin 1102 and at its forward end on pin 420. A spring 426 urges the link 422 rearwardly to engage cam 428 which is mounted on cam shaft 48. At the desired time in the overall cycle, cam 428 rotates and through roller follower 430 pushes link 422 forwardly and causes its nose section 424 to abut camming tab 432 of locking cam 406, thus causing the locking bar to rotate towards the front of the carriage releasing the pressure rolls to move against the platen to grip the record media.

Figure 85A:
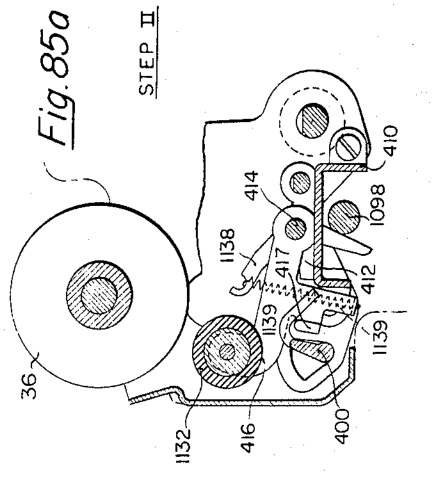

The operation of this mechanism can be more readily understood by referring to FIGS. 85 through 86*c* inclusive. These figures illustrate the four principal steps representing a single complete cycle of carriage operation. FIGS. 85 and 85*a* show the first step. FIGS. 85*b* and 85*c* show the second step. FIGS. 86 and 86*a* show the third, and FIGS. 86*b* and 86*c* show the fourth and final step. In step I the carriage is open, the pressure rolls are away from the platen or open, the reset link 422 is retracted, and locking bar 400 is at rest in its rearward position. Step II occurs when the inner carriage closes. The physical geometry of the illustrated embodiment is such that the pressure rollers 1132 and pressure roller arms 416 rotate with the inner carriage while the relative position between the platen and the pressure rollers is maintained constant. In this way a record member is permitted to slip between the platen and the open rollers to avoid binding and tearing or misalignment. Step III shows the position of the apparatus directly after closing the pressure rollers. This is accomplished by means of cam 428 which rotates in a direction indicated by the arrow, FIGS. 86*b* and *c*, to push the reset lever or link 422 forward through roller follower 430. The nose section 424 of the link 422 is thus caused to abut tab 432 of locking cam 406, causing locking bar 400 to rotate to its front position. Rotation of locking bar 400 causes camming tabs 408 to rotate away from roller arm tabs 417 and thus urge the rollers 1132 against the platen by means of the springs 1139. At this point cam 406 is riding on the pin 420.

Step IV shows the inner carriage midway in its opening stroke. Locking cams 404 and 406 are pressing against the surface of the pins 420 by the upward movement of the inner carriage causing bar 400 to rotate rearwardly. Rotation of the bar causes tabs 408 to push against tabs 417 of the roller arms 416 causing rollers 1132 to move away from the platen so that when the carriage has completely opened, the mechanism will be returned to the position shown in Step I (FIGS. 85 and 85*a*).

*Carriage exterior structure—Split platen spacing mechanism*

Figure 15:
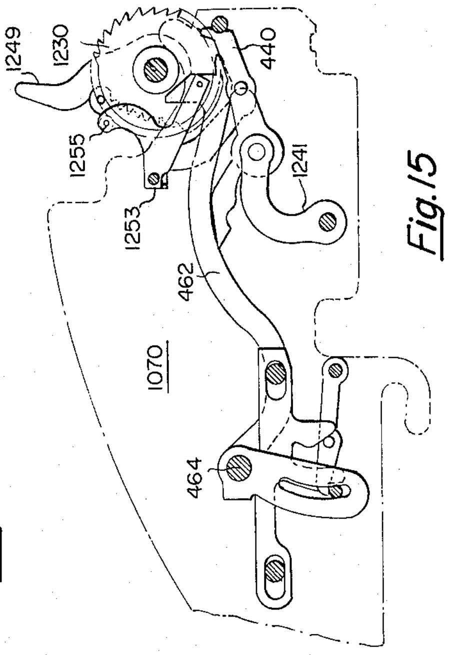
FIG. 15 is a sectional view taken along the line 15—15 of FIG. 8 showing the auxiliary carriage spacing mechanism.

A feature of the invention is the splitting of the print impact surface into two platens mounted on a common axis but capable of independent rotation thereabout. As shown in FIGS. 4, 5 and 6, the short left hand platen is designed to carry an adding machine tape while the wide right hand platen carries the journal roll and the dual document. Both platens have mechanisms to automatically rotate them in a direction such as to feed paper out of the carriage. Referring now to FIGS 80 through 84 inclusive, and more particularly to FIGS. 83 and 84, spacing pawls 440, adapted to move forwardly and rearwardly of the carriage, similar in every respect to the spacing pawls of Butler, engage teeth on ratchet wheels 1230 such that as bail 1247 is moved by automatic means within the base machine (not shown), arms 1241 will force the pawls 440 to engage ratchet wheel 1230 and rotate the platen 36 a number of steps varying from one to six depending on the setting of the lever 1249 and the shield member 1248, FIG. 80. There is an arm 1241 and a spacing pawl 440 disposed on each side of the carriage such that each time bail 1247 moves, both spacing pawls 440 are driven forward. Left side view is shown in FIG. 15.

A disabling mechanism has been provided to allow selective spacing of the two platens independently of one another. Referring to FIG. 84*a* (on sheet with FIG. 75), a shift 446 is disposed transversely of the carriage and carries two cams 448 and 450 thereon. The cams are secured to the shaft immediately adjacent the split between the two platens. As the carriage traverses back and forth across the machine cams 448 and 450 strike the tab 452 projecting outwardly from the frame rail 44 of the machine such that if the shorter platen is opposite the print bars and the carriage is tabulated to the longer platen, shaft 446 will be rotated in one direction by cam 448 striking the tab 452. Conversely, when the carriage passes from the longer platen to the shorter platen, cam 450 will rotate shaft 446 in the opposite direction. Attached to either end of the shaft 446 are arms 454 which engage pins 456 attached to arms 458. Pin 456 extends through a cam slot 460 in a disabler link 462. The disabler link 462 is pivotally mounted on pin 464 attached to the carriage end plate 1088. The shape of the cam slot 460 in the left hand disabler link 462 is such that when shaft 446 is struck by cam 448, as occurs when tabulating from the narrow platen to the wide platen, the disabler link rises to its enabling position (FIG. 83). At the same time the left hand disabler link is depressed to its disabling position (FIG. 15). Thus, while the wide right hand platen is adjacent to the print bars, each time bail 1247 moves and both spacing pawls 440 move forward, the right hand spacing pawl is allowed to engage the teeth of the ratchet wheel 1230 while the left hand spacing pawl through pin 466 engages the underneath surface of disabler link 462 and is thus held away from the teeth of ratchet 1230 resulting in spacing only the right hand platen. When the carriage is traversed such that the left hand platen is adjacent the print bars, the left hand disabler is raised and the right hand disabler is lowered. When bail 1247 moves, the left hand ratchet will space while the right hand ratchet will not.

*Carriage exterior structure—Auxiliary spacing mechanism*

In this invention it is necessary to cause the right hand platen 58 to take a space when the carriage is open, i.e., when the platen pressure rollers are withdrawn from engagement with the platen, since the normal spacing mechanism of the machine operates only on a closed platen. Referring to FIGS. 80, 81 and 82, the auxiliary spacing mechanism comprises a cam arm 470, which is pivoted between its ends on shaft 1102 (FIGS. 75 and 80), and a ratchet pawl 472 rockably fastened by means of the pin 474 to the upper end of the cam arm 470. Pawl 472 is biased toward ratchet 1230 by spring 476. A pin 478 movable in the center of a slot 480 which, when arm 273 is in its resting position, prevents the hook end of arm 470 from engaging the teeth of the ratchet. The lower end of the cam arm 470 is provided with a follower 482 which engages cam 485 mounted on the carriage program cam shaft 48. When follower 482 is resting on its minor diameter, the pawl 472 is in its forward position and its hook end will not engage the teeth of the ratchet wheel 1230. As follower 482 is urged forward by the lobe of the cam 485, arm 470 rotates pulling pawl 472 rearwardly. Slot 480 is constructed to cause the hook to engage a single tooth on wheel 1230 when ratchet wheel 1230 is moved upwardly into the path of the arm 472, and when cam 485 reaches its major diameter. The pawl 472 will then have rotated the ratchet wheel exactly one tooth. As cam 485 continues to rotate and return to its minor radius pawl 472 moves forward and because of the oversize slot 480 it travels up over the tooth and into its raised forward resting position, FIG. 80.

*Carriage exterior structure—Journal roll mechanism*

Figure 112:
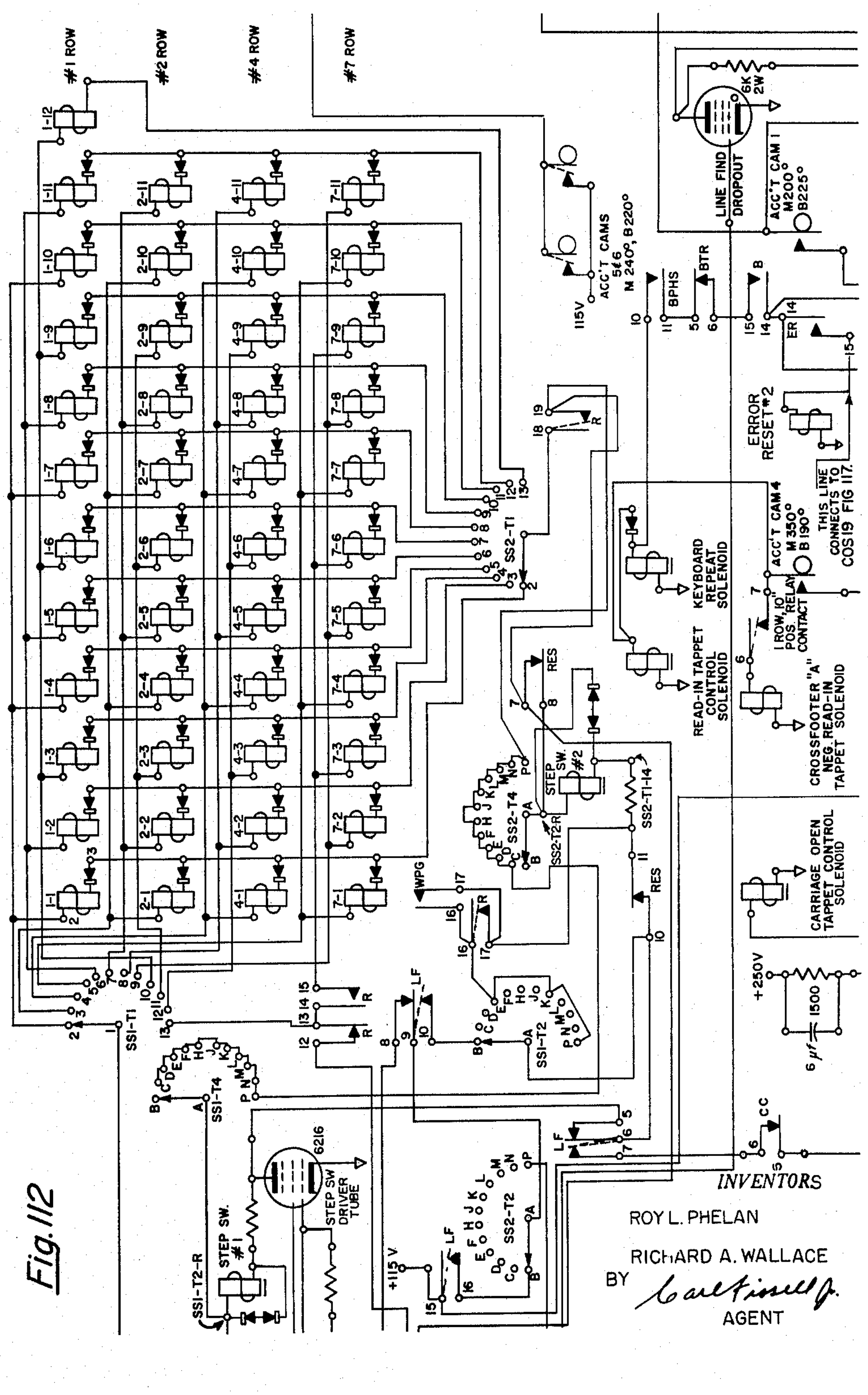
Figure 113:
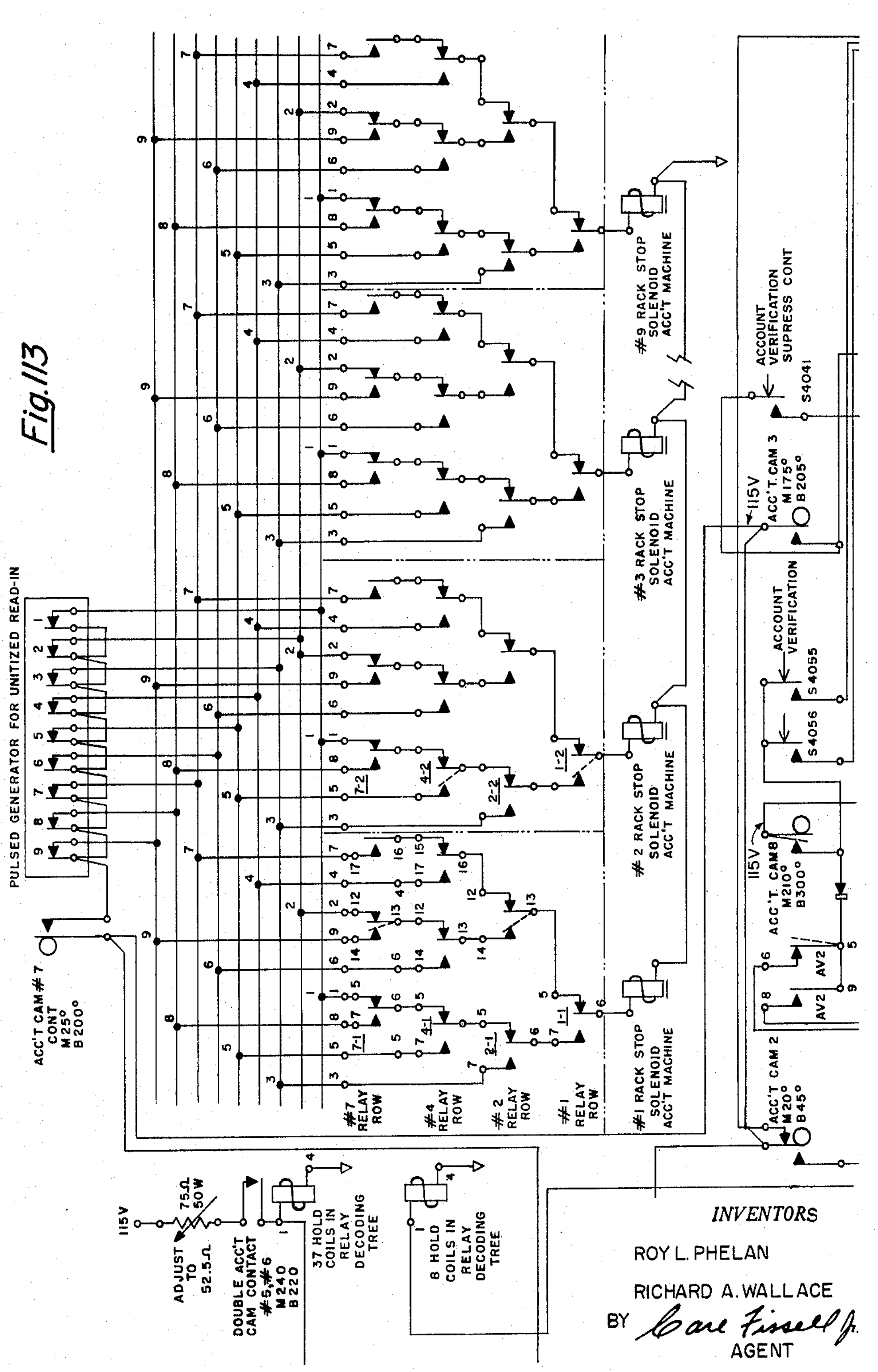

A journal roll mechanism identical in construction and operation to that described in the Butler patent and bearing similar reference characters where possible has been included in the carriage of the present invention. The mechanism as shown most clearly in FIGS. 87 and 88 and as seen in FIGS. 112–113 of the Butler patent, consists of a guide supporting member 1074, journal roll plate 1118, and several links and springs to actuate it. When arm 1127 is in its forward position, FIG. 87, plate 1118 is spring urged such that its rollers 115 engage platen 36. In this position paper can be fed across the journal table into the path between the rollers 1116 and the platen 36 and around the platen under the rollers on top of the platen (not shown) and be fed out of the back of the platen thus leaving the platen clear for front feeding of individual documents. As shown in FIG. 88 when the carriage is open and lever 1127 is moved to its rearward position plate 1118 is depressed away from the platen 1057 thus allowing an opening for feeding new journal paper around the platen.

*Accounting machine modification—Keyboard*

The basic accounting machine, as described in the Butler patent, has been modified, as herein indicated, to provide certain additional desired features and functions, each one of which requires certain electromechanical interconnections within the machine to provide ease of operational control and, in some instances, to provide for full or semi-automatic machine operation.

Three additional control keys, an on-off key, a reset key and an account verification key, have therefore been added to the keyboard of the machine as shown most clearly in FIGS. 2 and 93 to 97, so as to permit the operator to select at will various individual separate functions and operations of the machine. These keys will now be described together with their operating functions, in connection with the aforementioned figures.

An "on-off" key 22 has been added at the upper right hand portion of the keyboard. The key is a "latch down" type such that when it is depressed and moved slightly to the side it will stay down. The stem portion 492 of key 22 actuates switch 494, the main electrical switch, such that when the key is in its depressed position the switch contacts are made and the electrical circuits of the base machine are energized. Conversely, when the key is in the up position the contacts are open and the machine is turned off.

An electrical reset key 24 labeled RES has been placed in the C–3 position of the keyboard to provide a means of restoring the machine operations to normal following correction of errors. Key 24 is a momentary type such that when depressed its stem portion 496 actuates switch 498, and when pressure is removed the key returns to its up position.

An account verification key 26 labeled ACC VER is located in the lower left portion at position C–1 of the keyboard. This key is used to allow checking of account numbers. The key is a "latch down" type and operates the same as "on-off" key 22. The stem portion 500 of key 26 actuates switches 502 and 504 such that when the key is in its down position the switch contacts are made, while when the key is up, the contacts are open.

Immediately above the "on-off" key 22 is a green plastic shield forming a reflecting cover for a "ready" light 34 which is automatically illuminated after depressing the "on-off" key when the direct current (D.C.) comes on which is about ninety seconds after the initial turn-on.

A momentary electric switch 503, FIG. 94, has been added to motor bar 28, the "New Balance" bar, such that when the motor bar is depressed the switch closes, giving an electrical indication that the operator desires to have the machine print the new balance. As shown in FIGS. 93 and 94, depression of bar or key 28 causes a series of links substantially identical to the linkage in the Butler machine to rotate and move so as to depress the actuator arm of switch 503.

A similar type momentary switch 505 has been added to the "subtotal A" key, such that when the key 506 is depressed the switch will close and give an electrical signal that a subtotal has been called for by the operator. As shown in FIG. 97, depression of key 506 causes two links to rotate so as to depress the actuator arm of switch 505.

To provide automatic motor bar operation of the Butler machine, motor bar 30, i.e., checks motor bar, has had a solenoid 510 added to its. As shown in FIGS. 92 and 96, actuation of bar 30 can be achieved when the solenoid is energized. Energizing the solenoid causes core 512 to move downwardly which in turn pulls in links 514 and 516, thus depressing the bar, and energizing switch 515, giving an electrical indication of this operation.

The Butler machine is generally of such construction that depression of any of the motor bars or certain of the control keys will in normal use cause the machine to take an operational cycle. At the beginning of the cycle, however, the keyboard is locked against key depression by means of a drive trip shaft 223. As exemplified by the preferred embodiment set forth herein, this mode of operation has been modified so that while the carriage of the machine is cycling the keyboard is held open and the base machine is prevented from cycling even though a motor bar has been depressed. The keyboard machine block mechanism which is adapted to provide this mode of operation, as shown in FIGS. 99, 100 and 101, is a modification of the keyboard blocking mechanism shown in FIG. 21 and described in detail in column 22, line 11 of the Butler patent. In the present embodiment a locking tab 520 has been added to each one of the two pins 225 and 226 which carry bail 223 at their upper ends. The pins are spring urged to rock forward about pivot shaft 218 and are prevented from this motion by arms 234, FIG. 101, operated by the motor bars in the normal fashion, and by newly added arms 522 operated by magnet 524. Arms 522 are attached to shaft 526 which is journaled at both ends. Attached to the outboard end of the shaft is bifurcated lever 528 which engages magnet clapper 530. When magnet 524 is energized lever 528 rotates shaft 526 in a counterclockwise direction and thus raises arms 522 in position behind tabs 520—520 of arms 225 and 226 preventing rocking of bail 223 even though arms 234 are released by depressing a motor bar. Since the electric switch to the motor is prevented from closing by lever 192 which is actuated by bail 223, when the magnet is energized the keyboard will remain open and the base machine will not cycle even though a motor bar is depressed.

A keyboard repeat magnet 532 has been added to the right hand side frame to provide an automatic means of causing the amount entered on the keyboard to remain in the keyboard at the end of a cycle. As shown in FIGS. 92 and 93, the magnet operates the same linkage as the keyboard repeat key described in detail in the Butler patent at column 43 beginning at line 44, such that when the clapper is closed the keyboard will repeat, while when it is raised, the keyboard will reset at the end of each cycle.

*Accounting machine modification—Electrical read-in*

When used with the accounting apparatus forming the basis of the present invention, the Butler machine requires additional control features and operating adjuncts in order to permit the electrical amount information to be read into the racks, and electrical control and amount information to be placed in some of the sensing tappets. To accomplish these and other operations a decimal "read-in" unit is provided in the "C" register position, as shown in FIG. 6, and four tappet control magnets are provided at the rear of the machine, as shown in FIG. 98.

The read-in unit 45 which is disposed in the base machine transversely of the racks, only one 511 of which is shown in FIG. 6 is capable of stopping the actuator racks at any one of ten positions and thus read in decimal information. The structure of this unit is described in detail and claimed in the co-pending application of Stromback et al., Serial No. 492,186, filed March 4, 1955, entitled "Indicating Apparatus." The unit comprises nine electromagnets 534, one for each amount rack of the machine. Each magnet controls a clapper which, when current to the magnet is broken, engages one of ten buttress teeth 538 attached to the rack. Attached to the one end of the unit 45 is a pulse generator (not shown)

which moves in synchronism with the racks. As the racks move forward driven by bails 514, a pulse is generated at the time each rack tooth 538 is above the end of the clapper. Depending on the amount held in parallel form in an external buffer (not shown), each of the circuits to the magnets will be broken, allowing each clapper to engage a tooth of each rack and thus transfer the amount in the external buffer to the racks of the base machine.

In the present embodiment to which this invention is directed, the four tappet control magnets 540, shown in FIG. 98, control the functions of read-in, keyboard repeat, carriage open and crossfooter A subtract, as will be described in detail in the portion of this specification dealing with the electrical control circuitry. These magnets together with their associated mechanical linkages are essentially mechanisms which block the rise of the tappets 1811 so that when the base machine cycles, it will behave as if a control lug or pin 1767 of equivalent length had been inserted into the control panel 38. The advantage of these tappet control magnets is that information read into the machine is not dependent upon carriage position. The construction of this unit is described in detail and claimed in the co-pending application of D. E. Stromback et al., Serial No. 492,266, filed March 4, 1955, entitled "Remote Function Control System." Construction and operation of the units is such that when the clapper 542 is held against the magnets the pivoted abutting lever 544 allows tappet 1811 to rise to the predetermined height required to provide the desired operation. Should current to the magnet 540 be off while the base machine is cycling, abutting lever 544 will be out of the way of tappet 1811 allowing the tappet to rise and be stopped by a pin 1767 in the control panel 38.

*Counter dial mechanism*

In order to provide means for counting items, such as checks and deposits, an item counter 553 is provided. Referring to FIGS. 1, 90 and 91, the counter can be seen to comprise series of number wheels or dials 554 assembled in spaced apart relation along a stub shaft 555, one end of which is provided with a knurled zeroing wheel 556. The counter assembly is mounted as a unit by means of two vertical supporting members 557—557 disposed at opposite ends of the shaft. The supports are perforated to receive two parallel rods, 558—558 each one of which is secured at opposite ends thereof to the side frame 27. The number wheels of the assembly are adapted to be received through an aperture 559 (FIG. 1) suitably disposed in the front portion of the machine casing.

One end of the shaft 555 is provided with a bell crank 563 rockably engaging a crank arm 564 to the forward end of an actuator rack 511 so as to be rocked thereby in response to a longitudinal movement of the rack.

During the initial portion of the accounting machine cycle when, as set forth more fully in the Butler patent, at column 162 beginning at line 29 and with reference to Butler's FIGS. 157, 164 and 165, a sensing pin or feeler tappet 1828 senses a control projection or pin 1767, the action of the cam 565, similar to cams 1898–1911 of Butler, on shaft 1874 permits the spring 566 to rock the lever 567 moving the lower forward ear 568 of arm 569 out of the path of a slide (not shown).

As the cycle of operation continues and the rack actuating shaft 531 moves forward, the spring 530 moves the slide (not shown) forward. The latter, through bell crank 563 advances the counter dials when the actuating shaft 531 moves the slide rearwardly.

*Accounting machine modification—Electrical read-out*

When used with the accounting machine of this invention, the Butler machine requires devices which will indicate electrically the computed amounts and the sign of these amounts. In addition it is necessary to have electrical indications of whether the carriage is moving or whether it is in a "tab" position. To accomplish this a decimal "read-out" unit is provided in the "D" register position, as shown in FIG. 6, and two "in-tab" switches are provided at the rear of the machine, as shown in FIG. 98.

The read-out unit 47 consists of a transverse bank of eleven switch blocks each block including five single pole three-position switches. The construction and operation of this unit is described in detail and claimed in co-pending application of Deighton et al., Serial No. 492,232, filed March 4, 1955, entitled "Data Storage Read-Out and Transfer Apparatus." Each of the switches has a contact corresponding to the ten positions at which a rack 511 of the base machine may stop. The bank of eleven switches is mounted on a rocker assembly 546 which moves into engagement with the racks after the racks have moved to the position determined by the keyboard, crossfooter, and registers, and have stopped. Engagement with the racks causes the appropriate switch contact to close, producing an electrical indication of the positions of the racks which is stored until after the racks have reset.

The sign of the amount read out of the base machine depends upon the position of the A symbol slide 589. As more fully described in the Butler patent and as shown in FIGS. 92 and 93 of the present drawings when the machine cycles, the A slide 589 is spring urged forward. Depending on what occurs during the cycle, the slide will stop at one of seven positions. When a negative balance has been computed the slide will stop at one position at which a minus sign will print in a manner and by means of a mechanism set forth in detail in the Butler patent. A negative balance and account switch 550 is mounted on an auxiliary side frame as shown in FIGS. 92 and 93. Longitudinal movement of the symbol slide causes a camming member 552 secured at one end thereof to close the switch providing an electrical indication of the negative amount in the A crossfooter. Should the sign of the number be positive, the A symbol slide will stop at another position, and no electrical signal will be made.

Two "in-tab" switches 560—560 shown most clearly in FIG. 98 are utilized to provide an electrical indication that the carriage has stopped in a tabular position. Good electrical circuit isolation results from the use of multiple switches. A bifurcated lever 562 suitably pivoted to the inner carriage frame is adapted to actuate the two switches 560—560 by means of the inwardly turned portion 1478 of the latch yoke 1450 (not shown). This latter mechanism is described in detail in Butler No. 2,629,549 at column 136, line 54 and shown most clearly in FIGS. 125, 128 and 133 thereof. The electrical operation of the present "in-tab" switch mechanism will be described later in conjunction with the electrical circuit operation.

*Accounting machine modification—Cam and control panel switches*

A bank of nine cam driven switches is employed in the base machine in order to provide electrical signals dependent upon cam shaft rotation. The electrical operation of these cam actuated switches will be described in detail in connection with the electrical circuit. As shown in FIGS. 100 through 104, the switches 570 are driven by a cam shaft 572 mounting nine cams 574. The shaft is journaled at either end and at the outboard or left end, carries an upper toothed pulley 576. The pulley is driven by toothed belt 578 which is driven by a lower pulley attached to the main cam shaft 126. The two pulleys are the same diameter, such that when main cam shaft 126 makes one turn, cam shaft 572 also makes precisely one turn. As cam shaft 572 rotates in a counterclockwise direction the switch contacts are closed when the actuator rests against the major radius of the cam, and are open when the actuator rests against the minor radius.

At the rearmost portion of the machine as shown in FIG. 98 there is disposed a bank of seven momentary switches 580 which cooperate with the electrical pins 582 of the electrical lanes of control panel 38. The switches are mounted in two banks with their actuators aligned. As the carriage and control panel move transversely back and forth, pins 582 depress the actuators of the switches giving a variety of electrical signals dependent upon carriage position. Identical rollers 584–586 mounted on the rear switch bracket provide rear support to the control panel 38.

*Accounting machine modifications—Connector and covers*

As shown in FIGS. 2 and 7, all wiring in the base machine has been cabled and brought to the rear of the machine where it ends at a panel holding multi-pin connector receptacles 53. Plugs (not shown) for these connectors extend above the top surface of the desk 10 and connect the desk with the base machine. Also, as shown in FIG. 2, the side covers of the base machine have been extended rearwardly to enclose the portion of the machine occupied by the connectors. Access to the connectors is via a hinged door as shown.

*Posting desk—Power supply and electronic gate*

A power supply of conventional nature is mounted in the center of the posting desk 10. It provides the D.C. and B+ voltages required for operation of the machine.

As shown in FIG. 105, at the right hand side of the desk is packaged the electronic gate. This unit contains two pulse transformers, ten tubes, voltage monitor jacks, and a fuse plate. Attached to the rear wall of this gate are located the resistors, capacitors and diodes necessary for the circuits. The electronic components are required to amplify and shape the pulses being read from and written on the magnetic tape.

*Posting desk—Relay and stepper gate*

Referring to FIG. 106, at the left hand side of the desk is packaged the relay and stepper gate. This unit includes 34 control relays, 45 information relays, and 3 stepping switches. The latter are used to scan the information relays and the read-out switches. The relays are of conventional type as shown in FIG. 107. The stepping switches are electrically motor driven as shown. Construction of the stepping switches is described and claimed in detail in copending patent application to Deighton, Filed March 4, 1955, Serial No. 492,247, entitled "Program Scanning Apparatus." On the rear side wall of this gate are located the encoding diode matrix, and various other diodes necessary for current isolation in the electrical circuitry used herewith.

*The coding and electrical control system*

Figures 5A, 5B, 5C:
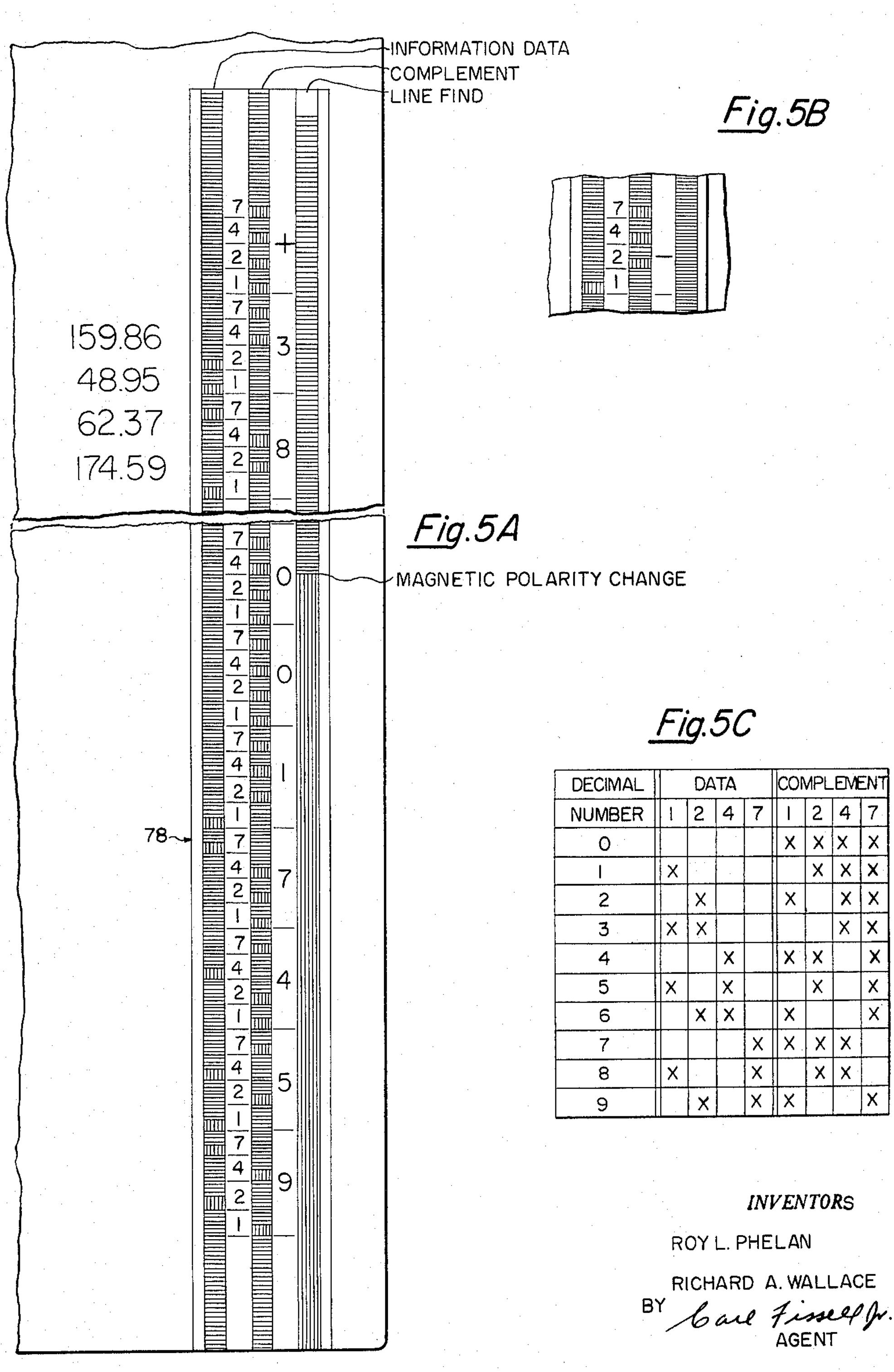
FIG. 5A is a plan view of a fragmentary part of a form or document similar to that of FIGS. 4A, 4B and 4C, illustrating a magnetic memory portion and the disposition thereon of magnetic pulse bits representative of a binary-decimal code arrangement in accordance with the present invention.
FIG. 5B is a view of a fragmentary part of the magnetic memory portion of a form illustrating the magnetic pulse bit representation for a negative balance amount.
FIG. 5C is a diagrammatic illustration of a modified four bit binary-decimal code arrangement employed in the illustrated embodiment of the present invention.

As mentioned earlier herein, the last numerical balance which is visibly printed on the record member is also encoded on the magnetizable portion 78 thereof. In order to represent the decimal amount of each balance magnetically with the least number of bits and handle this information with a minimum amount of amplifying equipment, the amounts are represented, as shown in FIGS. 5A, B and C, in a modified (1, 2, 4, 7) binary decimal code. The bits are arranged in vertical alignment on the magnetizable strip in a serial fashion. The representation of the code for the numbers 0–9 are illustrated in FIG. *5c*. To provide an internal checking means as well as a timing means two parallel representations of the numerical information are made on two tracks of the tape: (1) the data itself, and (2) the complement of the data. Since the capacity of the machine is 12 digits and each digit requires 4 pulses, 48 pulses are required. Thus each time a read or write cycle occurs, as will be described later on, a check can be made to determine if exactly 48 pulses are counted. Actually the 12 digits are used as follows: First digit=sign; second and third digits=account number, fourth to twelfth digits=amount. FIG. *5a* illustrates the manner in which the magnetizable strip is polarized to represent a + sign, account number, and an amount number of dollars. A minus sign representation is shown in FIG. *5b*.

The third track on the tape is the line find track. When the record member is first inserted into the carriage of the machine as a new account, balance forward, or balance transfer operation, the track is magneto-electrically prepared in a positive direction. Subsequently, after a new balance has been printed, the line find head pulses the tape tracks in a negative direction while the paper moves into the carriage. Thus the line find track always has one place when the magnetic polarity changes from positive to negative. FIG. *5a* shows this condition relative to the last printed balance.

The control system for this invention may be divided into three major parts. The major control is in the carriage. Secondary control is in the relays and final control is in the base machine. Control of the base machine is further divided into carriage control provided by the pins in the electro-mechanical control panel, and keyboard control provided by the operator.

*Account verification*

Account number verification permits two digits of the account number of each item to be indexed into the keyboard along with the amount of each item. The machine automatically compares these two numbers with two numbers which are stored on the magnetic tape 78 on the record medium along with the balance. If both pairs of numbers are identical the machine allows operation to continue otherwise the machine locks up and a red light 41 comes on indicating an operational error.

If the ledger or statement sheet is full when the balance is read, the balance will be read into the machine but the machine will not print it and the red error light will flash. At this point the carriage may be opened manually, the filled sheet removed manually and the carriage tabulated to the new balance position. The subtotal A key is then depressed and a blank sheet or card inserted between the form guides. The blank sheet will feed automatically to line zero and the balance will print as a subtotal amount and the carriage will tabulate to the first check position. Posting can then be resumed in a normal manner.

The machine is capable of checking the operations performed during magnetic reading and writing of the balance. The internal circuits are such that if the machine makes an error during reading it will lock up and flash the red error light. The operator can then manually index the balance into the keyboard and depress the reset key and the machine will print the manual pickup and a symbol signifying that the pickup was manual and not automatic. Should the machine make an internal error during writing after the page is ejected the red light 41 will flash until the reset key is depressed thus warning the operator that it has written incorrectly on that sheet.

Balance transfer can be handled in either of two ways:

(1) A blank card may be inserted in the machine which will feed automatically to line zero. The balance may then be entered manually into the keyboard and the balance bar depressed. The machine will print the balance in the new balance position as a total and eject the form.

(2) Balance transfer also may be accomplished by inserting the old sheet in the carriage and reading the balance as in the usual old balance pickup cycle. The carriage may then be opened, the record medium removed, the carriage tabulated to the new balance position, the subtotal A key depressed, and a blank card inserted into the carriage. The card will feed to line zero and the balance will print after which the card is automatically ejected.

*General description of the electrical circuit diagram*

The electrical circuits of the machine are illustrated generally in FIGS. 110 through 121. The description of the drawings will be divided into the following sub-headings in order to permit the separate detailed explanation of the main units of the machine.

I. Read Operation
II. Write Operation
III. Accounting Machine Operational Cycle
IV. Blank Card Operation
V. Account Verification In the circuit diagram, referring more particularly to FIGS. 112 and 113, a total of forty-five relay magnets are diagrammatically illustrated. These comprise the code analyzing storage whiffle tree. Since it would appear to add to the complexity of the circuit connections to show the relay magnets and their contacts together, the magnets have been illustrated in outline form only as in FIG. 112 and the contacts therefor are shown separately as indicated in FIG. 113.

The relay magnets are indicated generally by reference characters designating the row and column of the particular relay, for example, 1–1, 2–1, 4–1 and 7–1 indicates the first column 1, 2, 4 and 7 row relays. Their associated contacts have been shown in the normally closed position in FIG. 113 of the drawings. Each relay carries three "form C" contacts, i.e., dual bifurcated contact arms bearing individual contact buttons at the end thereof. An operating strap or arm carrying oppositely disposed pairs of mating contacts at the end thereof is rockably mounted between respective pairs of contacts buttons. The operate straps are normally spring biased to a closed position. Each one of the magnets is provided with an energizing or "pick" coil and a "hold" coil or winding.

Figures 110, 119, 120, 121, 122:
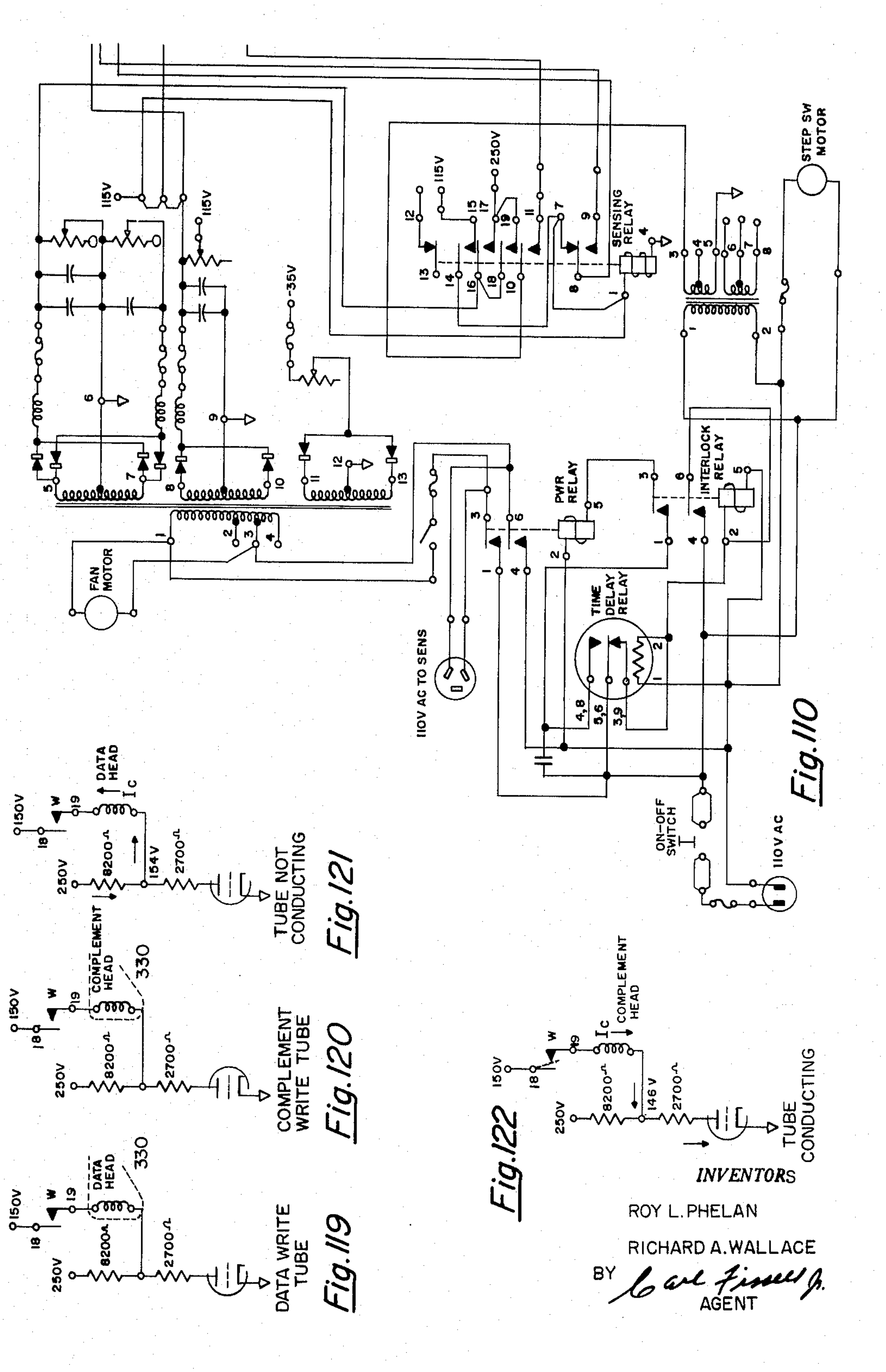

A diode matrix for the 1–2–4–7 binary decimal conversion of the numerical information of the present invention is also diagrammatically illustrated in FIG. 110. The relay whiffle tree electrical connections to the diode matrix are shown at the upper left portion of FIG. 113.

*System voltages*

In the following description it will be presumed that a conventional power supply is available which will provide a +250 volt output, a +115 volt output, a +6.3 volt output, all of which are A.C., and a −35 volt D.C. output. No detailed description, therefore, will be given of the power supply. The following material will be subdivided as before mentioned into sections for ease in reading and understanding. Either of three types of record media may be utilized during the read or write operations, i.e., a ledger, a statement form, or the improved ledger-statement form of FIG. 4*c*. The back of each of these forms has been, as previously discussed, provided with a magnetic strip or tape.

In order to further simplify the reading of the electrical circuit diagrams of FIGS. 110 through 121 inclusive, various additional components such as relays, relay points, cam contacts, switches, etc., have been designated by an appropriate symbol or abbreviation. For example, line find relay points 12 and 13 are indicated in FIG. 111 by the letters LF and the numerical designation 12 and 13. The univibrators are designated by the letters UV, the inverter by the letters INV, and so on throughout the specification.

I. READ OPERATION

A read operation is the action of sensing the magnetically coded old balance stored on the record media, amplifying this low level information, and introducing it into a storage or memory unit where it will be readily accessible to the accounting machine.

The read operation starts immediately after the record medium or form 62 is inserted in the carriage 16 of the machine. The operator aligns the form casually by inserting the paper between the carriage paper guides 286 and 288 and thereafter pushing it down into the carriage throat until the bottom edge of the form forces the roller 369 of the front paper switch alignment contact 364 upwardly, causing the alignment contact points 377 and 378 to make. This action initiates the overall accounting machine operation cycle which is described in detail under Section III and illustrated in FIGS. 128 and 109. Starting this cycle causes the carriage paper stops or pushers 306, 308 and 310 to push the bottom edge of the paper outwardly, squaring the paper within the aforementioned guides, thereby causing a "fine" alignment of the record media. When this "fine" alignment is accomplished paper drive feed rollers 260–266 in the carriage 16 grip the paper, and the magnetic head assembly 330 is lowered onto the magnetic track on the paper. The paper is then driven down into the carriage throat with the magnetic tape traversing under the magnetic heads in direct contact therewith. As before mentioned the head assembly is comprised of three magnetic "heads," designated respectively the data or information head, the complement head and the line find head, FIG. 111. The line find head is not used in the read operation, therefore, its operation will be described later. The data head is used to sense all pulses representing information bits or data bits as the name implies. The complement head is used to sense the complement of the data information.

In each instance where no information pulses are present on the magnetic tape a pulse will be picked up by means of the complement head. Four "bits" are required to represent any digit using the modified binary coded decimal system. The "data" plus the "complement" head will supply the four "bits" for any desired digit.

The magnetic tape on the record media is used as a receptor for the storage of the old balance and line find information. The tape of the illustrated embodiment, as shown in FIG. 5A, has three tracks or areas which have been magnetically polarized by the three magnetic heads along substantially the entire length of tape that will be scanned by the heads. Each digit will be represented by four "bits," the first bit representing "one," the second bit representing "two," the third bit representing "four" and the fourth bit representing "seven." Any combination of two of these bits is sufficient to represent a single digit. The "one" and "two" bits representing a three, the "two" and the "four" bits representing six, and so on. On the magnetic tape there will be stored eleven digits plus sign information. Assuming four bits per digit, this means forty-four bits will be written for numerical information plus one bit for sign information, making a total of forty-five bits. To make the step switch scanning system of the present invention self-resetting, as will be described later, three additional bits are utilized to make the bit total forty-eight. Since the last three bits do not represent any data or information, they will always appear in the complement track. As can be seen in the reference drawing, FIGS. 5A, 5B and 5C, starting from the bottom of the ledger form, the units position "one" bit is first, then the units position two "bits" and so on. The diagram clearly shows that if an information or data pulse is not present a pulse will be written on the complement track. Thus the combination of the two tracks forms a timing track for the system and the total number of pulses in both tracks is forty-eight. This forty-eight pulse total is also used as a means of checking. If any extra or any less pulses are sensed, an error will be indicated.

There being a total of forty-five bit or information pulse positions on the tape there must be forty-five individual storage units for each possible "bit" of information. As can be seen in FIG. 112 of the circuit diagram a total of forty-five relay magnets are illustrated. These comprise the code analyzing storage relay whiffle tree and will be used to receive and store the old balance information until printing time. By applying the rated voltage across the "pick" coil of each relay in the form of a 4¼ ms. pulse the relay will be energized causing its contacts to be transferred from the normally open position to the closed position. The hold coil provides an initial bias on the relay, but will not in itself cause the relay to operate. However, voltage impressed across the "hold" coil will tend to make the relay operate faster when the "pick" coil is energized. Also, energizing the "hold" coil will prevent the relay armature from dropping out after the pick coil has been de-energized. In other words, the hold coil will not operate the relay, but once the relay is picked it will hold the relay armature against the core while the rated voltage is being applied.

From the foregoing it can be seen that each individual "bit" on the tape therefore will be sensed and routed to its specific whiffle tree relay magnet, causing that relay to operate. The selected relay will then be held by the hold coil until after this information is transferred back into the base machine.

The process of routing these pulses representing information bits to the correct relay coil is performed by two step switches similar in construction and operation to the stepping switch described and claimed in the co-pending application of William W. Deighton, Serial Number 492,247, filed March 4, 1955, now Patent No. 2,906,838, entitled "Program Scanning Apparatus." Each step switch includes four tiers of twelve contacts, each tier is scanned by an individual rotor contact.

An operating magnet and associated friction clutching mechanism controls the drive on the rotor contacts from a constantly turning drive shaft. The four rotor contacts on an individual step switch turn synchronously with each other and step from one contact on each tier to the next successive contact on each tier on the break of a pulse applied to the step switch magnet. This pulse must be adequate to cause the clapper of the step switch magnet to be pulled in against the magnet core before the rotor will be permitted to step on the break of the pulse. To affect this operation a three millisecond pulse is supplied to the magnet winding which has approximately a fifty percent safety factor, i.e., a 2 millisecond pulse being sufficient.

Considering both complement and data tracks, the pulse packing density is ten per inch so that forty-eight pulses utilize 4.8 inches of tape with one-tenth of an inch per pulse. The pulse length on the tape is .03 inch with .07 inch erased portion between pulses. The tape traverses under the magnetic heads at a speed of ten inches per second therefore the pulse repetition rate is approximately one hundred pulses per second. Each individual pulse is thus three milliseconds in time length.

Under read operation conditions, as will be discussed presently, a read relay will have been picked to control the operation of taking information from the tape and storing it in the whiffle tree relays.

The paper is driven down into the carriage throat at the rate of ten inches per second with the magnetic heads in contact with the tape and a number stored magnetically on the tape. In the embodiment set forth herein and illustrated in FIG. *5a*, the number stored is +38000017459. The first pulse is on the complement track since the first information digit to be sensed is a nine having the "one" bit in the complement track, the two "bit" in the information track, the four "bit" in the complement track, and the seven "bit" in the information track.

Referring to FIGS. 111 and 112, the latter forming a continuation of the first, as the leading edge of the first pulse passes under the complement head gap, a current is induced in the head coil causing a voltage to appear across the head winding. This resulting voltage pulse appears across the input of the complement pulse transformer through the normally closed high speed mercury line find relay points 5 and 3. The voltage is stepped up through this transformer and the resulting larger pulse is sent into the first stage of the number two amplifier. The pulse is amplified and is applied through line find 13 and 12 points through a diode to the input of a three millisecond univibrator as a forty volt one-half millisecond pulse. This pulse triggers the univibrator which in turn shapes and lengthens the pulse to a three millisecond square pulse. The shaped pulse is applied to the control grid of the step switch driver tube, which in the illustrated embodiment is a type 6216, FIG. 112, making the control grid of the latter tube slightly positive with respect to the cathode thus allowing the tube to conduct.

Allowing this tube to conduct causes current to flow from the 250 volt source, as shown, through RES 5 and 6, through step switch number one coil, through the tube to ground. The current is maintained through the coil for three milliseconds, which as before mentioned, is adequate for the step switch to prepare for stepping. The tube shuts off on the break of the three millisecond pulse and the step switch coil is thus de-energized. The step switch magnet clapper in being pulled away from the magnet allows the constantly turning drive shaft of the switch mechanism to transmit power through the friction clutch so as to turn the rotor contacts on all four tiers of the switch from contacts 2 and B to contacts 3 and C.

When the rotor contact on step switch 1, tier 1 was stationary on contact 2, relay pick coil 1—1 in the code analyzing whiffle tree had been selected by step switch 1, tier 1 and step switch 2, tier 1 and placed in the plate circuit of the information driver tube shown in the illustrated embodiment as a type 6AN5. That circuit is as follows: From the 250 volt source through R19 and 18 now closed, through step switch 2, tier 1 rotor contact to its #2 contact, through code analyzing whiffle tree pick coil 1—1, through step switch #1, #2 contact to its rotor contact through R8 and 9, now closed to the plate of the information driver tube. Since the information driver tube remained cut off, this code analyzing relay pick coil is not energized. When step switch #1, tier 1 rotor contact steps to #3 contact, whiffle tree pick coil 2–1 is selected between step switch 2, tier 1, and step switch #1, tier 1, a circuit is completed from a 250 volt source which now places relay pick coil 2–1 in the plate circuit of the information driver tube.

The leading edge of the second pulse now passes under the information head gap. This pulse induces a current in the information head coil causing a voltage pulse across the primary of the data pulse transformer, which is supplied to the input of amplifier #1 through the pulse transformer. The pulse is amplified and triggers directly the 4¼ millisecond univibrator and simultaneously triggers the 3 millisecond univibrator through a diode. The 4¼ millisecond univibrator supplies a 4¼ millisecond square wave to the control grid of the information driver tube 6AN5 causing the grid of this tube to go slightly positive with respect to its cathode allowing the tube to conduct for that time. When that tube conducts, whiffle tree relay pick coil 2–1 having been placed in the plate circuit of that tube, is energized, causing the contact points, FIG. 113, to transfer. This relay is held energized by maintaining 115 volt D.C. across its hold coil, shown schematically in FIG. 113, left hand side. The circuit is from a 115 volt D.C. source through base machine cams 5 and 6, now closed, through all hold coils that will have balance information in them to ground. Thus the relay 2–1 will remain energized until 220 degrees of the base machine cycle when cams 5 and 6 break. As can be seen from this hold circuit, any whiffle tree relay storing balance information once picked, will hold until 220 degrees of the next machine cycle.

Triggering the 3 millisecond univibrator again causes the control grid of the step switch driver tube 6216 to go slightly positive with respect to its cathode allowing the tube to conduct. This again energizes step switch #1 coil as the complement pulse did before, and, on the break of the pulse, the rotor contact of step switch #1, tier 1 will step from contact 3 to contact 4. Stepping to contact 4 will now place whiffle tree relay pick coil 4–1 in the plate circuit of the information driver tube.

Pulses from both the data and complement tracks will trigger the 3 millisecond univibrator which in turn causes step switch #1 coil to be energized thereby stepping step switch #1 rotor contacts. Since the total of pulses in both tracks is forty-eight, step switch #1 will step forty-eight times during the read cycle.

The third pulse will be in the complement track and therefore be sensed by the complement head, amplified by #2 amplifier triggering the 3 millisecond univibrator causing the step switch #1 to step, as previously described. Since the pulse was on the complement track, the information driver tube was not permitted to conduct and whiffle tree relay coil 4–1 was not energized. Stepping step switch #1 causes the rotor contact on step switch #1, tier 1 to make with contact 5 thereby placing whiffle tree relay pick coil 7–1 in the plate circuit of the information driver tube. The rotor contact of step switch #1, tier 2, stepping in conjunction with tier 1, will step to contact E. This will place the coil of step switch #2 in the plate circuit of the step switch driver tube, in parallel with the coil of step switch #1. The circuit is as follows: From the 250 volt D.C. source, through RES 7 and 8, through the step switch #2 coil, through R16 and 17 to contact E of step switch #1, tier 2, through the rotor contact of that tier, through line find 6 and 5 to the plate of the tube.

The fourth pulse to be sensed is in the information track and will be picked up by the informaiton head, amplified by #1 amplifier and will trigger both the 4¼ milliseconds and 3 milliseconds univibrator. The 4¼ milliseconds univibrator allows the information driver tube 6AN5 to conduct which now energizes whiffle tree relay 7–1 causing that relay's contacts to be transferred. Since voltage is being applied to the hold coil the relay will remain energized until 220° of the first base machine cycle as previously described.

Triggering the 3 millisecond univibrator will in turn allow the step switch driver tube 6216 to conduct. The tube now has both step switch #1 coil and step switch #2 coil in its plate circuit and both these coils will be energized causing both step switches to set up for stepping. On the break of the 3 millisecond pulse both coils are de-energized and the rotor contacts of both step switches will step one contact position. Step switch #1, tier 1 rotor contact steps to contact 6 and step switch #2, tier 1 rotor contact will step to contact 3. This will place whiffle tree relay pick coil 1–2 in the plate circuit of the information driver tube.

As seen on the diagram, FIG. 112, the vertical rows of four whiffle tree relay coils represent digit positions, starting from the left with the number one and ending at the right with the number eleven. The coils are numbered with two numbers as 1–2, the first number (1) representing the "bit," the second number (2) representing the digit, e.g., 2 represents the second digit.

The first digit has now been transferred to the whiffle tree relay storage unit. For the digit 9 a seven bit relay and the two bit relay have been energized and held for future use. The four bit and the one bit relays have not been energized indicating that no information is present in those bit positions.

Step switch #1, tier 1 and step switch #2, tier 1, have now scanned the first digit and have selected the first bit of the second digit in the code analyzing whiffle tree. Each digit will be scanned in a like manner by selecting each "bit" relay coil by means of these two step switches. The presence or absence of information throughout the length of tape will thus be transferred to the whiffle tree relays. The relays will then contain the old balance and account number information.

The hold circuit for the eight relay coils used in storing the "two-digit" account information is different from that for the balance information. The two digits will be retained in the whiffle tree for a longer period of time. This circuit will be discussed under the heading account verification.

In order to utilize the information stored in the relay whiffle tree, the balance information must be transferred into the base machine for printing and storage in a crossfooter. This transfer is affected by means of the earlier described read-in unit on the base machine which operates in conjunction with the whiffle tree relay contacts. In the illustrated embodiment of the invention shown herein, this read-in unit, FIG. 6, comprises twelve solenoids, and a pulse generator. Each solenoid controls a clapper which is located directly under a saw tooth series of notches cut in the lower edge of each actuator rack 511, which will in turn, control the type bars and crossfooter. The position of each notch on the rack with respect to the clapper of the aforementioned solenoid represents a definite digit position. If the rack is stopped in the first notch as it is traversed forwardly from the back toward the front of the base machine, a zero will be stored in the crossfooter and set up to print by means of an associated type bar. If the rack is stopped in the second notch, a "one" will be printed and stored. The third notch will cause a "two" to be printed and stored. Thus, for each successive notch a digit larger by one will be printed and stored up to and including a number nine.

The pulse generator associated with the read-in unit operates in synchronism with the rack movement. Before the racks move, all the contacts of the pulse generators are closed. As the racks and the slide controlling the contacts of the pulse generator move toward the front of the base machine the "one" contact on the pulse generator will open approximately seven milliseconds before the time the "read-in" magnet clapper will engage the saw tooth that will stop the rack and cause the rack to store and print a "one." Since all the racks move in unison, the foregoing applies to the relationship between all of the racks and their respective "read-in" solenoid clappers. The racks continue to move in conjunction with the pulse generator slide so that the #2 contact will open approximately seven milliseconds before the time a released "read-in" clapper will engage the saw tooth on the racks that will stop the rack in a position where a "two" will be stored and printed by the base machine. The three contact stops the rack for a three and so on up to and including nine.

As shown in FIGS. 113 and 116 the contacts of the relay whiffle tree are electrically interconnected between the pulse generator and the rack stop solenoids. Since the number stored in these contacts is +38000017459, the series of contacts feeding #1 rack stop solenoid will represent a nine, the series of contacts feeding the #2 rack solenoid will represent a five, and so on up to and including the #9 rack stop solenoid. The number 38 is stored in the whiffle tree contacts as shown in FIG. 5*a* and represents an account number. These latter two digits are to be used for account verification, and this operation is discussed under that heading.

Since a nine was stored in the first digit position in the whiffle tree, the contacts feeding the #1 rack stop solenoid, FIG. 113, will be set up as follows: Starting from that solenoid the #1 relay row relay contact is closed, both the #2 relay row relay contacts are transferred, as shown, since that relay was energized on reading, the three #4 relay row relay contacts remain in their normally closed condition, and the three #7 relay row relay contacts are transferred since that relay was energized on reading. The circuit is from ground through the #1 rack stop solenoid, through the operate strap to #1 relay row contact 5 and 6 points normally open, now closed, through the #2 relay row relay points 13 and 14, through #4 relay row relay contact 12 and 13 points, through #7 relay row contact 13 and 14 points normally open, now closed, through the nine contact on the pulse generator, through base machine cam 7 to voltage. Thus it can be seen that the only voltage path to the #1 rack stop solenoid is through the 9 contact of the pulse generator. When the base machine cycles, voltage will be applied to the #1 rack stop solenoid until the 9 contact on the pulse generator opens. Since the contact operating slide moves synchronously with rack movement the clapper of the solenoid will have 7 milliseconds of time to travel upward and engage the saw tooth notch on each one of the racks that will cause a nine to be printed and stored in the base machine before the rack passes the stopping or abutting edge of the clapper. The time required for the clapper to travel upward far enough to strike the notched rack is 3 milliseconds, therefore the 7 milliseconds of time allotted for this operation is adequate. A nine will therefore be set up for printing and storage in the machine crossfooter in the first rack position. Since the whiffle tree relay contacts supplying the #2 rack stop solenoid have a five in them; that is, with #1 relay and #4 relay contacts transferred, the only voltage path to the #2 rack stop solenoid will be through the #5 contact on the pulse generator, this therefore will control the machine operation so that a five is read into the machine in that digit position. All other numbers stored in the whiffle tree relays will be read into the base machine in a like manner, simultaneously. This will complete the transfer to the digital information from the magnetic tape to the whiffle tree relays and thence into the accounting machine; thereby completing the read-in operation.

II. WRITE OPERATION

A write operation is the action of converting the computed new balance which has been stored in the decimal read-out switches of the base machine, into a modified binary coded decimal representation, and then encoding and storing this converted balance magnetically along the magnetic tape of a record medium.

The write operation takes place during that portion of the operational cycle in which the record medium is being ejected from the carriage. The final operation which is performed on the record medium is that of erasing the prior stored old balance and writing the new balance thereon as the medium is being driven outwardly from the carriage. To maintain the desired coding sequence the highest order digit and highest order bit, or 12th position digit, 7 bit, is written first and so on progressively to a lower order so that the last bit to be written is the units position digit, one bit. As explained earlier in the description of the read operation a combination of 48 bits is written on the complement and the data or information tracks. Where there is no information, such as the "one," "two" and "seven" bits for a digit "four," these bits will be magnetically encoded on the complement track. The "four" bit will be magnetically encoded on the information track. The same magnetic "heads" used in the read operation for sensing or picking up the balance will be used to record or write the balance. In the case of writing, referring more particularly to FIGS. 11, and 119 through 122, it can be seen that each "head" is connected to the plate of one triode of a duotriode write tube which in the illustrated embodiment is shown to be a type 5687. The other triode which is connected to the data head is termed the data write tube, the triode connected to the complement head is termed the complement write tube. The complement and data write circuits are shown schematically in the aforementioned figures.

The write relay "W" which is energized during the write cycle is illustrated with its contacts in the normally open position. The relay points shown will be closed during the write operation. Referring now to FIG. 121 with the write relay contacts closed and the write tubes not conducting, the current flow through both magnetic heads will be from 250 volts through the plate resistor, through the magnetic head to 150 volts, as shown. The magnetic track will thus be polarized in what is designated as a negative direction and any information on the track will be effective erased. When the tube is conducting, as shown in FIG. 122, the current flow through the head will be in the opposite direction. The circuit is from 150 volts through the magnetic head through the tube to ground. The magnetic track on the record medium will then be polarized in what is designated a positive direction and the selected information or data will be recorded on the track. It follows from the foregoing that new information can be written magnetically on the magnetizable portion of the record medium through the expedient of controlling the conduction of the data and the complement write tubes.

As the record medium is ejected from the carriage, FIGS. 108 and 109, the magnetic tape will traverse under the heads from the position of furtherest penetration of the paper into the carriage, down to a position with the heads at the extreme bottom edge of the tape. Thus it can be seen that the entire portion of the track which is scanned by the magnetic heads will either be erased or have new information recorded thereon, because there is always a current flowing through the heads, either in the erase or record direction. It is apparent that in writing the computed new balance, the old balance or the information originally stored on the tape is removed.

The new balance to be encoded on the magnetic tape is set up and stored in the decimal readout switches of the base machine as earlier described. Referring to FIGS. 6 and 111 these switches comprise a series of movable operating contacts, designated by arrow points, and ten fixed contacts per switch designated by connector points, for each digit, only a portion of each being shown. The operating contacts for each digit are tied together. The ten fixed contacts of each digit are tied to a common line which represents a nine, an eight, a seven, and so on down to a zero line. Only one operating contact for each digit will be closed and this will represent the digit stored. For example, the digit nine will be set up by the operating contact being made against the fixed contact point which is tied to the line representing a nine. All of the other contacts for that digit will be in the normal or open position. When the information is set up in these switches it will remain there until new information is placed in the switches during a base machine cycle.

The nine individual lines representing the numbers nine to one are electrically connected to a diode matrix where the decimal information in the switches is converted into the modified binary coded decimal information. The output of the diode matrix is connected to step switch 1, tier 3, and consists of four electrical lines each representing a "bit." There is illustrated herein a 7 bit line, a 4 bit line, a 2 bit line, and a 1 bit line. The decimal lines entering the diode matrix from the decimal switches are electrically interconnected so as to form a combination of these "bits." The nine line has two diodes connecting it to the 7 bit and 2 bit lines, the eight line has two diodes connecting it to the 7 bit and 1 bit lines, and so on down to the one line which is connected through one diode to the 1 bit line. Diodes are used in this matrix so that any decimal line having a voltage on it or which is electrically "hot" cannot make another decimal line "hot" inasmuch as the back resistance of the diodes makes all decimal lines into the bit positions uni-directional as far as current flow is concerned.

The input to the decimal readout switches and the output of the diode matrix are scanned by different tiers of the same two step switches used in routing the read pulses to the correct relay coil in the whiffletree. The operation of these switches is the same as for reading. Step switch 2, tier 3, is used for digit scanning, while step switch 1, tier 3, is used for selection of the correct "bit." As in reading then, step switch 1 will step once for each possible "bit" of information or forty-eight times. Step switch 2 will take one step for each digit position or twelve times. On every write pulse, step switch 1 will be conditioned to step on the break of the pulse, on every fourth pulse both step switches 1 and 2 will be conditioned to step on the break of the pulse. This enables step switch 1, tier 3, to select, or look at, all four "bit" positions of a particular digit before step switch 2, tier 3, selects the next successive digit position.

Step switch #3 is utilized in the write operation as a first "full" pulse discriminator and also as a gate. It is necessary because of the speed of operation of the step switches that a time of 10 ms. (milliseconds) be allotted from the leading edge of one pulse to the leading edge of the next. If this time were reduced a read error might occur. The pulses controlling the write circuits are in turn controlled by relay contact points on the write pulse gate relay, identified WPG in FIG. 111. This relay is not synchronous with the action of the write pulse source, therefore, the contact points could make at a time which would allow a fraction of a write pulse to be seen by the write tubes and the scanning circuit. This pulse might not be long enough to step switch 1 and step switch 2 but would be recorded on the track, causing 49 pulses to be encoded. If the correct number of pulses were encoded because the first pulse were long enough to operate the step switch, the leading edge of the first pulse would be less than 10 milliseconds from the next by that fraction of the first pulse that was lost. It is necessary, therefore, that the first pulse to be recorded be a full 3 millisecond pulse.

The write pulse generator is a cam contact, see lower right hand corner FIG. 111, termed the emitter 92 FIG. 7, the cam 94 of which is mechanically coupled to the feed roll drive shaft 86. With the feed rolls 260, 262, 264, and 266 (FIGS. 108 and 109) turning so as to drive the paper or record media at a speed of 10″ per second, the cam contact will make for 3 milliseconds and break for 7. This will place the data pulses along the magnetic strip as positively polarized pulses for .03″ with a .07″ erased portion between pulses, the total length per pulse is then 1/10″, which means that 48 pulses will require 4.8″ of tape. Since the emitter is mechanically coupled or synchronous with the feed rolls, the pulses will be equidistantly spaced along the length of the magnetic track regardless of variations of motor speed.

As the paper is ejected from the carriage with the magnetic tape traversing under the magnetic heads in direct contact therewith, the bottom edge of the record medium will clear the actuating roller 376 of the line minus 1 paper switch. This allows the actuating roller to drop causing the line minus 1 paper contact to make. When these contacts make, a circuit is completed which will energize the write pulse gate relay, upper left FIG. 116. The circuit is as follows: from the 115 v. source through the write pulse gate relay coil, through write 14 and 15, now closed, through operate 2–16 and 17, through the line minus 1 paper contact to ground. Energizing this relay causes the operate contacts of the relay to transfer from the normally closed contacts to the normally open contacts. The first pulse from the emitter will go through write pulse gate 18 and 19 (FIG. 111, lower center) and be applied to the rotor contact of step switch 3, tier 1. Since the rotor is sitting on #2 contact, this pulse finds an open circuit. The emitter pulse also goes through write pulse gate 10 and 11 and is applied to step switch 3, tier 2, through the rotor contact to B contact and thence through the coil of step switch 3, causing that coil to be energized. If this pulse is adequate to actuate the armature of step switch 3, this step switch will step its rotor contacts from 2 and B to 3 and C on the break of the pulse. If the pulse is inadequate in time length to actuate the armature, the next full pulse will be applied across step switch 3 coil, through the same circuit, causing the step switch rotor contacts to step on the break of that pulse. The rotor contact of step switch 3, tier 2, will step from B, to an open point, breaking the circuit to the step switch coil. The rotor contact of step switch 3, tier 1, will step to 3, which will allow the succeeding pulses to scan the decimal readout switches for encoding the balance magnetically. Since the step switch requires approximately 4 milliseconds to step its rotor contact from one contact to the next and there are 7 milliseconds from the break of one pulse to the make of the next, the first pulse available to the write circuits through the step switch contact located at step switch 3, tier 1, contact 3 will always be a full 3 millisecond pulse. The succeeding pulse from the emitter or the first pulse to be recorded, will travel through write pulse gate 18 and 19, through the rotor of step switch 3, tier 1, to contact 3, will go to an input on the information coincidence detector and an input on the complement coincidence detector, through write pulse gate 14 and 15. This pulse is also sent to the rotor of step switch 2, tier 3. The rotor contact is at its initial position, or on the 2 contact. The pulse will then be applied to negative balance 19, since the number to be written is +38000017459, or a positive balance, the negative relay balance point is open. Therefore, the data line, or the line to the coincidence detectors, from step switch 1, tier 3, will not see this pulse. With the line from step switch 1, tier 3, still low because of the data pulse not reaching it, the information coincidence detector having only 1 input high will not produce an output pulse and the data write tube will remain cut-off. Since there is an inverter tied to the line from step switch 1, tier 3, that low voltage is inverted and made high to the input of the complement coincidence detector. This causes both inputs to the complement coincidence detector to be high for the entire length of the emitter pulse. This pulse, therefore, will appear at the output of the complement coincidence detector and through BC1–7 and 8 is applied to the grid of the complement write tube, allowing that tube to conduct, causing a pulse to be written on the complement track as previously described.

This same pulse from the emitter will be applied to the grid of the step switch driver tube 6216, allowing that tube to conduct. Allowing this tube to conduct causes current to flow from 250 v. through RES 5 and 6, through step switch #1 coil, through the tube to ground. The current is maintained for 3 milliseconds or the length of the emitter pulse which is adequate to actuate the armature of the step switch which will prepare it for stepping. Conduction in this tube stops on the break of the 3 millisecond pulse and the coil is deenergized. This allows the constantly turning drive shaft of the step switch assembly to turn the rotor contacts 2 and B to contacts 3 and C of step switch 1 through the friction clutch, according to the aforementioned Deighton application, Serial No. 492,247. Step switch 1, tier 3 rotor will therefore step from contact 2 to contact 3.

The second pulse to be recorded will follow the same path as the first from the emitter to the input of both coincidence detectors. The same pulse travels through step switch 2, tier 3, contact 2 to NB (negative balance) 19 and again finds this point open. Since this is the only path to the data line input to the coincidence detectors this input will remain low preventing an output from the information coincidence detector, thus the data write tube will remain cut off. Since the data line is inverted to the complement coincidence detector that input to the complement coincidence detector will remain high. The other input will be high for the duration of the emitter pulse, therefore this pulse will be seen on the output of the complement coincidence detector and be applied to the grid of the complement write tube, allowing this tube to conduct and recording this second pulse in the complement track.

This same emitter pulse will again be applied to the grid of the step switch driver tube allowing this tube to conduct and again energizing the coil of step switch 1. On the break of the pulse step switch 1 rotor contacts will step to the next contact position. Step switch 1, tier 3, rotor contact will therefore move and make with contact 4.

The third emitter pulse to be recorded will behave in exactly the same fashion as the second and act upon the same circuits. This pulse therefore will also be encoded in the complement track. It will also cause step switch 1, tier 3 rotor contact to move to and make with contact 5 on the break of the pulse.

Since a positive balance is being recorded, as seen in FIG. 5A, the fourth pulse from the emitter to be recorded will follow the same paths as the second and be recorded on the complement track. The only variation in operation will be that the fourth pulse will cause not only step switch 1 rotor contact to advance one position on the break of the pulse, but also causes step switch 2 rotor contact to advance one position. As in the earlier described read operation, step switch 1 rotor contacts will step one contact position on the break of every pulse and the rotor contacts of step switch 2 will step one contact position on the break of every fourth pulse. This is accomplished by completing an alternate circuit from 250 v. through the operate coil of step switch 2 through every fourth contact position of step switch 1, tier 2 to the plate of the step switch driver tube 6216. When the step switch driver tube is conducting and step switch 1 rotor contacts are in the fourth position, both step switch 1 and 2 coils are energized and therefore the rotor contacts of both step switches are advanced one contact position as previously described.

If the blance to be written has been negative the fourth pulse would have been recorded in the information or data track of the magnetic tape, as shown in FIG. 5B. Under this condition NB 18 and 19 is closed. (The operation of the negative balance relay is described in Section III.) The first four emitter pulses to be encoded find a path to step switch 1, tier 3, 5 contact, as shown in FIG. 111. Since the rotor of step switch 1, tier 3 would be on 5 contact only for the fourth pulse the first three pulses to be written are not affected and would still be recorded in the complement track. The fourth pulse, however, appears across this rotor contact and causes the data line to go high for the duration of the emitter pulse. This means both inputs to the information coincidence detector would go high for three milliseconds allowing a 3 millisecond pulse to appear on the output of the information coincidence detector. This pulse allows the information tube to conduct and causes a positive pulse to be recorded in the information track of the magnetic tape by the information head. An information pulse at this postion, which corresponds to the one bit, twelfth digit position, means the balance is negative.

Upon the break of the fourth pulse, step switch 1, tier 3, rotor contact is stepped to its 2 contact which is connected to the 7 "bit" output line of the diode matrix. Step switch 2, tier 3 rotor contact steps to its 3 contact which will be connected to either the 11th rack whiffletree contacts or the twelve digit position decimal read-out switch. For this cycle, it shall be assumed that the 3 contact is connected to the decimal read-out switch. The complete description of when the choice is made between the two appears under the account verification heading.

The fifth pulse from the emitter to be recorded is sent to the input of the complement and information coincidence detectors. This pulse also travels through the rotor contact of step switch 2, tier 3 and thence from step switch 2, tier 3, 5 contact to the common strap of the 12th digit position decimal read-out switch. Since a 3 is present in the switch, the 3 contact will be made or closed and thus the pulse appears at the input to the diode matrix on the 3 line. Due to the disposition of the diodes in the matrix the two "bit" and one "bit" lines from diode matrix will receive the pulse. Since the rotor contact of step switch 1, tier 3 is resting on a contact connected to the seven "bit" line the data line input to the coincidence detectors remains low. When the emitter input is high and the data line input is low, a pulse is again recorded on the complement track, as previously described. This same pulse prepares step switch 1 to step its rotor contact. On the break of the pulse step switch 1, tier 3 advances its rotor to the 3 contact which is connected to the four "bit" output line of the diode matrix.

The sixth emitter pulse to be recorded is sent to the input of the two coincidence detectors, and also through step switch 2, tier 3, through the twelfth digit position readout switch, and out on the line 3 to the diode matrix, again making the two "bit" and one "bit" lines high. Since step switch 1, tier 3 rotor has selected the four "bit" line the data line input is again low for this sixth pulse. This pulse therefore is recorded in the complement track of the magnetic tape. On the break of the emitter pulse step switch 1, tier 3 rotor contact steps to the 4th contact position which is connected to the 2 "bit" output of the diode matrix.

The seventh pulse to be recorded from the emitter travels through the same circuits as the sixth pulse. Now however, when the two "bit" output of the diode matrix goes high, the data line input to the coincidence detectors is made high because of the connection through step switch 1, tier 3. With both the emitter line and data line inputs to the coincidence detectors high the pulse will be recorded on the data track as previously described. On the break of this emitter pulse the rotor of step switch 1, tier 3 steps to the 5 contact which is connected to the one "bit" output of the diode matrix.

The eighth pulse from the emitter to be recorded is presented to the emitter line input to the coincidence detectors as are all 48 recorded pulses. The eighth pulse travels through step switch 2, tier 3, through the twelfth digit position decimal readout switch making the 3 line high. This in turn causes both the two "bit" and one "bit" lines to go high and since the data line input to the coincidence detectors is now connected to the one "bit" line through step switch 1, tier 3 the data line goes high. With both data line and emitter line inputs to the coincidence detectors high a positive pulse is again written on the data track of the magnetic tape. On the break of the eighth pulse both step switch 1 rotor contact and step switch 2 rotor contact advances one contact position. This places step switch 1, tier 3 rotor on the contact connected to the 7 "bit" line from the diode matrix and places step switch 2, tier 3 rotor on the contact connected to the 11th digit position decimal readout switch. This readout switch will receive four pulses, then the 11th digit position decimal readout switch will receive four, and so on, until all eleven decimal readout switches have had four pulses sent through them and all "bit" positions for each readout switch setting have been tested or scanned. Each pulse thereupon being written in the appropriate track. A total of forty-eight pulses are thus recorded on the combination of the complement and data tracks. The forty-eighth pulse is sent back to energize the coil of step switch 3 so as to open the writing circuits once the forty-eighth pulse is recorded. On the break of the forty-eighth pulse step switch 1 rotors will return to the 2 and B contacts, step switch 2 rotors will return to the 2 and B contacts, and step switch 3 rotors will move from 3 and C to 4 and D. Moving the rotor contact of step switch 3, tier 1 from 3 to 4 contact prevents any more pulses from getting through to the coincidence detectors which prevents further writing, and, to the step switch driver tube which prevents moving step switch 1 and step switch 2 rotor contacts from the start position.

This concludes the writing operation with eleven digits coded in a modified binary coded decimal form on the magnetic tape of the record media plus the sign information.

III. ACCOUNTING MACHINE OPERATIONAL CYCLE

Let it be assumed that the power supply has been turned on, that each of the tubes and other operating components of the electrical system has been brought up to its operating potential, and that the various aforementioned voltage potentials are available for use at the electrical contacts of the various switches.

Referring to FIGS. 108, 109, the bottom of the document or ledger form with its magnetic tape disposed thereon is now inserted into the throat of the movable record bearing carriage 16 of the accounting machine just far enough to engage the roller 369 of the front paper alignment switch 360. The record may be pushed inwardly under the roller until the bottom edge strikes against the paper pushers 306, 308 and 310 which are not set in the line of feed. As the record medium is received within the carriage of the machine, the leading edge thereof causes the pivoted roller 369 to move arcuately upwardly. The actuator arm 364 of this switch thereby closes the normally open contacts 377 and 378. Presuming that a normal cycle of operation of the accounting machine has been initiated, and that the carriage of the machine is at rest in the "old balance" position, an electrical circuit is now completed from a source of potential of 115 volts through In Tab A contact, (FIG. 98, and FIG. 114 upper center), which indicates that the carriage is stopped in a tabular position, through the old balance position contact which is now closed, through CR1 and through the alignment contact to pick the operate 1 and 2 relays OP1 and OP2 which are electrically connected in parallel. Operate relay 1, contacts 14 and 15, are used as a hold point for the operate relays. Once the alignment contact is closed and while it is closed, after the operate relay has initially been operated, the operate relay coils 1 and 2 are held energized by means of a circuit that bypasses everything but the alignment contact through a normally open point on the relay. The circuit is as follows: from the 115 volt source through the operate relay 1, contact 14 and 15, through the alignment contact, to the coils of the operate 1 and 2 relays. The relay will thus remain energized until the alignment contacts open.

In order to provide a visible indication to the operator that the machine is operating correctly and that the operate relays have been picked or energized and that therefore the machine is cycling and the alignment contact is made indicating that a record medium is within the carriage, a 6.3 volt potential is supplied to the operate lamp 41, (FIGS. 3 and 114) from the low voltage source through operate relay 2, 14 and 15 contacts. The light bulb is disposed in the carriage on the left side thereof and is replaceably mounted in a bayonet base behind a green plastic shield.

When the operate relays are picked the normally open point of operate relay 2, 10 and 11 closes, (FIG. 114) voltage is applied from the 115 volt source over the contacts of the switch from carriage cam 2 which is now closed. Voltage is thus available through CR 3, 1 and 2, through the operate relay 2, 10 and 11 contacts, now closed, to pick the carriage motor start relay (CMS). However, if the ledger sheet was incorrectly inserted into the carriage and the alignment contact was not made, the operate relay would not have been picked. Thus no voltage would be available to pick the carriage motor start relay since operate relay 2, 10 and 11 contacts, would be open.

Assuming a correct operation, the carriage motor start relay will be picked which permits a —35 volt potential (lower left FIG. 114) to be applied to the carriage drive motor windings (not shown) through CMS 10 and 11 normally open contacts and CMS 18 and 19 normally open contacts. The carriage motor 46 starts turning and is brought up to operating speed. This speed is maintained constant automatically by means of the centrifugal governor 88 secured to the output shaft thereof, and earlier described herein. The carriage motor start relay at this time establishes the direction in which the record media will subsequently feed by causing the energization of the reverse clutch solenoid, (FIG. 115 lower center). Voltage is applied from a 115 volt D.C. source through CMS 14 and 15 points, through BS 2, 12 and 13, to energize the reverse clutch solenoid. Energizing this solenoid causes the reverse clutch to be set so that the paper feed drive rolls will turn in a direction such that the record media will be driven into the carriage. Once the carriage motor has started the program cam unit clutch solenoid is energized from the contacts of carriage cam 2 through CR5, 1 and 2 points, through CMS relay contacts 8 and 9 so that the carriage program clutch solenoid clapper is pulled in permititng the drive gears to rotate to cause the program cam shaft to turn its first 144 degrees, (see FIG. 108, step I).

During the rotation of the program cam shaft to its 144 degree position the three paper pushers 306, 308 and 310 rockably mounted in the front of the carriage are moved forwardly by their cams 329 causing the pushers to contact the leading edge of the ledger form and push the form outwardly slightly thus aligning the paper. A few milliseconds later the paper feed rollers 260, 262 and 266 are brought in engagement with the idler rollers 268, 270 and 272 in response to the movement of their cam followers which have been rocked into position by the program cams to grip the ledger form between them. At the same time by means of the mechanical contact between the program cam and the followers, the magnetic transducer sensing assembly is lowered onto the ledger form. The paper pushers are now cam retracted out of the way of the paper. After this occurs the drive clutch solenoid (FIG. 115) is energized and the paper is thereby driven backwardly into the carriage of the machine. Immediately after initiating the paper drive back into the machine the program cam shaft 48 is stopped and the shaft is latched at 144 degrees. Since contact sensing is used in the present mechanism the paper is adapted to slide under the sensing assembly in direct contact therewith. During the rotation of the program cam shaft from zero degrees to 144 degrees various electrical controls and circuits have been set up in the machine as detailed in FIGS. 108 and 109, in conjunction with the mechanical actions just described.

At 110 degrees of the program shaft rotation carriage cam 3 contacts close causing voltage to go through the carriage open contact which is now closed, since the carriage is open, and through to the line minus three contacts, through CR6, through the line find drop out high speed relay point to energize the drive clutch solenoid. Energizing this drive clutch solenoid allows the clutch to engage and causes the feed rolls 262 and 266 to be rotated by the motor, which in turn will drive the paper back into the carriage. At the same time the drive clutch solenoid energized, the #1 back stop relay is energized. The function of this relay will be discussed later when a reversal of the drive is necessary.

After cam 3 makes at 110 degrees during the program cam shaft rotation which initiates the action which causes the record media to be driven back into the carriage, the program cam shaft keeps rotating and at 115 degrees carriage cam 11 makes. Cam 11 supplies voltage to the carriage motor start relay through operate 2, 10 and 11 contacts. This will hold energized the CMS relay coil until after reading and line find and the first print cycle have been completed, and the program cam shaft is rotated from 144 degrees to 216 degrees. At 120 degrees, which is approximately 27.7 milliseconds or 10 degrees after voltage is applied to the drive clutch solenoid, the carriage cam 4 contacts close, allowing voltage from the 115 volt source to go through the cam 4 contacts, through the program 2, 12 and 13 contacts which are normally closed, through the blank card 2, 5 and 6 normally closed contacts, through the back stop #2 relay, contacts 5 and 6, through the read relay coil, then through the line minus one paper contact to ground to energize the read relay coil. This latter coil is energized at approximately 37 milliseconds after voltage is applied to drive clutch solenoid. The read relay operate straps transfer from the normally closed to the normally open side. This transfer allows certain contacts to be made which enable the sensing assembly to electrically read into the relay storage mechanism. At 132 degrees of the program shaft, carriage cam 5 contacts are closed allowing voltage to go through to the back stop 1 relay point 5. However, since back stop 1 was energized at the same time as the drive clutch solenoid, the voltage cannot get through these normally closed contacts but remains available at the back stop 1, contact point 5.

At this time the ledger form is under the control of the carriage mechanism and is moved backwardly into the carriage at the rate of ten inches per second. The sensing assembly is riding in contact with the form.

By picking the read relay, voltages were set up through certain read relay points to enable us to take the information detected by the sensing assembly heads, amplify and transfer it to the code analyzing relay storage whiffletree where it will be held until the first print cycle. This pick-up and storage of the magnetically encoded balance is termed the read operation and has been described in detail in the first section. The sensing assembly is reading the magnetic tracks of the tape as the ledger or statement is moving into the carriage. The complete read cycle is accomplished in 4.8 inches of travel of the magnetic tape under the sensing assembly. All of the digital information is then stored in the code analyzing relay whiffletree. When the back edge of the form in its rearward travel strikes the operate roller of the line minus one paper switch and opens those contacts, the circuit through the read relay coil will be broken and the read relay will drop out. This will prevent any other information from reaching the code analyzing relay tree or the step switch driver tube which essentially makes the C and ID heads inoperative. By means of the feed rollers and drive motor the paper is driven still farther back into the carriage until the back edge thereof strikes the line minus three paper contact. The line minus three contact opens cutting off voltage from cam 3 contact through the carriage open contact to the line minus three contact. This operation opens the circuit to the drive clutch solenoid. The drive clutch is then de-energized, the clapper is released and the paper is stopped in line minus four which is the terminal point in its rearward travel into the carriage. The line minus three contact, when opened, also cuts off the voltage from the back stop 1 relay coil, causing this relay to drop out.

Cam 5 contacts, as previously mentioned, were closed at 132 degrees of the program cam shaft rotation allowing voltage to go to the 5 contact of back stop 1 relay points. Back stop 1 had been energized and the normally closed back stop 1, 5 and 6 points had been opened. Now back stop 1 is de-energized and its normally closed points (FIG. 115) will close and voltage is applied to back stop #2 relay coil, the 25 millisecond relay, energizing this relay. Twenty-five milliseconds later the back stop 2, 16 and 17 contacts close applying voltage to back stop 3 relay coil. Twenty-five milliseconds after voltage is applied to the back stop 3 relay coil, the back stop 3 operate contacts will be transferred to the normally open side. These two relays pick in sequence with the drop out of the drive clutch solenoid and the #1 back stop relay.

Voltage has been on the reverse clutch solenoid from the beginning of the cycle from the voltage source through CMS14 and 15 contacts to back stop 2, 12 and 13 to the coil (FIG. 115). Now back stop #2 relay has picked and back stop 2, 12 and 13 opens. When this point opens the reverse clutch solenoid is deenergized.

At this point in the operation of the machine the ledger form is at its terminal stop at the rear of the carriage. De-energizing the reverse clutch solenoid causes the reverse clutch to transfer so that the paper drive feed rollers will be set so as to drive the paper out of the carriage. The back stop 3 delay relay points close 25 milliseconds after the voltage is taken off the reverse clutch solenoid. This allows voltage to go from the 250 volt source through a 1500 ohm resistor, (FIGS. 112 and 115) through cam 3 contacts, through back stop 3, 10 and 11 contacts, through the line find drop out high speed relay points to energize the coil of the drive clutch solenoid. This initiates the drive to cause the paper to start out of the carriage.

The #1 back stop relay does not pick at the same time that the drive clutch solenoid is energized by virtue of CR1006 in the circuit. When BS 3, 10 and 11 closes, the voltage potential is present at CR1006 —2 terminal; however, the high back resistance of this rectifier will allow only a fraction of the normal current flow in the circuit BS3, 10 and 11 from the 250 volt D.C. source through 1500 ohms, through cam 3, through CR1006, thence through the #1 back stop relay coil to ground. This will prevent the #1 back stop relay from operating at this time.

As the paper is driven outwardly from the carriage, the back edge of the form passes out from under the operate roller of the line minus three paper contact allowing the contact points of that switch to close. When these points close, a circuit is completed to again energize the back stop #1 relay coil. The circuit being from the 250 volt D.C. source, through 1500 ohms, through cam 3 contacts, through the line minus three paper contact, through the #1 back stop relay coil to ground.

Referring to FIG. 115, bottom center, when the contacts close on this relay a circuit is completed to the line find relay coils. Since at this time the program cam shaft is sitting at 144 degrees which means cam 4 contacts will be closed, and both #1 back stop and #3 back stop relays are energized, there is a circuit from the 115 volt D.C. source through cam 4 contacts, through BS1, 14 and 15, through BS3, 14 and 15, through the line find relay coils to ground. Since the mercury relay has a normal operating voltage of 18 volts there is a series dropping resistor in the circuit through the line find mercury relay coil.

Picking the line find relays controls the correct circuits so as to utilize the information picked up by the line find head of the magnetic transducers assembly from the magnetic line find track on tape 78 (FIG. 5A), and stop the record media so as to print in the first blank line position of the form 62.

The high speed mercury relay (FIG. 111) is utilized to switch the line find head into the #2 amplifier in place of the complement head. The 12, 13 and 14 contact points of the Philtrol line find relay, switches the output of the #2 amplifier from the UV3MS vibrator to the control grid of a line find drop out thyratron (lower right of FIG. 112). Under this condition, any pulse sensed by the line find head will be amplified through the #2 amplifier and applied as a positive pulse to the control grid of the line find drop out thyratron. Pulsing the grid of this thyratron will cause it to conduct in this portion of the cycle. It will only conduct at this time because plate voltage for the tube is supplied from carriage cam 4 switch contacts which are now closed.

The line find head now scans the line find track on the magnetic tape as the ledger is moving out of the carriage. When the break between oppositely polarized sections along the line find track, as shown in FIG. 5A, passes under the head gap a voltage pulse is induced across the coil of the line find head. This pulse appears across the input of the pulse transformer through the High Speed mercury line find relay points (FIG. 111). There is a step up through this transformer and from the secondary a larger voltage signal is applied to the input of the #2 amplifier. The signal is amplified through the #2 amplifier and applied to the control grid of the line find drop out thyratron through LF13 and 14 relay points. The line find drop out thyratron conducts and pulls in the Line Find Drop Out Relays (upper right of FIG. 115). One of these relays is a high speed millisecond relay, which after being energized, will transfer its operate strap (LFDO (HS) FIG. 115 left center) from normally closed to normally open position in one-half millisecond. Opening the normally closed side of this high speed contact breaks the circuit to the drive clutch solenoid 242. The clapper 240 of this solenoid will be released and will in turn disengage the clutch faces or teeth 204 and 208.

This action will cause the record media to stop one line past the position where the pulse was sensed, which is the first blank line.

While this line find operation is taking place, a check is made of the balance information sensed by the head. If this information is incorrect the machine is stopped before the first print cycle and a flashing error lamp is energized, as described in Section II Write Operation.

As fully described in the Write Operation Section, when the balance is written magnetically forty-eight pulses are placed on the tape. During reading the step switches are energized by the pulses sensed from both the C and ID tracks so that the switches are obliged to take forty-eight steps. After reading, a check is made to determine the forty-eighth position of the two step switches and if they are positioned correctly a read-check relay (lower right of FIG. 115) is automatically picked. This relay must pick before the modified accounting machine can be released for a printing cycle. This, therefore, is a positive check. If anything misfires in the check circuit an error will be indicated.

The checking circuit is as follows: From the 115 volt D.C. source (left center of FIG. 112), through LF15 and 16, through B to A on SS2–T2, through LF9 and 10, through B to A on SS1–T2, through LF6 and 7, through CC6 and 5, through CR1017 on FIG. 115, through the read check relay coil 1 and 4 to ground. Energizing the read check relay, opens RC5 and 6 points (left center of FIG. 116) which being in parallel with the LFD07 and 8 points will allow the circuit to the machine block solenoid to open when the line find drop out relay picks. RC16 and 17, FIG. 115, right center, allows the energization of the motor bar #2 solenoid when the line find drop out relay picks, through the circuit from the 115 volt D.C. source, through cam 1 contacts, through LFD08 and 9, through RC16 and 17, through the motor bar #2 solenoid to ground. When the read check relay is not energized, the machine block solenoid will remain energized or locked and the motor bar #2 will not be pulled down to a start an accounting machine cycle.

There is one other checking means employed in the present machine. This is the coincidence check circuit. The magnetic tape should have a pulse in the infor-data or complement tracks but not in both tracks at the same time. If there is a pulse in both tracks at one time this would indicate that there has been an erroneous or faulty writing operation or that an extraneous pulse had been picked up and amplified by one line. In either case the balance is prevented from printing. This is accomplished by bringing one wire from the output of the information or 4¼ millisecond multivibrator to one grid of a thyratron 2021, a line from ETB3–23 is brought to the other grid of thyratron. When both these lines show a pulse they will go high, if they should go high simultaneously the thyratron will fire allowing current to conduct through the coil of the coincidence check relay to plate voltage which is supplied from cam 4. Cam 4 supplies plate voltage during this portion of the cycle and prevents this circuit from being active in other portions of the cycle. Energizing the coincidence check relay prevents the read check relay from picking.

If, for either of the two reasons above mentioned, the read check relay does not pick, the following procedure must be followed to insure the printing and storing of the correct balance. First, the balance must be indexed into the keyboard in order to print the correct balance instead of the balance revised by the sensing head in which there was some type of error. This means that the information stored in the whiffletree must be suppressed. Second, the machine must be released to print, which means the machine block solenoid must be de-energized and motor bar #2 solenoid energized.

On any read error, indicated by the machine stopping after the record media has stopped in the correct line and the read-write error lamp (FIG. 114 lower left) flashing, the operator then indexes the correct old balance into the keyboard. To effect this operation the operator will depress the Reset Contact on the keyboard. The machine will print and store the indexed information and tab to the appropriate carriage position. On depression of the reset key, the mechanism labelled Error Reset Contact (middle right of FIG. 115 will be closed, allowing voltage from a 115 volt D.C. source through this contact and the error reset relay coil 1–4 to ground. The error reset relay will pick to disable the line to the read-in tappet solenoid, keyboard repeat solenoid, and the crossfooter A negative read-in tappet solenoid as described earlier herein. Disabling these solenoids prevents read-in through the whiffletree relays, so the accounting machine will look at the keyboard on the first print cycle. The information on the keyboard will not be retained and the negative information must be entered through the keyboard.

The error reset relay also provides a circuit which picks the read check relay (FIG. 115, lower right) from 115 volt D.C. source, through ER14 and 15, through a diode, through the rear check coil to ground. Picking the read check relay opens RC5 and 6 to de-energize the machine block solenoid (FIG. 116, left center). RC16 and 17 points (FIG. 115, right center) will close which energizes motor bar #2 solenoid (FIG. 114, left) causing the machine to cycle.

Under ordinary operating conditions the read check relay would be picked automatically during line find and when the machine cycles the balance must be transferred from the whiffletree to the machine. To set up the proper controls in the machine, the read-in tappet control solenoid, and the keyboard repeat solenoid is energized when cam 4 contacts make. That circuit is as follows: From 115 volt D.C. source, through cam 4 contacts, through PR2, 12 and 13, through BC2, 5 and 6, through ER12 and 13, through sensimatic cam 4, through both coils to ground. Energizing the read-in tappet control solenoid will, by controlling mechanical actions in the machine, allow a read-in operation to the machine through the rack stop read-in unit (FIG. 113). Energizing the keyboard repeat magnet permits the operator to index the first item prior to the first print cycle and retain that information. Voltage is also made available through this same circuit to #1 row, 10″ position relay contact, which will close if a negative balance is present, to permit the energization of the crossfooter A negative read-in tappet solenoid. This will cause a subtract operation in crossfooter A which is the desired mode of operation on negative balance.

When the machine cycles, the whiffletree relay contacts in which the balance information is stored have voltages applied under control of the machine pulse generator (FIG. 113) so that the rack stop solenoids are controlled by the timed voltage required to stop the rack in the correct numerical position as described more fully in the Read Operation Section I of the present application. Stopping the racks in the correct numerical position will also stop the print bars in position to print the balance and store this balance in crossfooter A.

When the machine cycles with the carriage open, the carriage will automatically close before printing. Normally the platen pressure rollers would grip the form and exert a forward pull on the record media during closing. Through the utilization of an additional mechanism (FIGS. 83–87) earlier described herein, the platen pressure rollers are held away from the platen so as to permit control of the paper to be maintained by the feed rollers.

As shown in FIG. 108, right hand panel, the read-in and printing operation is completed by 190 degrees of the accounting machine cycle when accounting machine cam 4 breaks to drop out the machine controls on the read-in operation. At 200 degrees of this cycle, machine cam 7 (FIG. 113) breaks taking the voltage from the read-in pulse generator. Simultaneously machine cam 1 (FIG. 115) makes supplying voltage to initiate the rotation of the program cam shaft from 144 degrees to 216 degrees as shown in FIG. 108). The rotation of the cam shaft at this time will return control of the record media from the carriage drive in the carriage to normal base machine platen control as called for by the operator.

To return control of the record media to the platen the automatic reset link 422, FIG. 85B, kicks off the latch holding the accounting machine platen pressure rollers to allow them to spring up and engage the paper against the platen before 191°. After 191° and before 212° of program cam shaft rotation the magnetic head and feed rollers are lifted up off the paper.

During this cam shaft rotation certain electrical circuits are opened and certain others closed by means of the carriage cam contacts. Cams #1, 3, 4, 5 and 11 contacts open disabling all electrical circuits controlled by them. Cam 7 contact closes which provides an electrical circuit to various contacts and at this time energizes the balance position hold suppress relay identified as BPHS lower left of FIG. 114. This relay provides a means for delaying the hold on the balance position relay, FIG. 116, lower center, until a machine cycle is taken in that position, provides a timing point for the signalling of amount vertification errors, and provides a contact for disabling of the Keyboard Repeat Magnet, FIG. 112, lower center, on the balance cycle. This relay is energized as follows: From the 115 volt D.C. source through cam 7, through PR3–12 and 13, through the Balance Position Hold Suppress coil, FIG. 114, bottom left, to ground. Cam 8 makes at 165° and provides voltage to various circuits. These circuits will not be made active until the operator provides the correct signal by which control of the record media is once more obtained.

The program cam shaft will latch at 216° some few milliseconds before the accounting machine completes its first print cycle. The operator can then assume complete control of the record media immediately after the old balance is recorded. By assuming complete control any number of checks or deposits can be indexed into the keyboard and recorded.

On any check entry a subtraction is made in crossfooter A while on any deposit entry an addition is made in crossfooter A. Since the intial balance was printed and stored in crossfooter A, checks are subtracted from that figure while any deposit would be added thereto.

When the operator desires to conclude the operation, the balance key is depressed. This will record and store the last entry, i.e., check or deposit, then the carriage will tab to the balance position and the new balance will automatically be recorded. This new balance will be the old balance minus checks, plus deposits. The new balance print cycle is the totalizing operation from crossfooter A.

During the balance print cycle, control of the record media is taken over by the carriage. When the balance key was depressed the balance relay was energized. This operation was prior to the last posting cycle. The circuit to energize the balance relay, FIG. 116, is as follows: From carriage cam 8 through BS 3, 12 and 13, through the balance key contact, through the balance relay coil to ground. As the carriage tabulated into the balance position a pin in the electrical control tray 38 indicated the balance position and caused the balance position relay to be energized through the following circuit: From carriage cam 8, FIG. 116, upper left, through operate 10, FIG. 111, through operate 1, 16 and 17, through in-tab B contact through the Balance Position Contact to energize the Balance Position relay coil. The balance relay and the balance position relay are now energized, during the balance print cycle. This permits the initiation of the operation which returns control of the record media from the operator to the carriage mechanism. The control circuitry for this operation is as follows: From base machine cam 2, FIG. 113, through Balance Position 14 and 15 contacts, FIG. 116, upper left, now closed, through Balance 10 and 11, now closed, to energize the program #3 relay coil. Energizing the program #3 relay energizes the carriage motor start relay which in turn allows the energization of the program cam unit clutch solenoid. Energizing the program cam unit clutch solenoid causes the carriage program cam shaft to turn from 216° to 288°, FIG. 109. The circuit is as follows: From the 115 volt source through carriage cam 7, through program 3, 10 and 11 points, through CR1012 and through the carriage motor start relay coil to ground. This in turn allows us to energize the program cam unit clutch solenoid through the following circuit; from the 115 volt source through carriage cam 7, through PR 3, 10 and 11, through CR1011, through CMS 8 and 9 through the program cam unit clutch solenoid to ground. The solenoid is de-energized when carriage cam 7 breaks at 268° of program cam shaft rotation, however, the cam shaft will rotate due to the mehanical operation of the program clutch until 288° where it will be stopped and detented into position. Energization of this latter solenoid in the earlier portion of the base machine cycle completes the program cam shaft rotation from 216° to 288° before the new balance is printed. Rotation of the cam shaft causes certain mechanical operations to occur in the carriage, as follows: The paper drive feed rolls and the magnetic heads are lowered onto the record media in preparation for driving the record media into the carriage as soon as the carriage platen pressure rollers release the form after printing.

Electrical controls are also set up during rotation of the program cam shaft. The balance relay and the balance position relay have been picked. At 270° carriage cam 3 makes, which supplies voltage to energize the #1 back stop relay. By energizing the #1 back stop relay which will occur some time after the head assembly has been lowered onto the form, a current is caused to flow through the line find head, which will be in such a direction as to erase the line find track of the magnetic tape. The circuit for this operation is as follows: From 150 volts through BS1, 18 and 19, FIG. 111, upper left, through B8 and 9, through the line find head, through the complement write tube plate resistor to 250 volts. Cam 3 in closing all supplies voltage to one side of the carriage open contact, lower left, FIG. 115. Now the carriage open contact will be open since the carriage is closed for printing. When the carriage has opened far enough that the platen pressure feed rolls release the paper, this contact will close energizing the drive clutch solenoid. This will not occur until some time after the base machine cycle has been completed. Carriage cam 9, FIG. 116, upper right, makes at 225 degrees and breaks at 275 degrees of this program cam shaft cycle. This cam energizes the reset relay for this portion of the cycle. The reset relay in picking causes the step switch driver tube grid to be conditioned slightly positive by the emitter pulses. Both step switch 1 and step switch 2 coils FIG. 112, are connected in parallel in the plate circuit of the driver tube by reset points through tier 4 of each step switch. All the positions of tier 4 of each step switch are connected to plate voltage except the home position which is open. Emitter pulses will then cause conduction in the step switch driver tube which will drive each step switch so the rotors of each will turn to their home position which is 2 or B, where they will stop. Step switch 1 or 2 will now have all rotor contacts setting at 2 or B contacts in readiness for a write operation. The machine, after printing and also after the program cam shaft has reached 288° will have erased the line find track and the carriage pressure rollers will feed the paper downwardly into the carriage throat as soon as the platen pressure rollers release the paper and the carriage open contact makes. This occurs immediately after the base machine cycle, and as the carriage open contact makes, the drive clutch solenoid is energized, causing the paper to be driven into the carriage. The reverse clutch had been set in the correct position by the carriage motor start relay picking. That circuit is as follows: From the 115 volt source through CMS14 and 15, through BS2, 12 and 13 to energize the reverse clutch solenoid. This reverse clutch had been set up prior to the program cam shaft operation. When the drive clutch solenoid is energized the drive clutch causes the feed rolls to turn in such a direction so as to drive the paper into the carriage erasing the line find track. The line find track will be erased until the bottom edge of the paper strikes the roller of the line minus 3 paper contact, FIG. 115. This opens the circuit to the drive clutch solenoid and also to the back stop 1 relay. Opening the circuit to the backstop 1 relay causes the erase circuit through the head to be opened by means of BS1, 18 and 19 opening. This will make the line find head inactive. Opening the circuit to the drive clutch solenoid causes the drive clutch to be disengaged, as previously described, and causes the record media to come to rest in a position corresponding to line minus 4. As in the reversal operation between reading and line find, the reverse clutch solenoid is caused to drop out and the drive clutch to be re-energized so as to eject the paper from the carriage. During the ejection of the paper, the new balance will be encoded magnetically in the data and complement tracks of the magnetic tape. This feed reversal and balance recording is accomplished in the following manner: De-energizing the #1 backstop relay causes the #2 backstop relay to be energized through the following circuit: From the 115 volt source through carriage cam 5, through backstop 1, 5 and 6, through #2 backstop relay coil to ground. Energizing the #2 backstop relay opens the circuit to the reverse clutch solenoid causing the reverse clutch to drop out, which in turn reverses the drive to the feed rolls. Energizing the #2 backstop relay also allows the write relay to be energized as follows: From the 115 volt source, through carriage cam 8, through backstop 2, 10 and 11, through B18 and 19, through the write relay coil to ground, thereby energizing the write relay, FIG. 116. Backstop 2, 16, 17 in closing energizes the backstop 3 relay. The backstop 3 relay in picking initiates the following operations: It causes the balance relay to drop out; it also energizes the drive clutch solenoid again. Dropping out the balance relay isolates the line find head from the 150 volt source so as to prevent any further writing through the line find head. Energizing the drive clutch solenoid causes the paper to be driven outwardly from the carriage. The write relay in being picked completes circuit through both the complement and data heads, which causes both the data and complement tracks to be erased through the following circuits: From the 150 volt source, through W18 and 19, through the data head, through the write tube plate resistor to 250 volts; and also from the 150 volt source, through W8 and 9, through the complement head, through the complement write tube plate resistor to 250 volts. Thus it can be seen that as the paper is being ejected from the carriage, the write relay is picked and both the data and the complement heads are erasing. As the bottom edge of the record medium passes out from under the operating roller of the line minus one paper contact, that contact will close or make, causing the write pulse gate relay, FIG. 116, upper left, to be picked. Energizing this write plus gate relay initiates the scanning of the decimal read-out switches and in turn causes the new balance information to be recorded magnetically on the record medium. The following circuit energizes the write pulse gate relay: From the 115 volt source through the write plus relay coil, through W14 and 15, through operate 2, 16 and 17, through the line minus one paper contact to ground. This initiates the writing operation which was described in detail in Write Operation, Section 2.

After the 48 bits of balance information have been recorded, approximately 60 milliseconds of time remains before the record medium passes out from under the operating roller of the alignment contact. During this time interval a checking operation via step switch 3, tier 4 is performed. If the writing operation has been correct, the rotor contact of step switch 3, tier 4 will be sitting on contacts D, J or N. In the 60 milliseconds, if the step switch 3, tier 4 rotor contact is positioned on one of those contacts just mentioned, a circuit will be completed to energize the write check relay as follows (FIG. 116, lower center): From 115 volt source through Operate 1, 10 and 11, through step switch 3, tier 4, D, J or N to energize the pick coil of the write check relay. The write check relay will then be held on carriage cam 8 for the rest of the cycle. After the paper moves out from under the paper drive feed rolls, it will be held through a normally closed operate point and a normally closed CMS point until the next form is inserted. Energizing this write check relay allows the next subsequent record medium or card operation to start. If this relay is not energized, the next record medium on being inserted into the carriage will not start the operation of the accounting machine. This locking action is accomplished by inserting Write Check 6 and 7 points, FIG. 114, center, into the pick circuit of the operate relays. If this point is not closed the operate relays will not be picked by the insertion of the next card. The operator can energize the write check relay by manually depressing the reset key, FIG. 115, center right, to clear the machine for the insertion of a new form.

Figure 114:
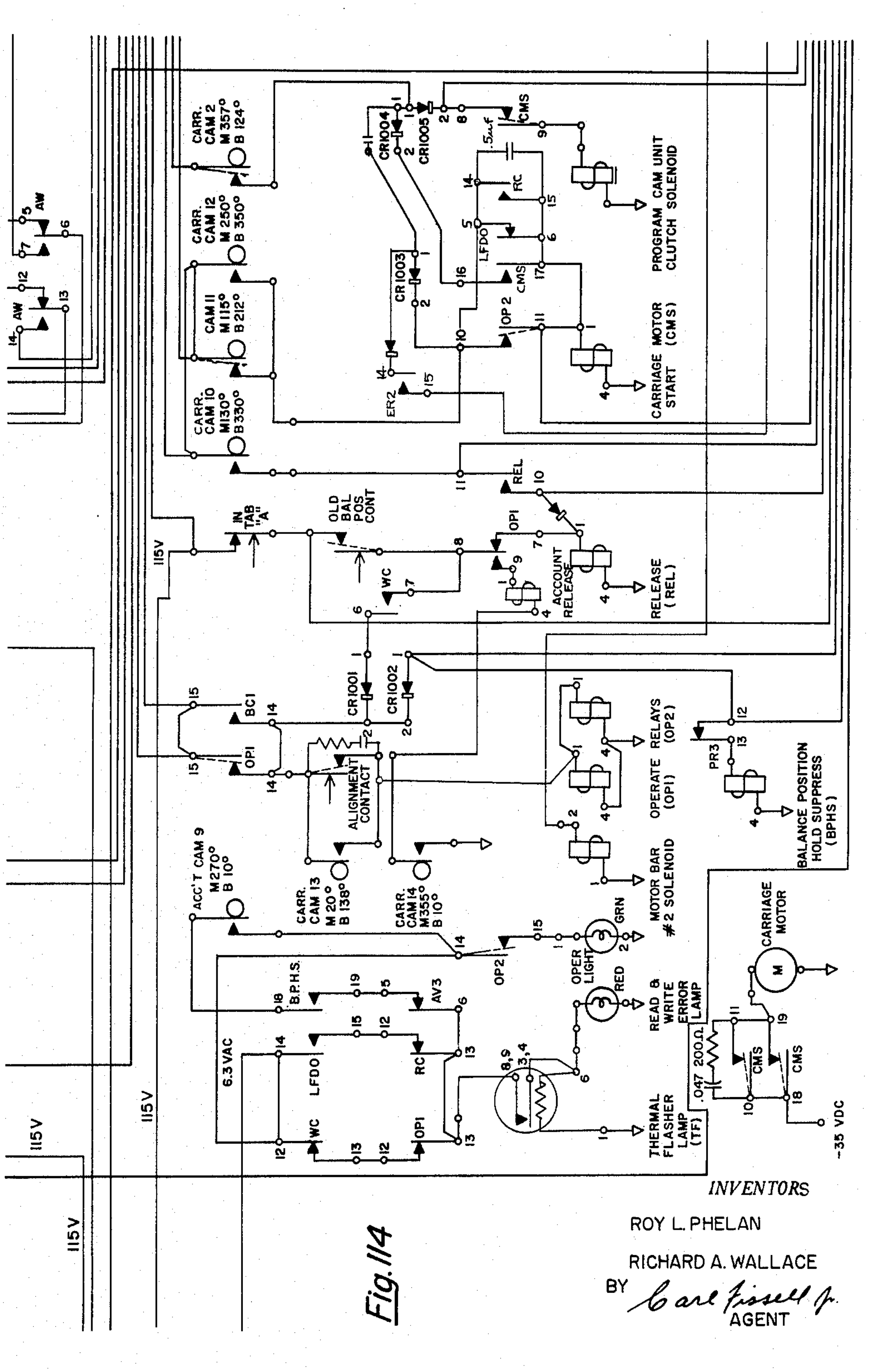

The record medium upon being driven past the alignment contact, FIG. 114, allows that contact to open, dropping out the operate relays. This action initiates the rotation of the main program cam shaft from 288° to 360°, through the following circuit: Voltage is derived from 115 volt source and sent through carriage cam 8, FIG. 116, through operate 2, 12 and 13, now closed, through BP5 and 6, through CR1013 to supply voltage to the CMS relay, FIG. 114, lower right. Also from the 115 volt source voltage is sent through carriage cam 8 through operate 2, 12 and 13, through BP5 and 6, through CR1014, through CMS8 and 9 to energize the carriage program cam unit clutch solenoid, FIG. 114. This latter solenoid will be held energized until carriage cam 8 breaks at 340°. At that time it is de-energized but the program cam shaft will continue to turn until the clutch unit is latched in a detented position at 360°, FIG. 109. During this rotation of the program cam shaft various mechanical actions take place. The paper drive feed rolls and magnetic heads are lifted away from the paper. The paper pusher arms are inserted into the line of paper feed. The platen spacing mechanism is operated causing the platen to space one line. During this rotation of the program cam shaft, the following electrical circuits are acted upon. Carriage cam 3 breaks at 300°, dropping off the voltage to the drive clutch solenoid and the #1 backstop relay de-energizing both coils. Carriage cam 5 breaks at 312° dropping out both backstop 2 and backstop 3 relays. Carriage cam 10 breaks at 330° dropping out the release relay, FIG. 114. With the breaking of carriage cam 8, the write relay, FIG. 116, is dropped out. The balance position relay is dropped out. Dropping out of write relay inactivates the writing circuit through the data and complement heads. Dropping out the balance position relay, in conjunction with the other relays just mentioned prepares the machine for the insertion of a new form. Also, at 295° of this last cycle carriage cam 9 will make. This supplies voltage to energize the reset relay. Energizing this relay resets all step switches to their home position, in the event that either step switch 1 or 2 has gotten out of position. It will cause step switch 3 to step from D, J or N to B, F or L contacts and 4, 8 and 12 contacts to 2, 6 or 10 contacts, any of which are the home positions for step switch 3. The machine having completed an overall operational cycle is now ready to receive the next record medium.

Upon the insertion of a blank card or one which has not been previously magnetically encoded, a subtotal key, FIG. 115, must be depressed under a normal posting schedule.

Depressing the subtotal key will energize the blank card relays which is turn perform various functions. They will suppress the read operation so that the heads will not try to pick up from the unprepared tape. They will also cause the line find track to be saturated throughout its entire length of travel past the line find head in the positive direction. During the line find operation they will cause the drive clutch to be de-energized so as to stop the paper at a line equivalent to the line 0, designated as the "balance brough forward" position on the form. They also energize the carriage open suppress relay, FIG. 116, which in turn prevents the carriage from opening during the second subtotal operation in the final balance position.

IV. BLANK CARD OPERATION

To insure the satisfactory overall operation of the herein described machine it is extremely desirable that the machine operations as performed by the operator deviate very little if at all from the pre-established routines and that the machine operation be as simplified as possible in order to provide a relatively high order of efficiency.

In accordance with present bank posting procedures there are numerous times when a blank form or card will be inserted into the machine carriage. The term blank card is used herein to describe a form which has no information on its magnetic tape and/or no printed information on it. A variety of conditions may arise under which a blank card may be inserted into the machine. Some of these are set forth as follows:

(a) Installation of a new machine: Whenever information on a number of previously used banking documents having no magnetic tape thereon is to be transferred to new documents with magnetic tape on the back for use with the present machine.

(b) New accounts. Whenever a new account is opened.

(c) Balance Forward. Whenever one magnetically encoded document or form becomes filled and it is necessary to transfer the information thereon to a new blank card under the normal bank posting schedule.

(d) Balance Transfer. When at the end of a stated bank period, such as the end of the month, or three months, etc. the bank prepares new statements and sends the old statements to customers.

Under all of these conditions the card or form must be recognized as a blank card and handled accordingly by the machine. For the conditions of "installation" or "balance transfer" where a particular control panel or carriage position is used for that one operation the blank card indication would be automatic and the cards handled correctly without any keyed information being indexed into the machine by the operator. Any new account might possibly be handled by selecting the installation schedule and using that schedule to prepare the card with the initial balance and account number.

A "new account" could also be started under a so called normal bank posting schedule. In this instance, the machine must be prepared by the operator to receive and handle a blank card since this would not be the normal mode of operation for this particular carriage position and program schedule. The machine handling of the document or form would be initiated by setting up two conditions; the first is to insert the form into the carriage throat to a fixed stop (alignment contact, FIG. 114) while the carriage is in the new balance position; the second is to depress the subtotal "A" key contact, FIG. 115. The form is then handled by the machine as if it were a blank card. A blank card inserted into the machine under "balance forward" conditions is handled similarly to the foregoing by meeting the two conditions stated.

An automatic blank card operation is accomplished by inserting a pin in the lane of the electrical control panel 38 which makes electrical panel switch No. 6, which in turn supplies the necessary electrical information to cause a blank card operation upon the insertion of the next ledger form. During normal posting or while posting checks and deposits a depression of the subtotal "A" key makes a switch located beneath this key which provides the necessary electrical information to cause a blank card operation upon the insertion of the next ledger form.

Under automatic blank card conditions where electrical control panel switch 6 is actuated the balance transfer and reconstruction relay BTR on FIG. 116 is energized. A point on this relay then energizes the blank card relays. Under manual operation of subtotal "A" key on the keyboard, the subtotal "A" key contact makes, causing the blank card relays to be picked directly. The reason for not picking the blank card relays directly by electrical control panel switch 6 is that when this switch is made the mode of operation of the machine differs somewhat from the usual routine. The difference is that the machine cycle is always completed automatically, requiring no instructions from the operator. The necessary instructions will be provided by the BTR relay contact points at the appropriate times in the cycle.

The blank card or document relays are energized through the following circuits; from 115 volts D.C. source through carriage cam 1, through either BTR 14 or 15 or through the subtotal "A" key contact, through BC 1 and BC 2 relay coils to ground. These latter coils are then held energized by voltage through cam 1, through BC 2, 14 and 15, through REL 5 and 6, through both coils to ground. The blank document or card relays in picking control certain functions which initially prepare the form for future operations and also permit registering this new record media correctly for the first print entry. The BC 2, 5 and 6 contact of a relay point opens, opening the circuit to the read relay so that during the read cycle any pulses from the information and complement heads are suppressed preventing the operation of any whiffle tree relay. This same BC 2, 5 and 6 contact also opens the circuit to the "read-in tappet control solenoid," and "A" negative "read-in tappet control solenoid" and the "keyboard repeat solenoid," deactivating these solenoids. The normal print cycle in the old balance position of the base machine will not be controlled by the whiffletree relays and the read-in unit. Under this condition the accounting machine will pring in the Old Balance Position from crossfooter "A" or the keyboard according to instructions received from the mechanical control panel 38.

As the record media is driven down into the carriage the operation of the blank card relay enables the operator to prepare the card for future insertion. Two points on the BC 1 relay cause current to flow in the line find head so that the line find track is magnetically polarized in what has been designated previously as the positive direction. This is accomplished by connecting the line find head into the plate circuit of the complement write tube, then allowing that tube to conduct. The circuit is as follows: from +150 volts D.C. through BS 2, 7 and 8, FIG. 111, upper left, and BC 1, 16 and 17, through the line find head to the plate of the complement write tube, thence through that tube and from the cathode to ground. The grid is held positive with respect to the cathode by connecting it to a slightly positive potential not shown. This track is polarized initially so as to utilize the maximum signal output of the tape and make the signal from this track correspond to the signal from the other tracks. During the line-find-write portion of the accounting machine cycle, the portion of the line find track that passes under the head is erased as the record media moves from the last printed line backwardly into the carriage to its most rearward position. Erasing this portion of the line find track means magnetically polarizing it in the negative direction. Since the entire track was originally polarized positively, the signal to be sensed from the tape during line find, will be picked up at that point where the tape changes from a negative to a positive polarization, FIGURE 5A, and thus will be double the signal strength of a pulse from a magnetic track that has not been previously polarized. Since the information signals from the complement track of the magnetic tape are of the same amplitude, the line find head can be switched into the #2 amplifier without changing the tuning or discrimination level of the #2 amplifier, thereby eliminating the need for a third amplifier or circuit alterations to the #2 amplifier for this application.

When the record media begins the line find portion of the accounting machine cycle under blank card conditions, the #2 amplifier is disconnected from the line find drop-out thyratron, FIGURE 112, lower right, inactivating any signals from the line find head. This is to insure that any extraneous pulses from that source will not stop the paper drive as information cannot be available from the line find head on a blank card. Picking the line find relays completes a circuit through a blank card relay point that will energize the line find drop-out relays when the line minus one contact makes. This contact is positioned to energize the line find drop out relays at the line minus one so as to deenergize the drive clutch at that point in the line of feed causing the record media to stop at line 0 which is the "balance-brought-forward" position on the document or form. When the record media stops in this position the machine will print under instructions from the mechanical control panel. After this first print cycle, if the subtotal "A" key has been used, control of the machine to initiate this operation passes to the operator and operation is then normal as previously described.

When the balance transfer and reconstruct relay has been picked by initiation of a blank card cycle by electrical control panel switch 4 as in a balance transfer operation, the base machine will initiate a second print cycle in the new-balance-position. Entering the new-balance-position and cycling the machine in conjunction with a BTR relay point allows the balance relay to pick, thus eliminating the requirement for the manual depression of the balance key which ordinarily allows the balance relay to pick, which in turn initiates the third program cycle, FIGURE 109. Initiating this latter program cycle causes the carriage to open and the line find write and balance write operation to be completed. The card or form will be then ejected from the machine and the carriage cam shaft will be reset to receive a new form.

V. ACCOUNT VERIFICATION

The present invention contemplates the utilization of electrical control circuits for two digits of account verification. These circuits act as a safeguard against the possibility of the operator posting a check or a deposit to the wrong account. Under this mode of operation, account numbers are assigned to each checking account handled by the bank. These account numbers appear in printed form somewhere on the record media posted upon by the bank, and also upon each individual check and deposit; each individual having his or her check and deposit slips with the respective account number printed upon them. In the embodiment of the invention herein described the last two digits of the account number are used to verify that account. As each item is posted, either check or deposit, the last two digits of that individual's account number, as taken from the check or deposit slip, are also entered into two specific columns of the keyboard by the operator. The same last two digits of the account number are also encoded on the magnetic tape of the record media and are read into the machine during the read operation as previously described so as to be automatically stored in two groups of whiffletree relays. If the two digits entered into the keyboard are the same as those stored in the machine relays, the accounting machine will allow the operator to continue posting. If, however, the two digits entered by the operator differ in any way from those read from the tape, the machine will lock up after posting preventing the operator from continuing. At the same time a red error light on the front of the carriage will glow informing the operator that an error has been made. The operator will then be required to check the last posted item to determine the nature of the error and take steps to correct the error. It is apparent therefore that if an attempt is made to post a check or deposit from one account to the record media of another account the machine will indicate this as an error since the account number from the check or deposit will not verify with the number carried magnetically by the record media.

An additional feature of the present invention is the flexibility of the account verification circuits. It is possible to suppress the account verification feature of the machine by adding a number 8 pin in the electrical control tray in the specific carriage position where the checking feature is not desired. This ability to suppress account verification in any particular carriage position permits the machine to (1) verify all posted items, (2) verify deposits only, (3) verify check only, (4) verify correct account selection or verify first item only. On verifying account selection or first item only the operator would be required to index the two digits pertaining to account verification before the old balance print cycle of the base machine. If this number indexed does not coincide with that picked up magnetically the machine would lock up after the first machine cycle or old balance print cycle and refuse to post the first item, whether that item be a check or a deposit.

The account number stored magnetically on the record media is self perpetuated in the sense that the number read from the tape is re-encoded on the tape again automatically when the balance is written magnetically as the record media is ejected. The account number is read from the tape and stored in two sets of whiffletree relays. The number stored in these relays is then compared with the number entered into the decimal switches from the keyboard after each posting cycle. When all posting cycles are completed and the record member or form is ejected the account number is written on the magnetic strip of the record media from the information in whiffletree relays. The account number therefore travels from the tape to the whiffletree relays and thence back to the tape in a closed cycle. Provision has also been made within the base machine to interrupt this cycle so as to permit changing the number on the tape. This is necessary in the event that a read error occurs or the number somehow becomes erroneous. When the number in the whiffletree relays is incorrect and the correct number is entered into the keyboard, the two numbers will not verify and an error will be indicated. When an inspection of the item by the operator and a check of the record media reveals the fact that the number indexed into the keyboard is correct the machine is released to print by depressing the error reset key. When the last item for that particular account has been posted by depressing the balance key the machine will lock up in the new balance position, prior to printing the new balance. Under these circumstances, the account number and the amount from the previous posting cycle will still be in the keyboard. If, after inspection, the account number is found to be correct, the error reset key is depressed which releases the machine for the new balance print cycle. The error reset key, being depressed in this new balance position, also sets up certain controls which cause the two digits of account number information to be written from the decimal switches as set up by the keyboard and not from the whiffletree relays. This means that although the account number might somehow be lost or destroyed, it can easily be re-encoded on the tape on the following magnetic write cycle, from the keyboard.

In the present embodiment verification of account number takes place after the base machine prints. This is so since the information from the keyboard must be stored in a device such that the stored information is available electrically to enable a comparison with the information stored in the whiffletree relay set up. Since the electrical information cannot be obtained directly from the keyboard the comparison cannot be made until the account number in the keyboard is set up in the 11th and 12th rack decimal read out switches. These switches are set up at approximately 184° of the base machine cycle. At 210° of the same cycle base machine cam 8 makes completing a circuit from a voltage source through AV 2, 5 and 6 normally closed, through AW 5 and 6 and on to the common of the 11th rack decimal read out switch. According to the number sensed from the keyboard, any one of the individual contacts might be made which corresponds to that digit, the voltage would then appear on that output line from 0 to and including nine. All lines are then connected to both whiffletree contact groups assigned to account verification. If the number coded in the whiffletree contacts is identical to that in the switch the voltage will find a path through these whiffletree contacts and be present at the #1 relay row 6 contact. This voltage is applied from the tenth rack whiffletree set up through write pulse gate 7 and 8, through AV 1 coil to ground, picking that relay.

If the digit stored in the tenth rack whiffletree contact group is not the same as that in the eleventh rack decimal read out switch, the "hot" line from the read out switch would see an open contact somewhere in the tenth rack whiffletree contact group and AV 1 relay would not be operated.

If the voltage got through the eleventh rack whiffletree set up because both numbers were the same, nothing would happen as AV 2, 16 and 17 contact being open, isolates this output voltage. If the digit stored in the eleventh rack decimal read out switch matched that stored in the tenth rack whiffletree relay group, the #1 account verification relay would then be picked. The AV 1 relay then causes the AV 2 relay to pick by supplying voltage through its normally closed points from base machine cam 2. This circuit is through AV 1, 15 and 14 through AV 2 coil to ground. Both these coils are than held energized by this latter cam contact which will make at 45° and break at 20° of the base machine cycle. Picking the AV 2 relay causes AV 2, 5 and 6 contact points to open, isolating the common of the eleventh rack decimal read out switch from the voltage source. AV 2, 10 and 11 contact points in making allows the common of the twelfth rack decimal read out switch to become hot or be connected to a voltage source thus sending a voltage to the whiffletree relay contacts along a line corresponding to the digit indexed into the keyboard in the eleventh column by the operator. If the same digit is stored in the eleventh rack whiffletree relay contacts the voltage is impressed across the coil of AV 3, energizing that coil and causing the relay to operate. If all three account relays are operated, this means the account number indexed by the operator compared with that obtained from the magnetic tape of the ledger or statement form and the operator will be allowed to continue the cycling of the base machine. If the numbers did not agree the voltage on the hot line from the twelfth rack decimal read out switch into the whiffletree contact points would have seen an open contact somewhere in the whiffletree contact group and AV 3 relay coil would not have been energized.

In this instance where either or both digits of the account number do not verify, one or all of the account verification relays are not energized. When this happens the base machine is blocked by keeping the voltage impressed across the machine block solenoid through two normally closed relay points connected in parallel. This circuit is as follows, from 115 v. D.C., through cam 7, FIG. 116, through AV 2, 12 and 13 or through AV 3, 12 and 13, through the machine block solenoid to ground. Another AV 3 normally closed point is used to provide a circuit to the error lamp, thus causing the error lamp to glow when one or all of these relays do not pick, giving a visual indication that an account verification error has been made.

When such an error has been made, it may be one of two types, either the operator has made a mistake in translating the account number from the item into the keyboard, or the operator may post an item to the wrong account. The first type of error is corrected by merely indexing the correct account number into the keyboard and then depressing the error reset key which allows the base machine to post the subsequent item. The other type error, where an erroneous posting has been made, the operator must correct by first returning to the item column, wherein the error was made. Then a corrective posting cycle must be taken in that column to negate the amount entered in error. The posting cycle is taken by entering the amount and correct account number in the keyboard, depressing the correct motor bar and error correction key, then depressing the error reset key to release the base machine for posting. In either type of error, the error reset key is depressed to release the machine for cycling.

Depressing the error reset key permits 115 v. D.C. to be impressed across the Error Reset relay coil. FIGURE 112, bottom center, actuating that relay. The error reset relay in operating, causes a voltage to be impressed across the #2 error reset relay coil, FIGURE 115, through ER 14 and 15, which causes ER 2 relay to operate. Normally open points ER 2, 18 and 19 and ER 2, 10 and 11, FIGURE 118, lower right, permits 115 v. D.C. to be impressed across the #1 account verification and #3 account verification relay coils, energizing these coils. The operation of these account verification relays causes all three account verification relays to be operated and held. Normally closed relay points on the account verification relays open the circuit to the machine block solenoid which in being de-energized allows the machine to cycle. Another normally closed #3 account verification relay point opens the circuit to the error lamp, turning the red error light off.

The circuitry required to enable recording of the account number on the ledger form rather than from the whiffletree relays again involves the depression of the error reset key. To cause the machine to function in this manner, the reset key must be depressed while the carriage is in the new balance position. When these two conditions are satisfied, the account verification set up relay is energized and its contacts operated. One of the normally closed contacts on this relay then opens, opening the circuit to the hold coils of the whiffletree relays containing the account number. This in turn drops out the whiffletree relays so that the account number stored in these relays is erased. Another normally closed account verification set up relay point prevents the account write (AW) relay coil from being energized. Contact points on the account write relay control the scanning of either the decimal switches or the whiffletree contacts, so that under this condition the number as stored in the twelfth and eleventh rack decimal read out switch will be recorded on the tape.

What is claimed is:

1. In a bookeeping machine using cards having soundtrack record carrier means adapted to have recordings thereon corresponding to different characters, in combination, pickup means for sucessively sensing each recording on the soundtrack record carrier means of the card and for producing a voltage signal having a predetermined characteristic associated with the respective sensed recording; marking means having a plurality of said characters thereon and being movable between a plurality of positions, said marking means being adapted to mark on the card in each of said positions one of said different characters corresponding to one of the characters represented by a recording on said soundtrack record carrier means; means connected to said pickup means and being selectively responsive to voltage signals produced by the same; operating means controlled by said selectively responsive means and connected to said marking means for moving the same between its positions in accordance with the predetermined characteristics of the respective voltage signals whereby a character is marked on said card corresponding to the character represented by the recording on the soundtrack record carrier means sensed by said pickup means; and a second soundtrack record carrier means located on said card and adapted to have recorded thereon additional recordings corresponding to a desired position of the card in said bookkeeping machine.

2. In an accounting machine using a record member having a magnetic track adapted to have recordings thereon corresponding to different characters, in combination, pickup means for sucessively sensing each recording on said track and for producing signals having predetermined characteristics associated with each respective recording, marking means having a plurality of said characters thereon and being movable between a plurality of positions, said marking means being adapted to mark on said member in each of said positions one of said different characters corresponding to one of the characters represented by a recording on said track, means connected to said pickup means and being selectively responsive to said signals, operating means controlled by said selectively responsive means and connected to said marking means for moving the same between said positions in accordance with the predetermined characteristics of the respective signals, and a second magnetic track located on said record member and adapted to have recorded thereon information corresponding to a desired position of the record member relative to said marking means.

3. The invention set forth in claim 2 wherein said information is recorded on said second magnetic track by a change in polarity of said track at a position corresponding to said desired position of the record member relative to said marking means.

4. The invention set forth in claim 3 further comprising means for moving said record member into and out of said machine, and means for polarizing said second track in one direction during movement of said record member into said machine and in another direction during movement of said record member out of said machine.

5. The invention set forth in claim 1 further comprising storage means controlled by said selectively responsive means for storing the data represented by said signals.

6. In an acounting machine for use with a record member on which data is encoded in the form of magnetic bits during movement of the record member, the combination comprising means for feeding a record member in opposite directions, transducing means disposed in operative proximity to the path of travel of the record member, said transducing means being operable to polarize a linear field on the record member with one magnetic polarity and then with the opposite magnetic polarity as the record member is moved first in one di-direction and then in the opposite direction respectively and further being operable to sense a change in the polarity of the linear field on the record member, and means operatively associated with said transducing means and with said feeding means for stopping the movement of the record member in response to the sensing of a change in the polarity of the linear field.

7. An accounting machine comprising a base structure upon which a transversely movable carriage is disposed, a printing platen rotatably mounted on the carriage, bi-directional drive means in the carriage for reversely feeding a record member past said platen, a magnetic transducing head mounted in the carriage in proximity to the path of movement of the record member, said transducer head being operable to magnetically polarize a linear field of the record member moved by said feeding means with a positive magnetic polarity and then with a negative magnetic polarity as the record member is moved in one direction or the other direction respectively and further being capable of sensing the boundary line of the two polarity fields of the record member, and means operatively associated with the transducing head and with the drive means and operable upon receipt of a signal from the head signifying a change in the polarity of the linear field to control the feed of the record member so as to position a discrete line of the record member opposite to the platen for receiving a printing impression thereon.

8. Accounting apparatus including, in combination, an accounting machine having a main frame and a carriage movable transversely on the main frame, document feeding means in said carriage, bi-directional drive means in said carriage coupled to said feeding means and operable to move a document in one direction into the carriage and in the reverse direction out of the carriage, a plurality of magnetic heads in said carriage each of which is capable of reading or writing magnetic information respectively either from or onto said document, a first one of said heads being adapted to sense old account information magnetically recorded on said document and to write new account information magnetically on the document, a second one of said heads being operable to sense old line find information magnetically recorded on the document and to write new line find information magnetically onto the document, printing means disposed in said main frame, means responsive to the movement of the document into the carriage for causing said first head to read old account information on the document and for setting the printing means operable to print on the document the information sensed by the first head, means responsive to the movement of the document in the reverse direction out of the carriage for causing said first head to write new account information magnetically on the document, means operative upon movement of the document in one direction relative to the carriage for causing said second head to sense old line find information on the document and for controlling said drive means to stop the document in the carriage so that the next available printing line thereon is positioned to be printed upon by said printing means, and means operative upon movement of the document in the reverse direction relative to the carriage for causing said second head to write new line find information magnetically on the document.

9. In an accounting machine using a record member having a magnetic track adapted to have recording thereon corresponding to different characters, in combination, marking means for establishing a visual image of said characters on said record member in response to signals supplied thereto, first transducing means for digitally recording on said track magnetic bits representative of said characters and for sensing said magnetic bits from said track to produce pulse signals representative of said characters, means for connecting said pulse signals to said marking means, and second transducing means for recording a linear magnetic field on said track representative of the position of said record member relative to said marking means and for subsequently sensing said linear field to produce a control signal for positioning said record member at a predetermined position in said machine.

10. In an accounting machine using a record member having a first magnetic track adapted to have recordings thereon corresponding to different characters and further having a second magnetic track located on said record member and adapted to have recorded thereon information corresponding to a desired position of the record member in the machine, in combination, first pickup means for successively sensing each recording on the first track and for producing signals having predetermined characteristics associated with each respective recording, marking means having a plurality of said characters thereon and being movable between a plurality of positions, said marking means being adapted to mark on said member in each of said positions one of said different characters corresponding to one of the characters represented by a recording on the first track, means connected to said pickup means and being selectively responsive to said signals, operating means controlled by said selectively responsive means and connected to said marking means for moving the same between said positions and for marking the record member in accordance with the predetermined characteristics of the respective signals, second pickup means for successively sensing the recording on the second track and for producing a signal signifying a desired marking position of the record member, and means connected to the second pickup means and being responsive to the signal sensed from the second track for controlling the position of the record member relative to said marking means.

11. An accounting machine for use with a record member having a pair of elongated parallel extending magnetic recording tracks the first of which is adapted to have recordings thereon corresponding to different characters and the second of which is adapted to have recorded thereon information concerning a desired position of the record member in the machine, means for moving the record member into and out of the machine in the direction of the elongation of the magnetic tracks, first pickup means for successively sensing the recording on the first track as the record member is moved and for producing signals having predetermined characteristics associated with each respective recording, printing means having a plurality of said characters thereon and being movable between a plurality of positions, said printing means being adapted to mark on said record member in each of said positions one of said different characters corresponding to one of the characters represented by a recording on the first track, means connected to said pickup means and being selectively responsive to said signals, operating means controlled by said selectively responsive means and connected to said printing means for moving the same between said positions and for marking the record member in accordance with the predetermined characteristics of the respective signals, second pickup means for successively sensing the recording on the second track as the record member is moved and for producing a signal signifying a desired printing position of the record member, and means connected to the second pickup means and being responsive to the signal sensed from the second track for controlling the position of the record member relative to said printing means.

No references cited.

WILLIAM B. PENN, *Primary Examiner.*